United States Patent
Yasui et al.

(10) Patent No.: US 9,139,173 B2
(45) Date of Patent: Sep. 22, 2015

(54) DEVICE FOR CONTROLLING TRAVELING OF VEHICLE

(75) Inventors: Yoshiyuki Yasui, Aichi-ken (JP);
Motoshi Suzuki, Aichi-ken (JP);
Hideaki Koto, Aichi-ken (JP);
Kazutaka Noro, Aichi-ken (JP);
Hiroyuki Kodama, Aichi-ken (JP);
Manabu Tanaka, Tochigi-Ken (JP);
Takayuki Miyajima, Aichi-ken (JP)

(73) Assignees: ADVICS CO., LTD., Kariya, Aichi-Pref. (JP); AISIN AW CO., LTD., Anjyo-Shi, Aichi (JP)

( * ) Notice: Subject to any disclaimer, the term of this patent is extended or adjusted under 35 U.S.C. 154(b) by 339 days.

(21) Appl. No.: 13/120,750

(22) PCT Filed: Sep. 30, 2009

(86) PCT No.: PCT/JP2009/067450
§ 371 (c)(1),
(2), (4) Date: Mar. 24, 2011

(87) PCT Pub. No.: WO2010/050344
PCT Pub. Date: May 6, 2010

(65) Prior Publication Data
US 2011/0178689 A1 Jul. 21, 2011

(30) Foreign Application Priority Data
Oct. 28, 2008 (JP) .................. 2008-277453
Oct. 28, 2008 (JP) .................. 2008-277458

(51) Int. Cl.
*B60T 7/12* (2006.01)
*B60T 8/1755* (2006.01)
*B60W 30/045* (2012.01)
*B60W 40/072* (2012.01)
*B60W 40/076* (2012.01)

(52) U.S. Cl.
CPC ............... *B60T 7/12* (2013.01); *B60T 8/1755* (2013.01); *B60W 30/045* (2013.01); *B60W 40/072* (2013.01); *B60W 40/076* (2013.01); *B60T 2201/16* (2013.01)

(58) Field of Classification Search
CPC ........ B62D 6/003; B62D 6/006; B62D 6/008; B62D 6/002; B62D 6/005; B62D 6/04; B62D 6/02; B62D 6/007; B62D 5/0472; B62D 5/008; B62D 5/0463; B62D 7/159; B62D 11/003; B62D 11/24; B62D 15/0235; B62D 15/029; B62D 1/286; B60T 7/12; B60T 8/1755; B60T 2201/16; B60W 30/045; B60W 40/072; B60W 40/076
USPC ........... 701/37, 38, 41, 70, 71, 72, 74, 78, 79, 701/82, 83, 84, 85, 91, 25, 93, 409; 303/140, 146; 180/197; 280/707; 340/988
See application file for complete search history.

(56) References Cited

U.S. PATENT DOCUMENTS

| | | | | |
|---|---|---|---|---|
| 3,260,478 | A * | 7/1966 | Arno Welti | 244/3.14 |
| 4,234,142 | A * | 11/1980 | Yost et al. | 244/3.21 |
| 4,623,966 | A * | 11/1986 | O'Sullivan | 701/301 |
| 4,802,096 | A * | 1/1989 | Hainsworth et al. | 701/301 |
| 5,281,901 | A * | 1/1994 | Yardley et al. | 318/587 |
| 5,367,458 | A * | 11/1994 | Roberts et al. | 701/25 |
| 5,400,244 | A * | 3/1995 | Watanabe et al. | 701/28 |
| 5,757,949 | A * | 5/1998 | Kinoshita et al. | 382/104 |
| 5,822,709 | A * | 10/1998 | Fujita | 701/70 |
| 6,651,004 | B1 * | 11/2003 | Perruzzi et al. | 701/302 |
| 6,675,090 | B2 * | 1/2004 | Matsuura | 701/41 |
| 6,681,177 | B2 * | 1/2004 | Joshi | 701/93 |
| 7,124,027 | B1 * | 10/2006 | Ernst et al. | 701/301 |
| 2002/0161510 | A1 | 10/2002 | Matsuura | |

FOREIGN PATENT DOCUMENTS

| | | |
|---|---|---|
| EP | 1 255 091 A1 | 11/2002 |
| JP | 11-211492 A | 8/1999 |
| JP | 2002-329299 A | 11/2002 |
| JP | 2006-219032 A | 8/2006 |
| JP | 2007-022498 A | 2/2007 |
| JP | 2008-018777 A | 1/2008 |
| WO | WO 2009/101769 A1 | 8/2009 |

OTHER PUBLICATIONS

"Vehicle Stability Assist Development Objectives"; http://world.honda.com/news/1997/t970702d.html; retrieved on Dec. 3, 2013.*
* International Search Report (PCT/ISA/210) issued on Jan. 26, 2010, by Japanese Patent Office as the International Searching Authority for International Application No. PCT/JP2009/067450.
* Written Opinion (PCT/ISA/237) issued on Jan. 26, 2010, by Japanese Patent Office as the International Searching Authority for International Application No. PCT/JP2009/067450.

* cited by examiner

*Primary Examiner* — James Trammell
*Assistant Examiner* — James E Stroud
(74) *Attorney, Agent, or Firm* — Buchanan Ingersoll & Rooney PC

(57) ABSTRACT

After a vehicle has entered a curve, a deviation (Sch) between a target turning state quantity Td and an actual turning state quantity Ta is computed. In a stage in which Sch does not reach a predetermined value after the vehicle has entered the curve, the possibility of the vehicle traveling in the curve is judged to be low, and the reliability of the curve information Rc, Pc is judged to be low. In this case, a determination for prohibiting execution of control (So=0) is made. In a stage after Sch has reached the predetermined value, the possibility of the vehicle traveling in the curve is judged to be high, and the reliability of the curve information Rc, Pc is judged to be high. In this case, a determination for permitting execution of the control (So=1) is made. Deceleration control is started and executed only when a control start condition is satisfied, and the determination for permission is made. Accordingly, even when the control start condition is satisfied, the deceleration control is not started, if the prohibition determination is made. Thus, the reliability of the curve information based on map information on the vehicle is evaluated reliably, and the deceleration control within the curve can be prevented from being unnecessarily executed on the basis of curve information whose reliability is low.

3 Claims, 31 Drawing Sheets

FIG.21

| | CUMULATIVE TURNING INDEX Se | ACTUAL TURNING INDEX Sa |
|---|---|---|
| TURNING INDEX BASED ON TURNING MOTION OF VEHICLE | CALCULATIVE LATERAL ACCELERATION COMPUTED BASED ON Rvh<br>Gye (= $Vx^2$/Rvh) | ACTUAL LATERAL ACCELERATION Gya OBTAINED AS ACTUAL TURNING STATE QUANTITY |
| | CALCULATIVE YAW RATE COMPUTED BASED ON Rvh<br>Yre (= Vx/Rvh) | ACTUAL YAW RATE Yra OBTAINED AS ACTUAL TURNING STATE QUANTITY |
| | CALCULATIVE FRONT WHEEL STEERING ANGLE COMPUTED BASED ON Rvh<br>$\delta$fe (= [L·(1+Kh·$Vx^2$)]/Rvh)<br>WHEREIN L IS WHEEL BASE, AND Kh IS STABILITY FACTOR | ACTUAL FRONT WHEEL STEERING ANGLE $\delta$fa OBTAINED AS ACTUAL TURNING STATE QUANTITY |
| | CALCULATIVE STEERING WHEEL ANGLE COMPUTED BASED ON Rvh<br>$\theta$swe (= [SG·L·(1+Kh·$Vx^2$)]/Rvh)<br>WHEREIN SG IS STEERING GEAR RATIO | ACTUAL STEERING WHEEL ANGLE $\theta$swa OBTAINED AS ACTUAL TURNING STATE QUANTITY |
| | CALCULATIVE SPEED DIFFERENCE BETWEEN LEFT AND RIGHT WHEELS COMPUTED BASED ON Rvh<br>$\Delta$Vwe (= (Tr·Vx)/Rvh) WHEREIN Tr IS TREAD | ACTUAL SPEED DIFFERENCE $\Delta$Vwa BETWEEN LEFT AND RIGHT WHEELS OBTAINED AS ACTUAL TURNING STATE QUANTITY |
| | CALCULATIVE HEADING ANGLE Yae COMPUTED BASED ON Rvh<br>(THE DIRECTION OF A TANGENTIAL LINE OF THE CURVE AT THE VEHICLE POSITION Pvh IN RELATION TO THE DIRECTION OF THE STRAIGHT SECTION BEFORE THE CURVE ENTRANCE) | ACTUAL HEADING ANGLE Yaa OBTAINED AS ACTUAL TURNING STATE QUANTITY<br>(ANGLE OF TRAVELLING DIRECTION OF VEHICLE (DIRECTION WHICH VEHICLE FACES) AT VEHICLE POSITION Pvh IN RELATION TO DIRECTION OF STRAIGHT SECTION BEFORE CURVE ENTRANCE) |
| TURNING INDEX BASED ON CURVE | CURVE CURVATURE RADIUS Rvh | CURVE CURVATURE RADIUS Rta COMPUTED BASED ON ACTUAL TURNING STATE QUANTITY OF VEHICLE<br>Rta CAN BE OBTAINED BY ANY OF THE FOLLOWING COMPUTATIONS<br><br>Rta=$Vx^2$/Gya<br>Rta=Vx/Yra<br>Rta=[L·(1+Kh·$Vx^2$)]/$\delta$fa<br>Rta=[SG·L·(1+Kh·$Vx^2$)]/$\theta$swa<br>Rta=(Tr·Vx)/$\Delta$Vwa<br><br>WHEREIN Kh IS STABILITY FACTOR, L IS WHEEL BASE OF VEHICLE, Tr IS TREAD OF VEHICLE, AND SG IS STEERING GEAR RATIO OF VEHICLE |
| OTHERS | VALUE COMPUTED BY COMBINING TWO OR MORE OF THE ABOVE-DESCRIBED CALCULATIVE TURNING INDICES Se | VALUE COMPUTED BY COMBINING TWO OR MORE OF THE ABOVE-DESCRIBED ACTUAL TURNING INDICES Sa |

DEVICE FOR CONTROLLING TRAVELING OF VEHICLE

TECHNICAL FIELD

The present invention relates to a traveling control apparatus for a vehicle which performs deceleration control on the basis of curve information when the vehicle travels along a curve.

BACKGROUND ART

Conventionally, there has been widely known a technique for performing speed control when a vehicle passes through a curve, on the basis of curve information obtained from map information stored in a navigation apparatus mounted on the vehicle. The curve information (the shape of the curve) obtained from the map information on the vehicle may differ from the actual shape of the curve, for example, in the case where a road has been renovated after the map information (database) had been created. That is, the reliability of the map information (curve information) on the vehicle is not high at all times.

Japanese Patent Application Laid-Open (kokai) No. H11-211492 describes a technique for acquiring final road information from the result of comparison between first road information obtained from map information of a navigation apparatus and second road information obtained on the basis of a road state detected by an image capturing apparatus mounted on a vehicle. The publication describes that, thanks for this technique, reliable road information (curve information) representing a road ahead of the vehicle can be obtained.

Moreover, the publication describes a technique for capturing a stereo image by use of a stereoscopic camera mounted on the vehicle, computing a distance distribution over the entire image on the basis of a difference in position between two images of the same object in the stereo image and the principle of triangulation, and performing histogram processing on the distance distribution to thereby obtain the second road information.

However, in the case where curve information is obtained through image processing as described above, although satisfactory accuracy can be ensured for information representing a curve ahead of the vehicle and located near the vehicle, the accuracy lowers for information representing a curve ahead of the vehicle and located away from the vehicle.

DISCLOSURE OF THE INVENTION

An object of the present invention is to provide a traveling control apparatus for a vehicle which can reliably evaluate the reliability of curve information obtained from map information of a navigation apparatus, to thereby prevent in-curve speed control from unnecessarily being executed on the basis of curve information whose reliability is low.

A traveling control apparatus for a vehicle according to the present invention comprises vehicle position acquisition means for acquiring a position (Pvh) of the vehicle; curve information acquisition means for acquiring information (Rc, Pc) of a curve of a road on which the vehicle is traveling; vehicle speed acquisition means for acquiring a speed (Vx) of the vehicle; and deceleration control means for executing deceleration control which decreases the speed of the vehicle when the vehicle passes through the curve, on the basis of the position (Pvh) of the vehicle, the curve information (Rc, Pc), and the speed (Vx) of the vehicle.

The traveling control apparatus for a vehicle according to the present invention is characterized by comprising actual turning state quantity acquisition means for acquiring an actual turning state quantity (Ta) which represents an actual turning state of the vehicle; and first execution judgment means for determining, on the basis of the actual turning state quantity (Ta), whether execution of the deceleration control is to be permitted or prohibited and for outputting, as a result of the determination, an output which is brought into an enabled state in which execution of the deceleration control is enabled or a disabled state in which execution of the deceleration control is disabled, wherein the deceleration control means executes the deceleration control when the determination result of the first execution judgment means is in the enabled state, and does not execute the deceleration control when the determination result of the first execution judgment means is in the disabled state.

According to this configuration, the reliability of the curve information (specifically, a database for map information) can be evaluated on the basis of the actual turning state quantity. Specifically, when the actual turning state quantity (e.g., actual lateral acceleration or the like) is large (equal to or greater than a predetermined value), it can be considered that the possibility of the vehicle actually traveling within the curve is high, and the reliability of the curve information is high. Meanwhile, when the actual turning state quantity (e.g., actual lateral acceleration or the like) is small (less than the predetermined value), it can be considered that the possibility of the vehicle actually traveling within the curve is low, and the reliability of the curve information is low. In other words, a determination as to whether or not the vehicle is actually traveling within the curve can be made on the basis of the actual turning state quantity, or the reliability of the curve information can be computed on the basis of the actual turning state quantity. The reliability of the curve information obtained in this manner can be utilized for the deceleration control for the vehicle which is performed by use of the curve information.

In the above-described configuration, on the basis of this actual turning state quantity, a determination is made as to whether the determination result (output) is brought into the enabled state in which execution of the deceleration control is enabled or the disabled state in which execution of the deceleration control is disabled. That is, when the reliability of the curve information is high, the determination result is brought into the enabled state; and, when the reliability of the curve information is low, the determination result is brought into the disabled state.

When the determination result is in the enabled state (i.e., the reliability of the curve information is high), the deceleration control is executed. When the determination result is in the disabled state (i.e., the reliability of the curve information is low), the deceleration control is not executed. With this operation, the deceleration control within the curve can be executed on the basis of curve information whose reliability is sufficiently high. In other words, it is possible to prevent the deceleration control from being unnecessarily started and executed on the basis of curve information whose reliability is low. For example, in the case where the obtained curve information (the shape of the curve) and the actual shape of the curve differ because of renovation of the curve in the vicinity of the curve entrance (in particular, renovation to change a curved section to a straight section), it is possible to prevent the deceleration control from being started within the curve.

The above-described traveling control apparatus may be configured as follows. The deceleration control means comprises target vehicle speed computation means for computing, on the basis of the position (Pvh) of the vehicle and the curve information (Rc, Pc), a target vehicle speed (Vt) at which the vehicle is to travel through the curve, wherein the deceleration control means starts the deceleration control when the determination result of the first execution judgment means is in the enabled state and the speed (Vx) of the vehicle is in excess of the target vehicle speed (Vt). In this case, the fact that the determination result is in the enabled state constitutes a portion of the deceleration control start condition. Accordingly, in some cases, the deceleration control is not started even when the determination result is set (initialized) to the disabled state when the vehicle enters the curve (before the vehicle enters the curve) and the determination result is changed from the disabled state to the enabled state after the vehicle enters the curve.

Notably, the deceleration control means may control the speed (Vx) of the vehicle such that the speed (Vx) of the vehicle coincides with the target vehicle speed (Vt), or may control the speed (Vx) of the vehicle such that the speed (Vx) of the vehicle does not exceed the target vehicle speed (Vt).

In the above-described traveling control apparatus, the deceleration control means may be configured to interrupt the deceleration control when the determination result of the first execution judgment means is changed from the enabled state to the disabled state in a state in which the deceleration control is being executed (that is, in the enabled state). By virtue of this configuration, the following action can be realized. For example, in the case where renovation is not performed in the vicinity of the curve entrance but renovation is performed from a mid point of the curve, when the vehicle passes through the vicinity of the curve entrance, the determination result is brought into the enabled state, whereby the deceleration control is started. However, when the vehicle passes through the mid point of the curve, the determination result is changed from the enabled state to the disabled state, whereby the deceleration control which is being executed is interrupted.

In the above-described traveling control apparatus, the first execution judgment means may comprise heading angle computation means for computing a heading angle (Ya) of the vehicle on the basis of the actual turning state quantity (Ta) and may be configured to perform the above-descried determination on the basis of the heading angle (Ya). In this case, preferably, when the actual turning state quantity (Ta) is equal to or less than a predetermined value (Tsk) (every time the actual turning state quantity becomes equal to or less than the predetermined value), the heading angle (Ya) is reset to zero. Here, the heading angle refers to an angle of the traveling direction of the vehicle (a direction which the vehicle faces) at the vehicle position, in relation to the direction of the straight section before the curve entrance. The heading angle can be computed by means of, for example, integrating (cumulating) the actual yaw rate, which serves as the actual turning state quantity, from the curve entrance.

As described above, the heading angle is a cumulative value of the yaw rate from the curve entrance. Accordingly, even in the case where the position of the vehicle in the width direction of the road changes (the vehicle staggers) after the vehicle has entered the curve, use of the heading angle as in the above-described configuration enables proper determination of the possibility of the vehicle actually traveling in the curve, and, accordingly, the reliability of the curve information. Specifically, for example, in a stage in which the heading angle is small (less than a predetermined value), the possibility of the vehicle actually traveling in the curve is judged to be low (accordingly, the reliability of the curve information is low), and the determination result can be set to the disabled state. Meanwhile, in a stage in which the heading angle is large (equal to or greater than the predetermined value), the possibility of the vehicle actually traveling in the curve is judged to be high (accordingly, the reliability of the curve information is high), and the determination result can be set to the enabled state.

Accordingly, even in the case where a driver takes a so-called "out-in-out" traveling line in the curve, the determination as to whether to permit or prohibit execution of the deceleration control can be made properly. Therefore, it is possible to reliably prevent the deceleration control from being unnecessarily started and executed on the basis of curve information whose reliability is low.

In the above-described traveling control apparatus, the first execution judgment means may comprise turning direction computation means for computing a turning direction (Dvh) of the vehicle on the basis of the actual turning state quantity (Ta); and curve direction computation means for computing a direction (Dcv) of the curve in relation to the traveling direction of the vehicle on the basis of the position (Pvh) of the vehicle and the curve information (Rc, Pc), wherein the first execution judgment means makes the above-described determination by determining whether or not the turning direction (Dvh) and the direction (Dcv) of the curve coincide with each other. Here, data representing one of the "straight traveling," "leftward turning," and "rightward turning" is computed as the turning direction. Similarly, data representing one of "straight," "leftward curve," and "rightward curve" is computed as the curve direction.

By virtue of the above-described configuration, the following action can be realized. For example, when the "turning direction" and the "curve direction" coincide with each other, the reliability of the curve information is considered to be high. Therefore, the determination result can be set to the enabled state. Meanwhile, when the "turning direction" and the "curve direction" do not coincide with each other, the reliability of the curve information is considered to be low. Therefore, the determination result can be set to the disabled state.

In the above-described traveling control apparatus, the first execution judgment means comprises actual turning index computation means for computing, on the basis of the actual turning state quantity (Ta), an actual turning index (Sa) representing the degree of actual turning of the vehicle; and calculative turning index computation means for calculating a calculative turning index (Se) corresponding to the actual turning index (Sa) on the basis of the position (Pvh) of the vehicle and the curve information (Rc, Pc), wherein the first execution judgment means performs the above-described determination on the basis of the result of comparison between the actual turning index (Sa) and the calculative turning index (Se).

According to the above-described configuration, the reliability of the curve information can be evaluated on the basis of the result of the comparison between the calculative turning index computed on the basis of the map information and the actually detected actual turning index. Specifically, when the actual turning index and the calculative turning index approximately coincide with each other (when the difference is equal to or less than a predetermined value), the reliability of the curve information is considered to be high. Therefore, the determination result can be set to the enabled state. Meanwhile, when the difference between the actual turning index and the calculative turning index is large (when the difference is in excess of the predetermined value), the reliability of the curve information is considered to be low. Therefore, the determination result can be set to the disabled state.

In the above-described traveling control apparatus, the first execution judgment means comprises steering characteristic computation means for computing, on the basis of the actual turning state quantity (Ta), a steering characteristic value (Sch, ΔYr) representing a steering characteristic of the vehicle, wherein the first execution judgment means performs the above-described determination of the basis of the steering characteristic value (Sch, ΔYr). Here, for example, the steering characteristic value is a deviation between an actual turning state quantity and a target turning state quantity computed on the bases of the speed of the vehicle and a steering wheel angle.

In general, a point at which start of the deceleration control is requested after the vehicle has entered the curve is located before and near the start point of a constant curvature radius section of the curve in which the radius of curvature becomes small. When the vehicle passes through this point, the vehicle tends to exhibit a steering characteristic of under steering, the degree of which is however lower than a level above which vehicle stabilization control must be performed. When the vehicle tends to exhibit under steering, the steering characteristic value assumes a large value.

Accordingly, according to the above-described configuration, the following action can be realized. For example, in a stage in which the steering characteristic value is smaller (less than a predetermined value) after the vehicle enters the curve, the possibility of the vehicle actually traveling in the curve is judged to be low (accordingly, the reliability of the curve information is low), and the determination result can be set to the disabled state. Meanwhile, in a stage in which the steering characteristic value is large (equal to or greater than the predetermined value), the vehicle exhibits under steering, and the possibility of the vehicle actually traveling in the curve is judged to be high (accordingly, the reliability of the curve information is high), and the determination result can be set to the enabled state.

In the case where the determination as to whether execution of the deceleration control is to be permitted or prohibited is made on the basis of the steering characteristic value as described above, preferably, the traveling control apparatus may comprise stabilization control means for executing stabilization control for stabilizing the turning state of the vehicle on the basis of the steering characteristic value (Sch, ΔYr), wherein the first execution judgment means sets the determination result to the disabled state when the steering characteristic value (Sch, ΔYr) is less than a (previously set) first predetermined value (Sc1), and changes the determination result from the disabled state to the enabled state when the steering characteristic value (Sch, ΔYr) changes from a value less than the first predetermined value (Sc1) to the first predetermined value (Sc1) or greater; and the stabilization control means starts the stabilization control when the steering characteristic value (Sch, ΔYr) exceeds a (previously set) second predetermined value (Sc2) greater than the first predetermined value (Sc1).

According to this configuration, in a process in which the degree of under steering (accordingly, the steering characteristic value) is increasing after the vehicle has entered the curve, the deceleration control is first started. In the case where the under steering is eliminated as a result of execution of the deceleration control, the stabilization control is not started. Meanwhile, only when the under steering is not eliminated in spite of execution of the deceleration control, the stabilization control is started and executed. Since the deceleration control is started and executed earlier than and preferentially over the stabilization control, it is possible to prevent the stabilization control from unnecessarily being started.

In the above-described traveling control apparatus, the first execution judgment means may be configured to perform the above-described determination on the basis of a change in the result (Sh) of the above-mentioned comparison up to a point in time when at least one of the actual turning index (Sa) and the calculative turning index (Se) (zero when the vehicle enters the curve (in a straight traveling state) reaches a predetermined value (Ths). Alternatively, the first execution judgment means may be configured to bring the determination result into the enabled state when a state in which the difference (Sh) between the actual turning index (Sa) and the calculative turning index (Se) is equal to or less than a predetermined value (Sh1) continues over a predetermined range (Ls1, Ts1) (after when the vehicle has entered the curve (a point on map or a point in time)).

In general, immediately after the vehicle has entered the curve, both the values of the actual turning index and the calculative turning index are small because of a large curvature radius of the curve. Accordingly, if the above-mentioned determination is executed immediately after the vehicle has entered the curve, the determination result is set on the basis of the result of mutual comparison between small values, whereby the reliability of the determination result decreases. In contrast, according to the above-described configuration, the above-mentioned determination is not executed immediately after the vehicle has entered the curve, and is executed after the vehicle travels within the curve for a short while after having entered the curve (that is, in a stage in which both the values of the actual turning index and the calculative turning index become relatively large due to a decrease in the curvature radius). Accordingly, the determination result is set on the basis of the result of mutual comparison between relatively large values, whereby the reliability of the determination result can be increased.

In this configuration, for example, in the case where the curve entrance of the curve is followed by an approaching transition curve section (a curved section in which the radius of curvature decreases gradually with traveling of the vehicle), the above-mentioned determination is made while the vehicle is traveling in the approaching transition curve section (Zci) of the curve, and, when the determination result is set to the enabled state, the deceleration control can be started while the vehicle is traveling within the approaching transition curve section (Zci).

That is, the above-mentioned determination is made in the first half of the approaching transition curve section, and, when the determination result is set to the enabled state (the reliability of the curve information is high), the deceleration control is started immediately. As a result, in the second half of the approaching transition curve section, deceleration of the vehicle is started, whereby the vehicle speed is controlled so as to enable the vehicle to stably pass through the curve. Meanwhile, when the determination result is set to the disabled state (when the reliability of the curve information is low due to renovation of a road or the like), the deceleration control is not started.

In the above-described traveling control apparatus, preferably, the calculative turning index computation means is configured to judge a relation (Rch) between position within the curve and curvature radius of the curve on the basis of the curve information (Rc, Pc), compute the curvature radius (Rvh) of the curve at the position (Pvh) of the vehicle on the basis of the judged relation and the position (Pvh) of the vehicle, and compute the calculative turning index (Se) on the basis of the computed curvature radius (Rvh). According to this configuration, the calculative turning index, which can change every moment, can be computed stably and accurately on the basis of the curvature radius of the curve at the vehicle position, which changes every moment.

In the above-described traveling control apparatus, preferably, the actual turning state quantity acquisition means acquires an actual steering angle (δfa, θswa) of the vehicle as the actual turning state quantity (Ta), and the actual turning index computation means uses the actual steering angle (δfa, θswa) as the actual turning index (Sa) (accordingly, uses a calculated value of the steering angle as the calculative turning index).

For example, there will be considered a case in which a physical quantity, such as lateral acceleration or yaw rate, whose magnitude is affected by the vehicle speed is used as the actual turning index (and the calculative turning index). In this case, if, as described above, the above-mentioned determination is made on the basis of a change in the comparison result up to a point in time when at least one of the actual turning index and the calculative turning index reaches the predetermined value after the vehicle has entered the curve, the predetermined value must be changed in accordance with the vehicle speed. In contrast, the steering angle is not a physical quantity whose magnitude is affected by the vehicle speed. Accordingly, by virtue of the above-described configuration, the predetermined value can be set to a constant value (fixed value).

In the above-described traveling control apparatus, preferably, the actual turning state quantity acquisition means obtains two or more actual turning state quantities (Ta) (two or more types of actual turning state quantities (Ta) having different dimensions), the actual turning index computation means computes the actual turning index (Sa) on the basis of the two or more actual turning state quantities (Ta), and the calculative turning index computation means computes, on the basis of the position (Pvh) of the vehicle and the curve information (Rc, Pc), two or more calculative turning state quantities (Te) (two or more types of calculative turning state quantities (Te) having different dimensions) corresponding to the actual turning state quantities, and computes the calculative turning index (Se) corresponding to the actual turning index (Sa) on the basis of the two or more calculative turning state quantities (Te).

According to this configuration, the above-mentioned determination is executed on the basis of the result of comparison between the calculative turning index and the actual turning index obtained on the basis of the two or more turning state quantities (two or more types of turning state quantities having different dimensions). Accordingly, the redundancy of the deceleration control is improved.

In the above-described traveling control apparatus, preferably, the vehicle speed control means comprises wheel brake control means for controlling a braking torque applied to wheels of the vehicle, wherein the wheel brake control means controls the braking torque such that a changing gradient of the braking torque with respect to time does not exceed a predetermined value (Lwc, Lwd).

In the above-described traveling control apparatus, when the determination result is switched from the disabled state to the enabled state in a state in which the deceleration control is not executed, the deceleration control may be started suddenly. Similarly, when the determination result is switched from the enabled state to the disabled state in a state in which the deceleration control is being executed, the deceleration control may be interrupted suddenly. According to the above-described configuration, it is possible to prevent the deceleration of the vehicle from changing suddenly due to such start and interruption of the deceleration control.

In the above-described traveling control apparatus, preferably, the first execution judgment means comprises storage means for storing a curve for which the determination result of the first execution judgment means was set to the disabled state, wherein, when the vehicle travels through the stored curve again, the determination result is set to the disabled state.

According to this configuration, there is stored a curve whose actual shape differs from the obtained curve information (the shape of the curve) due to renovation of the curve or the like, and, when the vehicle travels through that curve again, execution of the deceleration control can be prohibited without fail.

Preferably, the above-described traveling control apparatus comprises second execution judgment means which differs from the first execution judgment means and which judges, on the basis of the actual turning state quantity (Ta), whether execution of the deceleration control is to be permitted or prohibited and for outputting as a result of the determination, an output which is brought into an enabled state in which execution of the deceleration control is enabled or a disabled state in which execution of the deceleration control is disabled, wherein the vehicle speed control means executes the deceleration control when the determination result of the first execution judgment means is in the enabled state, and the determination result of the second execution judgment means is in the enabled state.

By virtue of this configuration, the determination as to whether execution of the deceleration control is to be permitted or prohibited is performed on the basis of two types of different determination results. Accordingly, as compared with the case where the determination as to whether execution of the deceleration control is to be permitted or prohibited is performed on the basis of one determination result, the deceleration control within the curve can be executed on the basis of curve information having a higher reliability only.

As described above, the reliability of the curve information (specifically, a map information database) is evaluated on the basis of the result of comparison between the calculative turning index computed on the basis of the map information and the actually detected actual turning index. Paying attention to this, an apparatus for evaluating the reliability of the curve information according to the present invention comprises vehicle position acquisition means for acquiring a position (Pvh) of the vehicle; curve information acquisition means for acquiring curve information (Rc, Pc) of a road on which the vehicle is traveling; actual turning state quantity acquisition means for acquiring a actual turning state quantity (Ta) representing an actual turning state of the vehicle; actual turning index computation means for computing, on the basis of the actual turning state quantity (Ta), an actual turning index (Sa) representing the degree of actual turning of the vehicle; calculative turning index computation means for computing, on the basis of the position (Pvh) of the vehicle and the curve information (Rc, Pc), a calculative turning index (Se) corresponding to the actual turning index (Sa); and reliability computation means for computing a reliability (Sq) of the curve information (Rc, Pc) on the basis of the result (Sh) of comparison between the actual turning index (Sa) and the calculative turning index (Se).

As described above, the reliability of the curve information obtained in this manner can be used for reporting to a driver, which is performed by making use of the curve information, vehicle traveling control, which is performed by making use of the curve information, or the like.

The traveling control apparatus for a vehicle according to the present invention can be described to be an apparatus which comprises vehicle position acquisition means for acquiring a position of the vehicle; curve information acquisition means for acquiring information of a curve of a road on which the vehicle is traveling; vehicle speed acquisition means for acquiring a speed of the vehicle; deceleration control means for executing deceleration control which decreases the speed of the vehicle when the vehicle passes through the curve, on the basis of the position of the vehicle, the curve information, and the speed of the vehicle; and actual turning state quantity acquisition means for acquiring an actual turning state quantity which represents an actual turning state of the vehicle, wherein the deceleration control means executes the deceleration control on the basis of the actual turning state quantity.

Alternatively, the traveling control apparatus for a vehicle according to the present invention can be described to be an apparatus which comprises vehicle position acquisition means for acquiring a position of the vehicle; curve information acquisition means for acquiring information of a curve of a road on which the vehicle is traveling; vehicle speed acquisition means for acquiring a speed of the vehicle; turning detection means for detecting turning of the vehicle for the curve; and deceleration control means, operable when turning of the vehicle for the curve is detected, for executing deceleration control which decreases the speed of the vehicle when the vehicle passes through the curve, on the basis of the position of the vehicle, the curve information, and the speed of the vehicle.

BRIEF DESCRIPTION OF THE DRAWINGS

FIG. 21 is a table showing examples of calculative turning indices and actual turning indices.

BEST MODE FOR CARRYING OUT THE INVENTION

Figure 1:
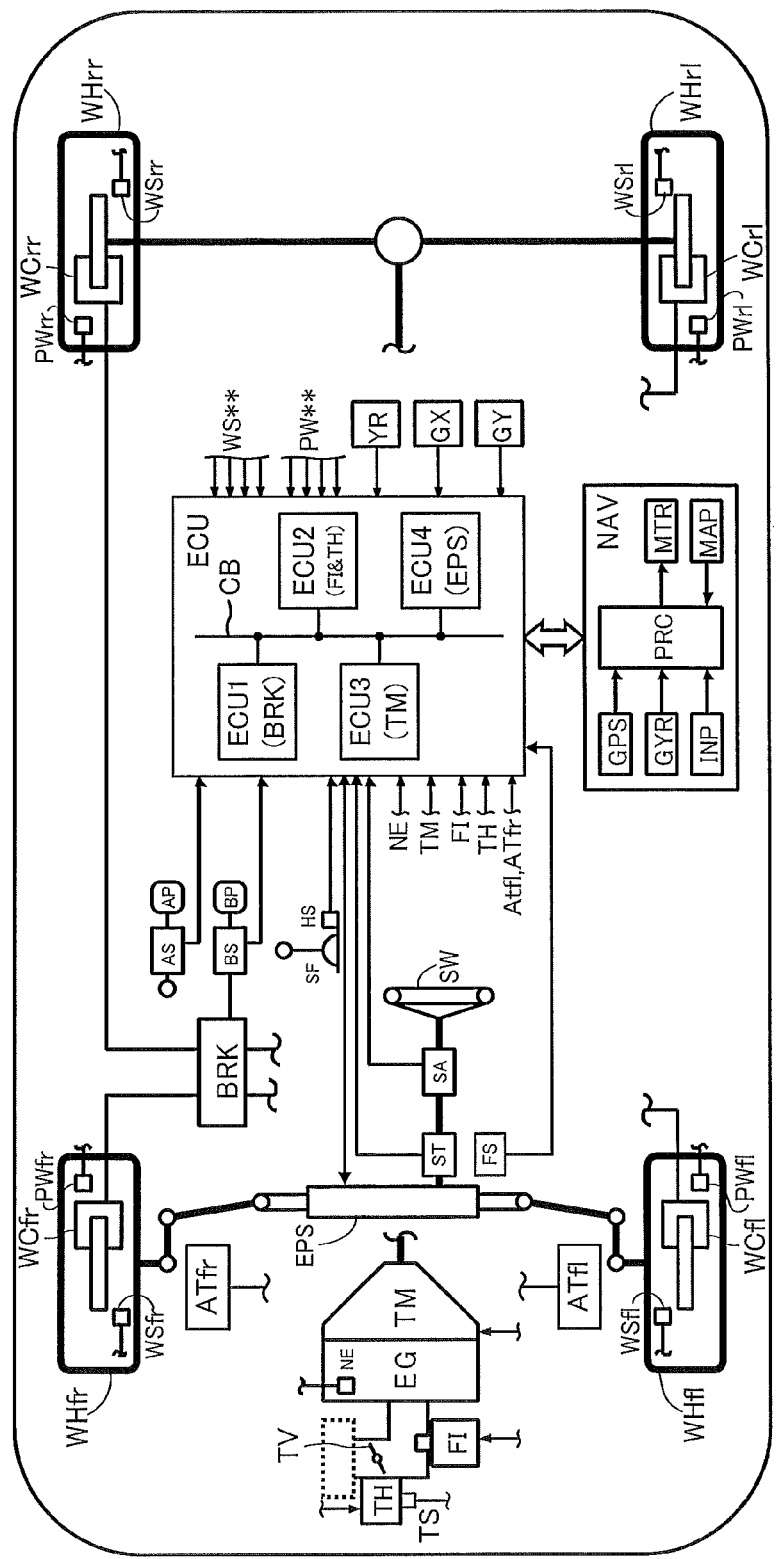
FIG. 1 is a schematic diagram of a vehicle on which a traveling control apparatus for a vehicle according to a first embodiment of the present invention is mounted.

Embodiments of the traveling control apparatus for a vehicle according to the present invention will be described with reference to the drawings.
(First Embodiment)
(Configuration)
FIG. 1 schematically shows the structure of a vehicle on which the traveling control apparatus according to a first embodiment of the present invention (hereinafter referred to as the "present apparatus") is mounted. The present apparatus includes an engine EG, which is a power source of the vehicle, an automatic transmission TM, a brake actuator BRK, an electronic control unit ECU, and a navigation apparatus NAV.

For example, the engine EG is an internal combustion engine. A throttle actuator TH adjusts the opening of a throttle valve TV in response to operation of an accelerator pedal (accelerating operation member) AP by a driver. A fuel injection actuator FI (injector) injects fuel in an amount in proportion to the intake air amount adjusted in accordance with the opening of the throttle valve TV. Thus, the engine EG outputs an output torque corresponding to the amount of operation of the accelerator pedal AP by the driver.

The automatic transmission TM is a multi-stage automatic transmission having a plurality of gear stages or a non-stage automatic transmission having no gear stage. The automatic transmission TM can automatically (without needing operation of a shift lever SF by the driver) change the reduction ratio (rotational speed of an output shaft of the engine EG (=an input shaft of the transmission TM)/rotational speed of an output shaft of the transmission TM) in accordance with the operation state of the engine EG and the position of the shift lever SF.

The brake actuator BRK has a known structure, and includes a plurality of solenoid valves, a hydraulic pump, a motor, etc. In a non-controlled mode, the brake actuator BRK supplies wheel cylinders WC of wheels WH with brake pressure (brake hydraulic pressure) corresponding to an operation of a brake pedal BP (brake operation member) by the driver. In a controlled mode, the brake actuator BRK can individually adjust the braking pressures within the wheel cylinders WC** independently of the operation of the brake pedal BP (and the operation of the accelerator pedal AP).

Notably, "" suffixed to various symbols, etc. represents each of the wheels to which the various symbols, etc. relate. "fl" refers to the front left wheel, "fr" refers to the front right wheel, "rl" refers to the rear left wheel, and "rr" refers to the rear right wheel. For example, the wheel cylinders WC collectively represent the front left wheel cylinder WCfl, the front right wheel cylinder WCfr, the rear left wheel cylinder WCrl, and the rear right wheel cylinder WCrr.

The present apparatus includes wheel speed sensors WS for detecting wheel speeds Vw of the wheels WH; brake pressure sensors PW for detecting brake pressures within the wheel cylinders WC**; a steering wheel angle sensor SA for detecting rotation angle of the steering wheel SW (from its neutral position); a front wheel steering angle sensor FS for deterring steering angle of the front wheels; a yaw rate sensor YR for detecting yaw rate of the vehicle body; a longitudinal acceleration sensor GX for detecting acceleration (deceleration) in a front-rear direction of the vehicle body (hereinafter referred to as the "longitudinal direction); a lateral acceleration sensor GY for detecting acceleration in the lateral direction of the vehicle body; an engine speed sensor NE for detecting rotational speed of the output shaft of the engine EG; an accelerating operation amount sensor AS for detecting the amount of operation of the accelerator pedal (accelerating operation member) AP; a brake operation amount sensor BS for detecting the amount of operation of the brake pedal BP; a shift position sensor HS for detecting the position of the shift lever SF; a throttle valve opening sensor TS for detecting the opening of the throttle valve TV; a self aligning torque sensor ATf* for detecting self aligning torque of the steerable wheels (front wheels); and a steering torque sensor ST for detecting steering torque of the steering wheel SW.

The self aligning torque sensor ATf* is fixed to, for example, the wheel rim of each steerable wheel, and detects distortion of the wheel rim. The self aligning torque sensor ATf* detects the self aligning torque on the basis of information regarding the deformation and the position of the wheel rim whose distortion is detected.

The electronic control unit ECU is a microcomputer for electronically controlling a power train system and a chassis system. The electronic control unit ECU is electrically connected to, or can communicate through a network with, the above-described various actuators, the above-described various sensors, and the automatic transmission TM. The electronic control unit ECU is composed of a plurality of control units (ECU1 to ECU4) connected together via a communication bus CB.

The ECU1 within the electronic control unit ECU is a wheel brake control unit that controls the brake actuator BRK on the basis of signals from the wheel speed sensors WS, the longitudinal acceleration sensor GX, the lateral acceleration sensor GY, the yaw rate sensor YR, etc., to thereby execute brake pressure control (wheel brake control), such as vehicle stabilization control (ESC control), antiskid control (ABS control), and traction control (TCS control), which are well known. Furthermore, the ECU1 computes the speed of the vehicle (vehicle speed) Vx from the wheel speeds Vw detected by the wheel speed sensors WS**.

The ECU2 within the electronic control unit ECU is an engine control unit that controls the throttle actuator TH and the fuel injection actuator FI on the basis of signals from the accelerating operation amount sensor AS, etc., to thereby control the output torque of the engine EG (engine control).

The ECU3 within the electronic control unit ECU is an automatic transmission control unit that controls the automatic transmission TM on the basis of signals from the shift position sensor HS, etc., to thereby execute reduction ratio control (transmission control).

The ECU4 within the electronic control unit ECU is an electronic power steering control unit that controls an electronic power steering apparatus EPS on the basis of signals from the steering torque sensor ST, etc., to thereby execute power steering control.

The navigation apparatus NAV includes a navigation processing apparatus PRC, which is electrically connected to vehicle position detection means (a global positioning system) GPS, a yaw rate gyro GYR, an input section INP, a storage section MAP, and a display section (display) MTR. The navigation apparatus NAV is electrically connected to, or can communicate wireless with, the electronic control unit ECU.

The vehicle position detection means GPS can detect the position (latitude, longitude, etc.) of the vehicle by one of well known methods utilizing positioning signals from satellites. The yaw rate gyro GYR can detect angular speed (yaw rate) of the vehicle body. The input section INP receives driver's operations associated with navigation functions. The storage section MAP stores various pieces of information, such as map information and road information.

The navigation processing apparatus PRC comprehensively processes the signals from the vehicle position detection means GPS, the yaw rate gyro GYR, the input section INP, and the storage section MAP, and displays the processing results (information related to the navigation function) on the display section MTR.

Figure 2:
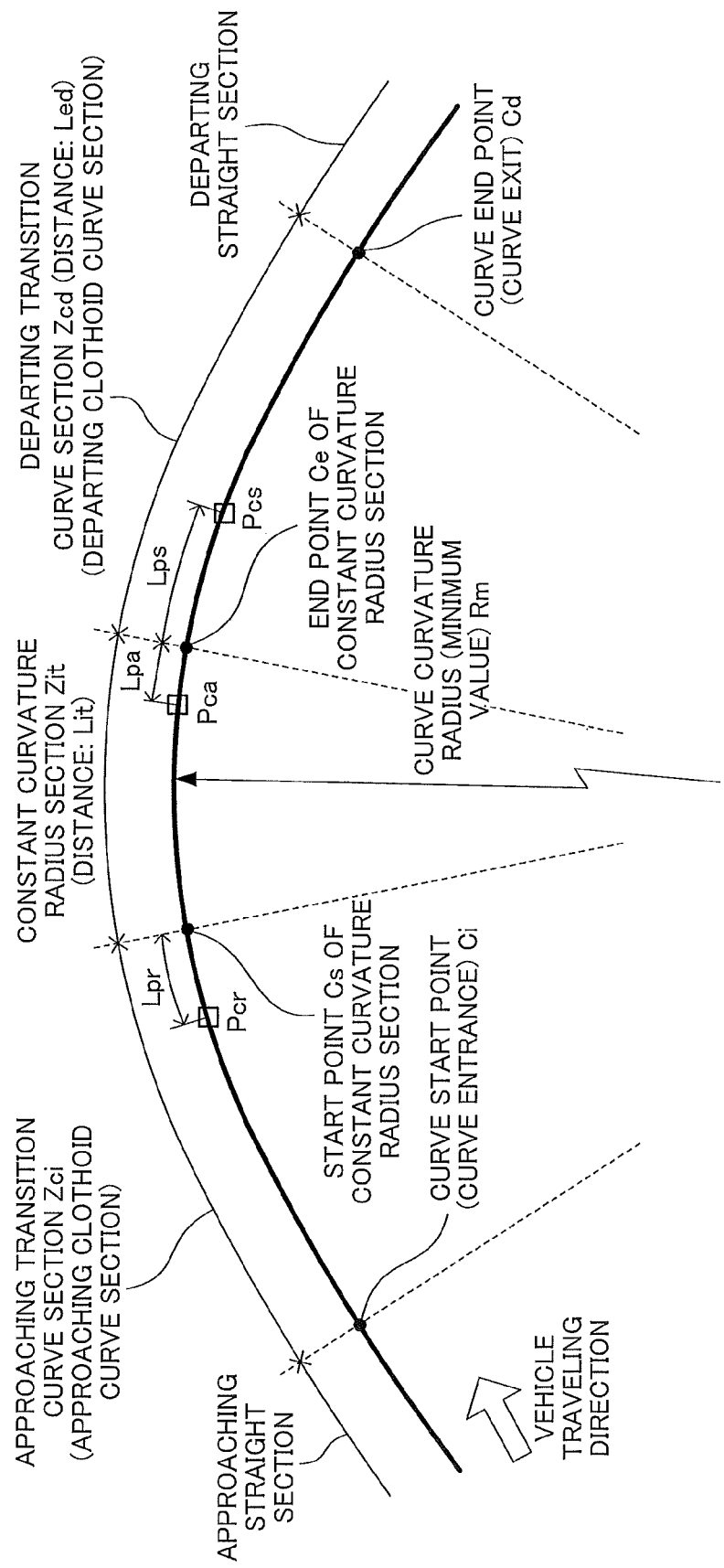
FIG. 2 is an illustration showing an example shape of a curve.

The description of the present apparatus configured as described above will be continued while a curve having a shape shown in FIG. 2 is taken as an example. The (single) curve shown in FIG. 2 is composed of an approaching transition curve section Zci (in which the radius curvature decreases gradually with traveling of the vehicle), a constant curvature radius section Zit, and a departing transition curve section Zcd (in which the radius curvature increases gradually with traveling of the vehicle), in this sequence, from a curve start point Ci (curve entrance) toward a curve end point Cd (curve exit). Each of the transition curves is composed of, for example, a clothoid curve. The transition curve sections are provided in order to enable the vehicle to smoothly pass through the curve through a driver's operation of gradually rotating a steering wheel and then gradually returning the steering wheel to its neutral position, without requiring the driver to rapidly rotate the steering wheel.

Figure 3:
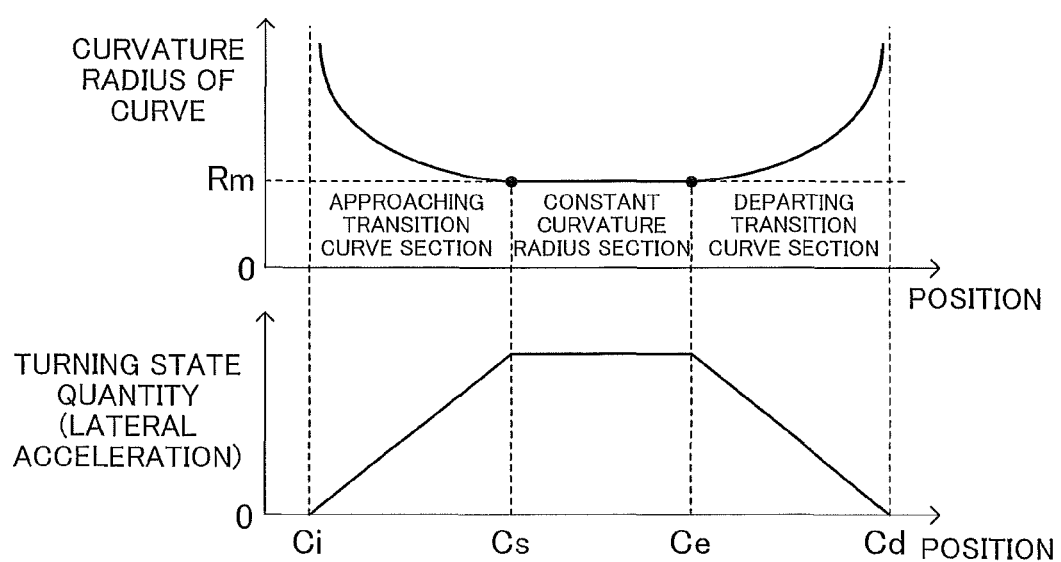
FIG. 3 is a graph showing example changes in curvature radius of the curve shown in FIG. 2 and in a turning state quantity.

As shown in FIG. 3, in this curve, the radius of curvature is infinite at the curve start point Ci (that is, the end point of a straight road section), then decreases gradually, and becomes Rm (the minimum radius of curvature within the curve) at the start point Cs of the constant curvature radius section Zit. After that, the radius of curvature is maintained at Rm up to the end point Ce of the constant curvature radius section Zit, then increases gradually, and becomes infinite at the curve end point Cd (that is, the start point of the next straight road section). When the vehicle travels along this curve at a constant vehicle speed, the turning state quantity (e.g., lateral acceleration) starts to increase from "0 (straight traveling)" at the curve start point Ci, increases generally proportionally in the approaching transition curve section Zci, and assumes a constant value (maximum value) in the constant curvature radius section Zit. After that, the turning state quantity decreases generally proportionally in the departing transition curve section Zcd, and becomes "0 (straight traveling)" at the curve end point Cd.

In general, "deceleration control" which decelerates the vehicle in a curve becomes necessary at a point before and near the start point Cs of the constant curvature radius section Zit of the curve in which the radius of curvature becomes small. When the vehicle passes through this point, in many cases, the vehicle tends to exhibit a steering characteristic of under steering, the degree of which is however lower than a level above which "stabilization control" which stabilizes the turning state of the vehicle must be performed.

(Outline of Adjustment of Deceleration Control and Stabilization Control)

The adjustment of the deceleration control and the stabilization control performed by the present apparatus will be described with reference to FIG. 4.

First, curve information acquisition means A1 acquires pieces of information Rc, Pc (position Pc and curve curvature radius Rc at that position) regarding a curve located ahead of the vehicle. The curve information Rc, Pc is stored in a map information database of the storage section MAP. As the curve information, a position Pc (e.g., information representing the latitude and longitude of that position) and the curvature radius Rc of the curve at that position Pc are directly stored. Alternatively, a form (e.g., an arithmetic expression and coefficients) which can compute the position Pc and the curvature radius Rc may be stored as the curve information.

Vehicle position acquisition means A2 acquires the present position Pvh of the vehicle. The vehicle position Pvh is detected by use of the global positioning system GPS.

Target vehicle speed computation means A3 computes, on the basis of the curve information Rc, Pc and the vehicle position Pvh, a target vehicle speed Vt at which the vehicle can stably pass through a curve under consideration.

Deceleration control target value computation means A4 compares the target vehicle speed Vt and a vehicle speed Vx acquired by vehicle speed acquisition means A5, and calculates a target value Gst for deceleration control (a target value for wheel braking, and a target value for braking torque). At that time, the deceleration control target value computation means A4 judges the deceleration control target value Gst in consideration of a determination result (control flag) So computed by execution judgment means A9 to be described later. When the determination result So permits execution of the deceleration control (when the determination result So is in a permission state (So=1), the computed deceleration control target value Gst is output as is to target value adjustment means A11 to be described later. Meanwhile, the determination result So prohibits (denies) execution of the deceleration control (when the determination result So is in a prohibition state (So=0), "0 (non-execution of control)" is output to the target value adjustment means A11 as the deceleration control target value Gst.

Notably, the "prohibition state" is also called a "disabling state," and means a state in which the function of the deceleration control executed by the wheel brake control unit ECU1 within the electronic control unit ECU is disabled (this state will be referred to as the "disabled sate"). For example, in the "prohibition state," "O" is output as a control quantity (target quantity) for the deceleration control. The "permission state" is also called an "enabling state," and means a state in which the function of the deceleration control is enabled (this state will be referred to as the "enabled sate"). In the "permission state," the control quantity (target quantity) for the deceleration control is output as is.

Actual turning state quantity acquisition means A6 acquires an actual yaw motion state quantity (actual turning state quantity Ta) of the vehicle. The actual turning state quantity Ta is a yawing motion state quantity actually generated in the vehicle. Examples of the actual turning state quantity Ta include actual yaw rate Yr, actual lateral acceleration Gy, actual vehicle body slip angle βa, and actual vehicle body slip angular velocity dβa. Alternatively, a value obtained by combining two or more of the above-mentioned state quantities may be used as the actual turning state quantity Ta.

Target turning state quantity acquisition means A7 acquires a target yaw motion state quantity (target turning state quantity Td) of the vehicle. A value of the same dimension corresponding to the actual turning state quantity Ta (target yaw rate Yrd, target lateral acceleration Gyd, target vehicle body slip angle βd, and target vehicle body slip angular velocity dβd) is computed as the target turning state quantity Td. The target turning state quantity Td is computed on the basis of the vehicle speed Vx and the steering wheel angle θsw (or the front wheel steering angle δf).

Steering characteristic computation means A8 computes the steering characteristic of the vehicle (under steering, neutral steering, over steering) on the basis of the actual turning state quantity Ta and the target turning state quantity Td, and outputs the computation result (steering characteristic value) Sch. The steering characteristic value Sch is a value which represents the steering characteristic of the vehicle. The deviation (=Td−Ta) between the target turning state quantity Td and the actual turning state quantity Ta can be used as the steering characteristic value Sch. In this case, when under steering tends to occur, the steering characteristic value Sch is computed to have a large positive value. The steering characteristic can be computed on the basis of the actual turning state quantity Ta only without use of the target turning state quantity Td. For example, the steering characteristic value Sch can be computed on the basis of the actual vehicle body slip angular velocity dβa, the actual vehicle body slip angle βa, etc.

Execution judgment means A9 decides, on the basis of the steering characteristic value Sch, the result of determination as to whether execution of the deceleration control is to be permitted or prohibited, and outputs the determination result (control flag) So. Notably, the execution judgment means A9 may perform final determination as to whether execution of the deceleration control is to be permitted or prohibited, on the basis of not only the determination result (control flag) So based on the steering characteristic value Sch, but also other determination results (control flags Sy, Sd, Ss, Sm). These will be described later. First, description will be continued for the case where the execution judgment means A9 performs the final determination on the basis of the determination result (control flag) So only.

In this case, when Sch<Sc1 (predetermined value) (when the vehicle is not in the tendency of under steering), in order to prohibit execution of the deceleration control, the determination result is set to a prohibition state (So=0). This determination is made on the basis of the thought that "in a stage in which the steering characteristic value is small, the possibility of the vehicle actually traveling in a curve may be low (accordingly, the reliability of the curve information may be low)." As a result, as described above, "0" is output to the target value adjustment means A11 as the deceleration control target value Gst.

Meanwhile, when Sch≥Sc1 (predetermined value) (when the vehicle is in the tendency of under steering), in order to permit execution of the deceleration control, the determination result is set to a permission state (So=1). The predetermined value Sc1 is a threshold for determining whether or not the vehicle is in the tendency of under steering. This determination is made on the basis of the thought that "in a stage in which the steering characteristic value is large, the probability that the vehicle is in the tendency of under steering and actually travels in a curve may be high (accordingly, the reliability of the curve information may be high)." As a result, the value computed through comparison between the target vehicle speed Vt and the vehicle speed Vx is output as is to the target value adjustment means A11 as the deceleration control target value Gst.

Stabilization control target value computation means A10 computes a target value Est for stabilization control (a target value for wheel braking, and a target value for braking torque) on the basis of the steering characteristic value Sch. Stabilization control is a well known control for suppressing under steering and over steering of the vehicle.

Target value adjustment means A11 adjusts the deceleration control target value Gst and the stabilization control target value Est, and computes a braking control target value Bt. As will be described in detail later, the condition for starting the stabilization control is Sch>Sc2 (predetermined value). Here, Sc2>Sc1. Therefore, when Sch<Sc1, none of the deceleration control and the stabilization control is executed. Therefore, "0 (non-execution of control)" is output to wheel brake control means A12 as the braking control target value Bt. When Sc1≤Sch≤Sc2, only the deceleration control can be executed. Therefore, the deceleration control target value Gst is output to the wheel brake control means A12 as the braking control target value Bt. When Sch>Sc2 (predetermined value), both the deceleration control and the stabilization control can be executed. Therefore, a value obtained through adjustment of the deceleration control target value Gst and the stabilization control target value Est is output to the wheel brake control means A12 as the braking control target value Bt.

The wheel brake control means A12 controls an actual braking control quantity (e.g., braking pressure) Ba on the basis of the braking control target value Bt. For example, publicly known means composed of a pump, an electric motor, solenoid valves, etc. can be used as the wheel brake control means A12.

This actual braking control quantity (e.g., braking pressure) Ba is output to wheel brake means A13, whereby braking forces are applied to the wheels. Publicly known means composed of a caliper, a rotor, pads, etc. can be used as the wheel brake means A13.

As described above, the execution judgment means A9 may perform the final determination on the basis of not only the determination result (control flag) So based on the steering characteristic value Sch, but also other determination results (control flag Sy, Sd, Ss, Sm). Through performance of a plurality of determination computations as described above, the accuracy in determining whether execution of the deceleration control is to be permitted or prohibited can be improved. This case will be described later.

(Computation of the Target Vehicle Speed Vt)

Next, the detail of the computation of the target vehicle speed Vt performed by the target vehicle speed computation means A3 (see FIG. 4) will be described with reference to FIG. 5.

First, in a proper vehicle speed computation block B1, a proper vehicle speed Vqo at which the vehicle can properly pass through the curve is computed. Specifically, the curvature radius Rm of a section of the curve in which the radius of curvature becomes constant (the constant curvature radius section Zit) is judged on the basis of the curve information Rc, Pc, and the proper vehicle speed Vqo is computed on the basis of the curvature radius Rm. The minimum curvature radius within the curve may be used as the curvature radius Rm. The greater the curvature radius Rm, the greater the computed value of the proper vehicle speed Vqo. With this computation, the proper vehicle speed Vqo is judged so that the vehicle can pass through the curve with a generally constant lateral acceleration, irrespective of the curvature radius Rm.

Furthermore, the proper vehicle speed Vqo may be adjusted on the basis of at least one of uphill/downhill grade Kud, road width Wrd, front visibility Msk, and vehicle speed Vx. When the uphill/downhill grade Kud indicates that the road is downhill, the proper vehicle speed Vqo is adjusted to a smaller value as compared with the case where the road is horizontal. When the uphill/downhill grade Kud indicates that the road is uphill, the proper vehicle speed Vqo is adjusted to a larger value as compared with the case where the road is horizontal. When the road width Wrd is small, the proper vehicle speed Vqo is adjusted to a smaller value as compared with the case where the road width Wrd is large. When the road width Wrd is large, the proper vehicle speed Vqo is adjusted to a larger value as compared with the case where the road width Wrd is small. When the front visibility Msk is poor, the proper vehicle speed Vqo is adjusted to a smaller value as compared with the case where the visibility Msk is good. When the front visibility Msk is good, the proper vehicle speed Vqo is adjusted to a larger value as compared with the case where the visibility Msk is poor. When the vehicle speed Vx is high, the proper vehicle speed Vqo is adjusted to a smaller value as compared with the case where the vehicle speed Vx is low. When the vehicle speed Vx is low, the proper vehicle speed Vqo is adjusted to a larger value as compared with the case where the vehicle speed Vx is high.

The proper vehicle speed Vqo may be adjusted on the basis of road surface friction coefficient μmax. In this case, when the road surface friction coefficient μmax is large, the proper vehicle speed Vqo is adjusted to a larger value as compared with the case where the road surface friction coefficient μmax is small. When the road surface friction coefficient μmax is small, the proper vehicle speed Vqo is adjusted to a smaller value as compared with the case where the road surface friction coefficient μmax is large.

Computation of the road surface friction coefficient μmax is performed on the basis of the self aligning torque Sat of the wheels obtained by the self aligning torque sensor ATf*. In a process in which the lateral forces of the wheels increase, the self aligning torque Sat also increases. In this process, the self aligning torque Sat reaches the maximum value before the vehicle enters a state in which the lateral forces become saturated (that is, a turning limit state). Therefore, the road surface friction coefficient μmax can be estimated before the turning of the vehicle reaches the limit.

For the detection of the self aligning torque Sat, one of publicly known methods disclosed in, for example, Japanese Patent Application Laid-Open (kokai) Nos. 2008-24073, 2007-245901, 2004-233331, etc. can be used. Furthermore, for the computation of the road surface friction coefficient μmax based on the self aligning torque, one of publicly known methods disclosed in, for example, Japanese Patent Application Laid-Open (kokai) No. 2007-245901, etc. can be used.

In a reference point setting computation block B2, a reference point Pcr is judged. The reference point Pcr refers to a target point before which the vehicle speed is decreased to the proper vehicle speed Vqo by means of the deceleration control. The reference point Pcr can be set at the entrance point Cs of the curve at which the radius of curvature becomes constant (a point within the constant curvature radius section closest to the vehicle). Alternatively, the point Cs within the curve at which the radius of curvature becomes the minimum may be set as the reference point Pcr. The point Cs is judged on the basis of the curve shape Rc and the curve position Pc.

The point Pcr can be set such that it coincides with the entrance point Cs of the constant curvature radius section or a point shifted toward the vehicle from the point of the minimum radius of curvature by a distance Lpr (in the vicinity of an end portion of a transition curve corresponding to an approaching portion to the curve closer to the vehicle). The distance Lpr may be a constant value.

Alternatively, the distance Lpr may be computed in accordance with the vehicle speed Vx. In this case, specifically, when the vehicle speed Vx is equal to or less than a predetermined value V1, the distance Lpr is set to "0" (that is, the point Pcr coincides with Cs); and, when Vx>V1 (predetermined value), the distance Lpr is set to increase from "0" with an increase in the vehicle speed Vx from V1. Alternatively, the distance Lpr may be judged by use of the proper vehicle speed Vqo in place of the vehicle speed Vx.

In this case, the point Pcr is set such that it coincides with a point on the curve shifted from the point Cs toward the curve start point Ci by the distance Lpr. That is, the point Pcr is set on the basis of the distance Lpr, the curve shape Rc, and the point Cs (curve position Pc).

As described above, the point Pcr is a target point which is used to decrease the vehicle speed to the proper vehicle speed Vqo. In some cases, the map information, etc. contain errors. Such errors can be eliminated by means of setting the point Pcr such that it coincides with a point shifted from the point Cs toward the curve entrance Ci by the distance Lpr. That is, within the curve, the vehicle speed control is started a little early, whereby the vehicle speed can be decreased to the proper vehicle speed Vqo without fail at a point on the curve shifted from the point Pcr toward the curve entrance Ci.

In a target vehicle speed computation block B3, the target vehicle speed Vt is computed. A target vehicle speed computation characteristic Vtch for determining the target vehicle speed Vt at the vehicle position Pvh (Vt[Pvh]) is judged on the basis of the reference point Pcr and the proper vehicle speed Vqo. The judged target vehicle speed computation characteristic Vtch is such that the vehicle speed decreases at a deceleration Gm (e.g., a previously set constant) from the curve entrance to the reference point Pcr, and becomes the proper vehicle speed Vqo at the reference point Pcr. The deceleration Gm may be set to a value judged in consideration of a typical friction coefficient of wet road surface.

The deceleration Gm can be adjusted on the basis of the road surface friction coefficient μmax. Specifically, the deceleration Gm is adjusted such that the greater the road surface friction coefficient μmax, the greater the value of the deceleration Gm. The target vehicle speed Vt at the vehicle position Pvh is computed by means of inputting the vehicle position Pvh into the target vehicle speed computation characteristic Vtch, judged on the basis of the reference point Pcr and the proper vehicle speed Vqo. The target vehicle speed Vt computed in this manner is output to the deceleration control target value computation means A4 (see FIG. 4).

(Computation of the Deceleration Control Target Value Gst)

Figure 6:
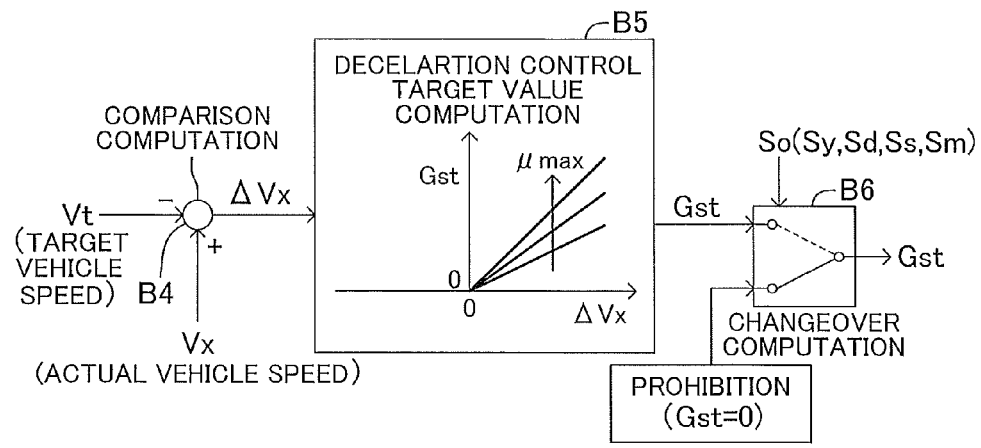
FIG. 6 is a functional block diagram for describing the computation of a deceleration control target value performed by the deceleration control target value computation means shown in FIG. 4.

Next, the details of the computation of the deceleration control target value Gst performed by the deceleration control target value computation means A4 (see FIG. 4) will be described with reference to FIG. 6.

First, in a comparison computation block B4, a deviation ΔVx (=Vx−Vt) between the current actual vehicle speed Vx and the target vehicle speed Vt is computed.

In a deceleration control target value computation block B5, the deceleration control target value Gst is computed on the basis of the vehicle speed deviation ΔVx. Specifically, the deceleration control target value Gst is computed such that the greater the deviation ΔVx (>0), the greater the computed deceleration control target value Gst, and such that, when the deviation ΔVx is negative, the deceleration control target value Gst becomes "0." That is, when the vehicle speed Vx is greater than the target vehicle speed Vt (Vx>Vt), the deceleration control is executed; and, when the vehicle speed Vx is smaller than the target vehicle speed Vt (Vx<Vt), the deceleration control is not executed.

The deceleration control target value Gst can be adjusted on the basis of the road surface friction coefficient μmax.

Specifically, the deceleration control target value Gst is adjusted such that the greater the road surface friction coefficient μmax, the greater the value to which the deceleration control target value Gst is adjusted.

The deceleration control target value Gst computed in the block B5 as described above is output to a changeover computation block B6. In the changeover computation block B6, one of the deceleration control target value Gst output from the block B5 and a target value "0" which represents prohibition of the deceleration control is selected on the basis of the determination result (control flag) So output from the execution judgment means A9. The selected value is output as a final deceleration control target value Gst. That is, in the case where the determination result (control flag) So is in the prohibition state (So=0), even when the deviation ΔVx assumes a positive value, "0" is output as the final deceleration control target value Gst. Meanwhile, in the case where the determination result (control flag) So is in the permission state (So=1), the deceleration control target value Gst computed in the block B5 is output as is as the final deceleration control target value Gst. The final deceleration control target value Gst computed/selected in this manner is output to the target value adjustment means A11 (see FIG. 4).

Notably, in the case where the execution judgment means A9 performs the final determination on the basis of not only the determination result (control flag) So based on the steering characteristic value Sch, but also other determination results (control flags Sy, Sd, Ss, and Sm, which will be described later), in the changeover computation block B6, the final deceleration control target value Gst is computed/selected on the basis of the final determination result of the execution judgment means A9.

(Execution Judgment Computation and Computation of the Stabilization Control Target Value)

Figure 7:
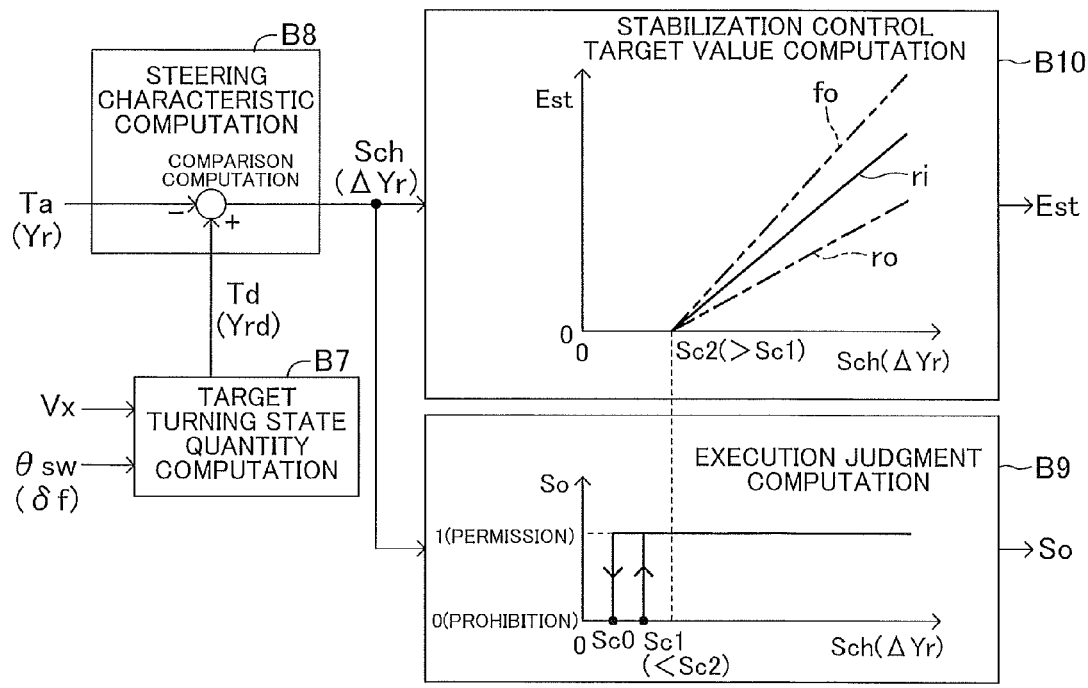
FIG. 7 is a functional block diagram for describing the computation of a determination result performed by the execution judgment means shown in FIG. 4, and computation of a stabilization control target value by the stabilization control target value computation means shown in FIG. 4.

Next, the computation of the determination result (control flag) So performed by the execution judgment means A9 (see FIG. 4) and the computation of the stabilization control target value Est performed by the stabilization control target value computation means A10 (see FIG. 4) will be described in detail with reference to FIG. 7.

First, in a target turning state computation block B7, a target yawing motion state quantity (target turning state quantity) Td of the vehicle is computed. A physical quantity of the same dimension corresponding to an actually generated yawing motion state quantity (actual turning state quantity) Ta is computed as the target turning state quantity Td. For example, in the case where the turning state quantity is yaw rate, a target yaw rate Yrd is computed as the target turning state quantity Td. The target yaw rate Yrd is computed by the following expression.

$$Yrd=(Vx \cdot \theta sw)/[SG \cdot L \cdot (1+Kh \cdot Vx^2)]$$

In this expression, Kh is a stability factor, L is a wheel base of the vehicle, and SG is a steering gear ratio of the vehicle.

In a steering characteristic computation block B8, the target turning state quantity Td is compared with the actual turning state quantity Ta of the same dimension corresponding to the target turning state quantity Td, whereby the steering characteristic of the vehicle is computed. The deviation (Sch=Td−Ta) between the target turning state quantity Td and the actual turning state quantity Ta may be computed as the steering characteristic value Sch.

When the steering characteristic value Sch is approximately "0," the vehicle exhibits neutral steering. When Sch<0, the vehicle exhibits over steering, and the degree of the over steering increases with the absolute value of the steering characteristic value Sch. Meanwhile, when Sch>0, the vehicle exhibits under steering, and the degree of the under steering increases with the steering characteristic value Sch.

In the case where the steering characteristic value Sch is computed by making use of the yaw rate, the steering characteristic is judged on the basis of the deviation ΔYr (=Yrd−Yr) between a target yaw rate Yrd and the actual yaw rate Yr detected by the yaw rate sensor YR. The steering characteristic is as follows. When the yaw rate deviation ΔYr is approximately "0," the vehicle exhibits neutral steering. When ΔYr<0, the vehicle exhibits over steering, and the degree of the over steering increases with the absolute value of the deviation ΔYr. When ΔYr>0, the vehicle exhibits under steering, and the degree of the under steering increases with the deviation ΔYr.

In an execution judgment computation block B9, a determination is made as to whether execution of the deceleration control is to be permitted or prohibited. In a process in which the steering characteristic is changing from neutral steering to under steering (accordingly, in a process in which Sch is increasing), in a stage in which the steering characteristic value Sch (or the yaw rate deviation ΔYr) is smaller than a (previously set) predetermined value Sc1, the determination result (control flag) So is set to the prohibition state (So=0) in order to prohibit execution of the deceleration control. Meanwhile, in a stage after the steering characteristic value Sch (or the yaw rate deviation ΔYr) has become equal to or greater than the predetermined value Sc1, the determination result (control flag) So is changed from the prohibition state (So=0) to the permission state (So=1) in order to permit execution of the deceleration control. These determinations are based on the thought that "the possibility of the vehicle actually traveling in a curve may be low (accordingly, the reliability of the curve information may be low) in a stage in which the steering characteristic value is small, and the possibility that the vehicle exhibits under steering and actually travels in a curve may be high (accordingly, the reliability of the curve information may be high) in a stage in which the steering characteristic value is large.

In contrast, in a process in which the steering characteristic is changing from under steering to neutral steering (accordingly, in a process in which Sch is decreasing), in a stage in which the steering characteristic value Sch (or the yaw rate deviation ΔYr) is equal to or greater than a (previously set) predetermined value Sc0, the determination result (control flag) So is maintained in the permission state (So=1). Meanwhile, in a stage after the steering characteristic value Sch (or the yaw rate deviation ΔYr) has become smaller than the predetermined value Sc0, the determination result (control flag) So is changed from the permission state (So=1) to the prohibition state (So=0). Here, a relation Sc0<Sc1 is present between the predetermined values Sc0 and Sc1. By virtue of this relation, it is possible to prevent occurrence of hunting of the determination result (control flag) So as to whether to permit or prohibit execution of the deceleration control. The predetermined value Sc1 is set to be smaller than a predetermined value Sc2, which will be described later.

In a stabilization control target value computation block B10, the stabilization control target value Est is computed on the basis of the steering characteristic value Sch (or the yaw rate deviation ΔYr). Specifically, when the steering characteristic value Sch (or the yaw rate deviation ΔYr) is equal to or smaller than the (previously set) predetermined value Sc2, the stabilization control target value Est is computed to be "0." That is, a relation Sch>Sc2 is a condition for starting the stabilization control.

The stabilization control target value Est is individually judged for each wheel so as to maintain a proper steering characteristic, while suppressing excessive under steering or excessive over steering of the vehicle. Here, "fo" represents the stabilization control target value Est for a front wheel located on the outer side of a turning locus, "ro" represents that for a rear wheel located on the outer side of the turning locus, and "ri" represents that for a rear wheel located on the inner side of the turning locus. These values are judged such that the vehicle is decelerated, and a proper yawing moment is applied to the vehicle.

As described above, the predetermined value Sc2 is set to be greater than the predetermined value Sc1. Accordingly, in a process in which the steering characteristic is changing from neutral steering to under steering (accordingly, Sch is increasing) after the vehicle has entered the curve (in a period in which the vehicle is traveling in the approaching transition curve section Zci), first, the deceleration control can be started. In the case where the under steering is eliminated through execution of the deceleration control, the stabilization control is not started. Meanwhile, in the case where the under steering is not eliminated through execution of the deceleration control, the stabilization control is started and executed. Since the deceleration control is started and executed earlier than and preferentially over the stabilization control, it is possible to prevent the stabilization control from unnecessarily being started.

(Computation of the Braking Control Target Value Bt)

Figure 8:
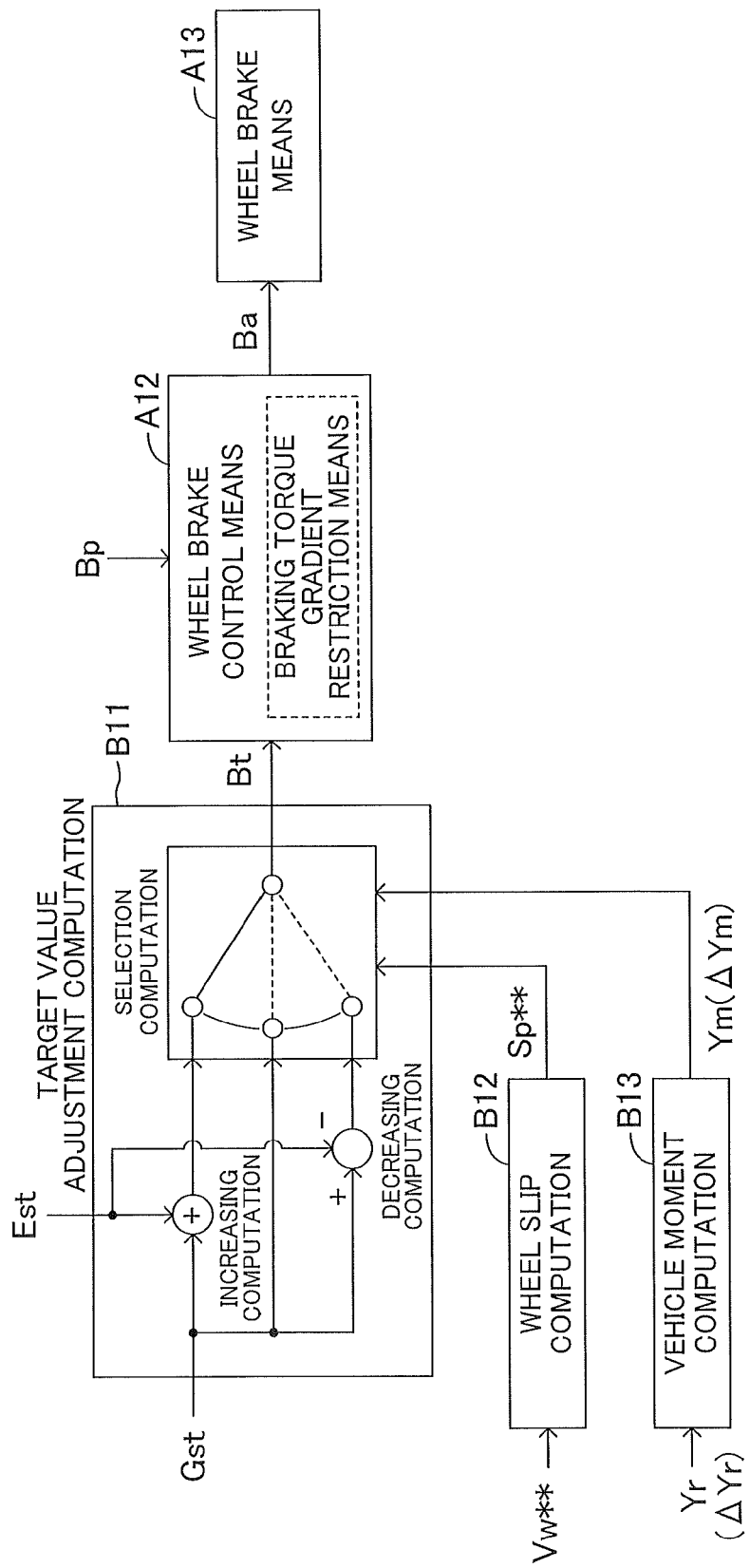
FIG. 8 is a functional block diagram for describing the computation of a braking control target value performed by the target value adjustment means shown in FIG. 4.

Next, the details of the computation of the braking control target value Bt performed by the target value adjustment means A11 (see FIG. 4) will be described with reference to FIG. 8.

As described above, when Sch<Sc1, none of the deceleration control and the stabilization control is executed, and Gst and Est become 0. When Sc1≤Sch≤Sc2, only the deceleration control is executed, Gst becomes equal to the value computed in the deceleration control target value computation block B5 (see FIG. 6), and Est becomes 0. When Sch>Sc2, both the deceleration control and the stabilization control are executed, Gst becomes equal to the value computed in the deceleration control target value computation block B5, and Est becomes equal to the value computed in the stabilization control target value computation block B10 (see FIG. 7).

Target value adjustment means B11 adjusts the deceleration control target value Gst and the stabilization control target value Est to thereby judge the braking control target value Bt. In principle, the braking control target value Bt is computed by means of "increasing computation"; i.e., adding the stabilization control target value Est to the deceleration control target value Gst. However, as described below, in the case where a wheel slip Sp** becomes excessive or a moment (yawing moment) acting on the vehicle is insufficient, the deceleration control target value Gst and the stabilization control target value Est are adjusted by means of "selection computation."

Specifically, in the case where the wheel slip Sp of a certain wheel computed in a wheel slip computation block B12 on the basis of the wheel speed Vw detected by the wheel speed sensor WS** becomes excessive ("*" suffixed to the symbols represents each of the wheels to which the symbols relate. "fl" represents the front left wheel, "fr" represents the front right wheel, "rl" represents the rear left wheel, and "rr" represents the rear right wheel), the braking torque applied to that wheel cannot be increased. In such a case, for that wheel, the deceleration control target value Gst is output as is to the wheel brake control means A12 as the braking control target value Bt. Furthermore, in the case where the yawing moment Ym (or yawing moment deviation ΔYm) computed in a vehicle moment computation block B13 on the basis of the yaw rate Yr (or yaw rate deviation ΔYr) is insufficient, in order to generate a proper vehicle moment, a value obtained by means of "decreasing computation"; i.e., subtracting the stabilization control target value Est from the deceleration control target value Gst is output to the wheel brake control means A12 as the braking control target value Bt.

The wheel brake control means A12 controls the actual braking torque Ba (braking pressure) applied to the wheel brake means A13 on the basis of the braking control target value Bt. In the wheel brake control means A12, when the actual braking torque Ba is controlled, an amount Bp by which the driver operates a brake operation member is taken into consideration. Furthermore, in order to suppress a sharp change in vehicle acceleration, braking torque time gradient restriction means imposes a restriction on the changing gradient of the braking torque with respect to time. Specifically, the increase gradient of Ba with respect to time is restricted to a predetermined value Lwc, and the decrease gradient of Ba with respect to time is restricted to a predetermined value Lwd. Notably, the deceleration control may be executed by making use of deceleration, which can be adjusted by use of down shift of the automatic transmission TM, in place of wheel braking.

(Operation Example)

Next, an example case in which the deceleration control is started and executed by the present apparatus will be described with reference to FIG. 9.

At a point e1, Vx becomes greater than Vt, and a vehicle speed deviation ΔVx (=Vx−Vt>0) is generated. However, at the point e1, the steering characteristic value Sch is "0" and smaller than the predetermined value Sc1. Therefore, the determination result (control flag) So is maintained in the prohibition state (So=0). Accordingly, despite that ΔVx>0 (that is, the deceleration control start condition is satisfied) after the point e1, the deceleration control target value Gst is maintained at "0." That is, the deceleration control is not started, and the actual braking torque (braking pressure) Ba is also maintained at "0." Notably, a chain line represents a change in Ba in the case where the determination result (control flag) So is assumed to be maintained in the permission state (So=1).

At a point e2, the vehicle enters the curve (passes through the curve start point Ci), and the steering characteristic value Sch starts to increase from "0." Subsequently, at a point e3, the steering characteristic value Sch becomes equal to or greater than the predetermined value Sc1. As a result, at the point e3, the determination result (control flag) So is changed from the prohibition state (So=0) to the permission state (So=1). Accordingly, at the point e3, the deceleration control target value Gst is switched to a value (>0) computed on the basis of ΔVx. That is, the deceleration control is started, and application of the actual braking torque Ba (>0) is started. As a result, the vehicle starts deceleration.

As described above, the time gradient restriction Lwc is imposed on increase of the braking torque. Therefore, even when the deceleration control is started suddenly, the actual braking torque (braking pressure) Ba does not increase sharply, and the vehicle is not decelerated sharply.

At a point e4, the steering characteristic value Sch becomes smaller than the predetermined value Sc0 (<the predetermined value Sc1). As a result, at the point e4, the determination result (control flag) So is changed from the permission state (So=1) to the prohibition state (So=0). Accordingly, at the point e4, the deceleration control target value Gst is again switched to "0," whereby the deceleration control ends.

As described above, the time gradient restriction Lwd is imposed on decrease of the braking torque. Therefore, even when the deceleration control is ended suddenly, the actual braking torque (braking pressure) Ba does not decrease sharply, and the vehicle deceleration does not decreases sharply.

Figure 9:
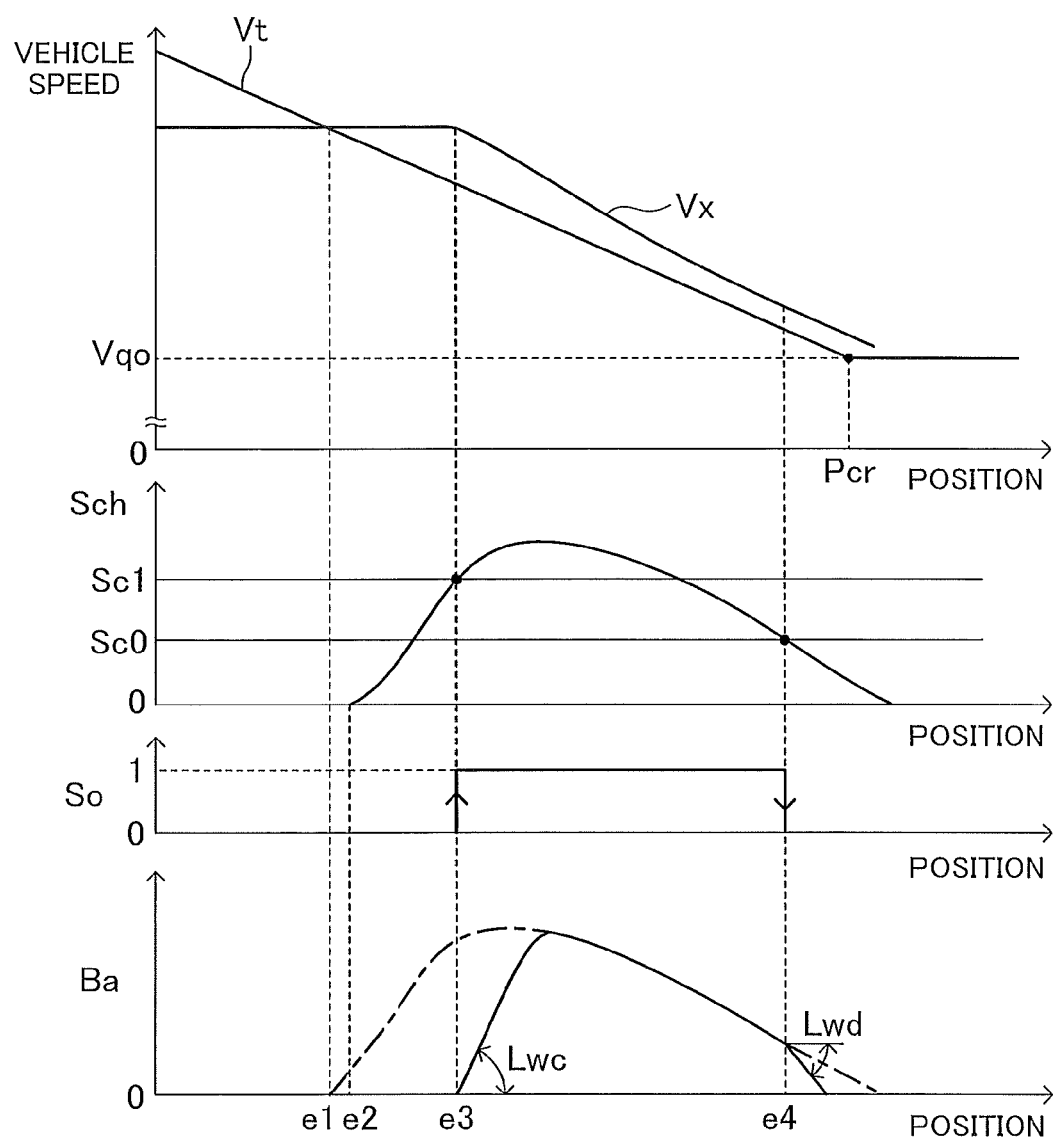
FIG. 9 is a time chart showing an example case where deceleration control is executed by the traveling control apparatus shown in FIG. 1.

In the example shown in FIG. 9, the condition of Vx>Vt (the deceleration control start condition) is first satisfied, and the deceleration control is then started as a result of the determination result (control flag) So being changed from the prohibition state (So=0) to the permission state (So=1). However, in some cases, the determination result (control flag) So is first changed from the prohibition state (So=0) to the permission state (So=1), and the condition of Vx>Vt (the deceleration control start condition) is then satisfied, whereby the deceleration control is started.

As shown in FIG. 9, in the present apparatus, the deceleration control is started when the steering characteristic value Sch reaches a value indicating the tendency of under steering, as a result of the curvature radius Rc of the curve decreasing gradually after the vehicle has entered the curve. Accordingly, the deceleration control is not executed in the case where the steering characteristic value Sch does not reach the value indicating the tendency of under steering, because the shape of the curve is changed by renovation or the like of the road (e.g., a curved section is changed to a straight section). That is, the deceleration control is prevented from being unnecessarily started and executed on the basis of curve information whose reliability is low.

As described above, according to the traveling control apparatus for a vehicle according to the first embodiment of the present invention, after the vehicle is assumed to have entered a curve, the deviation between the target turning state quantity Td and the actual turning state quantity Ta (the steering characteristic value Sch) is computed. In the case where Sch does not reach the predetermined value Sc1 after the vehicle is assumed to have entered the curve, the possibility of the vehicle traveling in the curve is judged to be low, and the reliability of the curve information Rc, Pc is judged to be low. In such a case, a determination (So=0) for prohibiting execution of the deceleration control is made. Meanwhile, in the case where Sch has reached the predetermined value Sc1, the possibility of the vehicle traveling in the curve is judged to be high, and the reliability of the curve information Rc, Pc is judged to be high. In such a case, a determination (So=1) for permitting execution of the deceleration control is made. The deceleration control is started and executed only when the control start condition (Vx>Vt) is satisfied, and execution of the deceleration control is permitted (So=1). Accordingly, even when the control start condition is satisfied, the deceleration control is not started if execution of the deceleration control is prohibited (So=0).

Therefore, the deceleration control can be executed on the basis of only curve information whose reliability is sufficiently high. In other words, it is possible to prevent the deceleration control from unnecessarily being started and executed on the basis of curve information which is low in reliability. For example, in the case where the acquired curve information Rc, Pc and the actual shape of the curve differ because of renovation of the curve in the vicinity of the curve entrance (in particular, renovation to change a curved section to a straight section), the deceleration control, which should not be started, can be prohibited from being started.

In general, a point at which start of the deceleration control is requested after the vehicle has entered the curve is a point before and near the start point Cs of the constant curvature radius section Zit of the curve where the radius of curvature decreases. Accordingly, by means of setting the predetermined value Sc1 to a value similar to the steering characteristic value Sch at the time when the vehicle passes through this point, the point at which the deceleration control is started can be made a proper point.

Even after the deceleration control is started within the curve, the computation of the steering characteristic value Sch is continued. As a result, when the steering characteristic value Sch becomes smaller than the predetermined value Sc0 (<Sc1), the determination result is changed from the permission state (So=1) to the prohibition state (So=0), whereby the deceleration control which is being executed is interrupted. For example, in the case where renovation is not performed in the vicinity of the curve entrance but renovation is performed from a mid point of the curve, when the vehicle passes through the vicinity of the curve entrance, the determination result is brought into the permission state (So=1), whereby the deceleration control is started. However, when the vehicle passes through the mid point of the curve, the determination result is changed from the permission state (So=1) to the prohibition state (So=0), whereby the deceleration control which is being executed can be stopped.

The present invention is not limited to the above-described first embodiment, and various modifications can be employed within the scope of the present invention. For example, in the above-described first embodiment, the execution judgment means A9 makes the final determination on the basis of only the determination result (control flag) So based on the steering characteristic value Sch. However, the embodiment may be modified such that the execution judgment means A9 makes the final determination; i.e., outputs the final determination result (control flag Sfin) on the basis of not only the determination result (control flag) So based on Sch, but also other determination results (control flags Sy, Sd, Ss, Sm).

When the control flag Sfin is "1," it represents that the final determination result of the execution judgment means A9 is the permission state (the state in which execution of the deceleration control is permitted). When the control flag Sfin is "0," it represents that the final determination result of the execution judgment means A9 is the prohibition (the state in which execution of the deceleration control is prohibited). In this case, the operation can be described by replacing "So" with "Sfin" in FIGS. 4 and 6.

Figure 10:
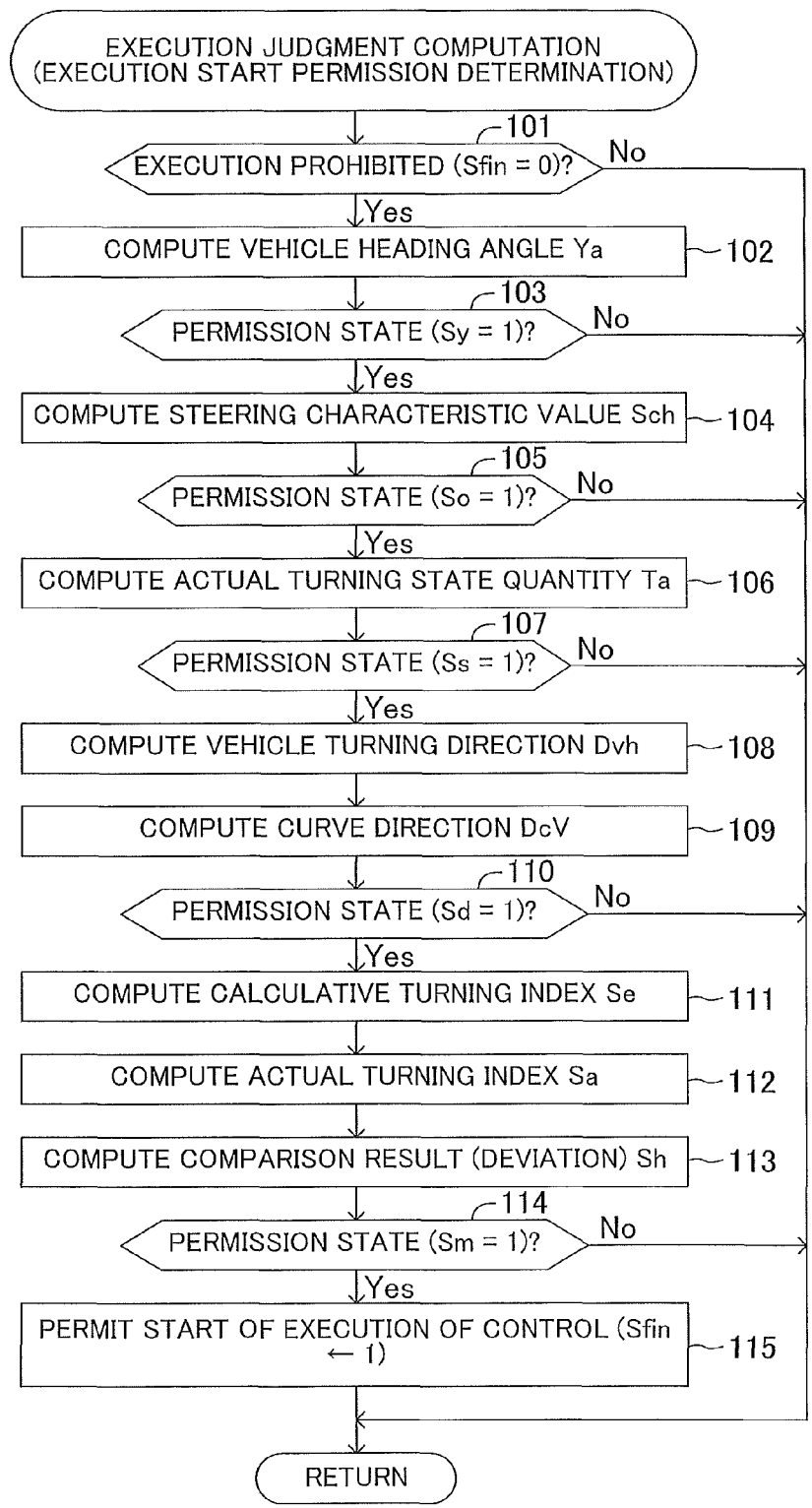
FIG. 10 is a flowchart showing an example of processing which is performed in a traveling control apparatus for a vehicle according to a modification of the first embodiment of the present invention and in which the result of final determination performed by the execution judgment means shown in FIG. 4 is changed from a disabled state to an enabled state on the basis of a plurality of determination computation results.

FIG. 10 is a flowchart showing an example of processing for the case where the control flag Sfin is changed from the prohibition state (Sfin=0) to the permission state (Sfin=1). Notably, the "prohibition state" corresponds to the "disabled state," and the "permission state" corresponds to the "enabled state." A routine corresponding to this flowchart is repeatedly executed at predetermined intervals (e.g., 6 msec).

In step 101, a determination is made as to whether or not execution of the deceleration control is prohibited (Sfin=0). When the result of the determination is "No," the present routine is ended immediately. Here, execution of the deceleration control is assumed to be prohibited (Sfin=0). In this case, the result of the determination in step 101 is "Yes," and, in step 102, the vehicle heading angle Ya is computed. In step 103 subsequent thereto, a determination is made as to whether or not the determination result (control flag) Sy based on Ya is in the permission state (Sy=1). The heading angle Ya refers to an angle of the traveling direction of the vehicle (a direction which the vehicle faces) at the vehicle position, in relation to the direction of the straight section before the curve entrance.

Notably, the "direction of the straight section before the curve entrance" can be judged as follows, for example. A straight section is judged on the basis of changes in the actual turning state quantity within a section of a predetermined distance (e.g., 20 m) through which the vehicle has traveled, and the traveling direction of the vehicle in the judged straight section is recorded as the direction of the straight section before the curve entrance. The predetermined distance is judged in such a manner as to absorb an error of the position of the curve entrance Ci judged on the basis of the map information stored in the storage section MAP, an error of the vehicle position Pvh obtained by use of the global positioning system GPS or the like, and other errors.

Figure 11:
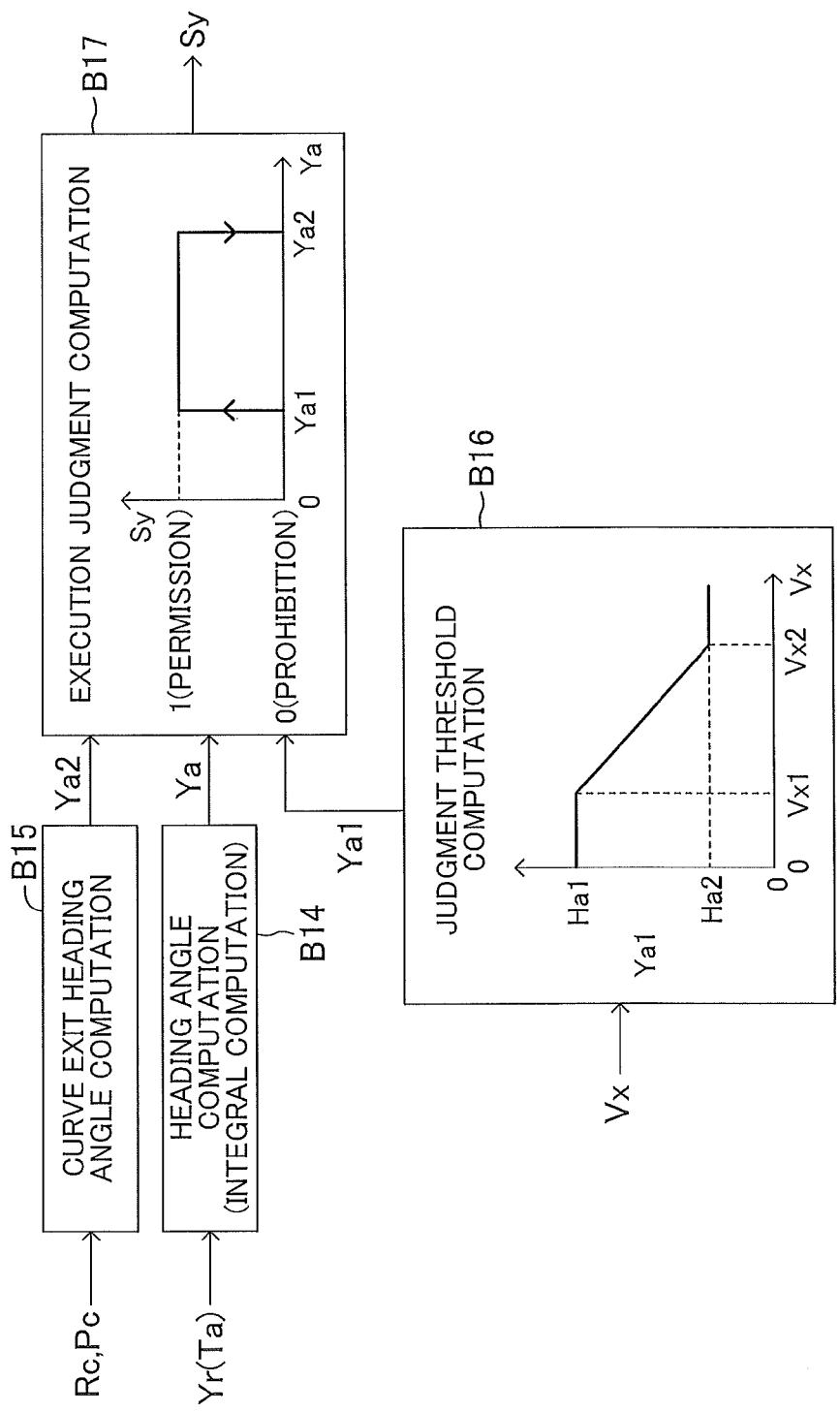
FIG. 11 is a functional block diagram for describing the determination computation on the basis of a heading angle shown in FIG. 10.

The computation of the determination result (control flag) Sy based on Ya (processing of steps 102 and 103) will now be described in detail with reference to FIG. 11. As shown in FIG. 11, in a heading angle computation block B14, the heading angle Ya is computed on the basis of the actual turning state quantity Ta (e.g., the actual yaw rate Yr). For example, the actual yaw rate Yr is acquired as the actual turning state quantity Ta, and the actual yaw rate Yr is integrated (added up) from the curve entrance Ci, whereby the heading angle (yaw angle) Ya is computed.

In a curve exit heading angle computation block B15, a heading angle Ya2 at the curve exit Cd (or the end point Ce of the constant curvature radius section) is computed on the basis of the curve information Rc, Pc. The heading angle Ya2 is the angle of the tangential direction of the curve at the curve exit Cd (or the point Ce) in relation to the direction of the straight section before the curve entrance.

In a judgment threshold computation block B16, a predetermined value Ya1 is computed on the basis of the vehicle speed Vx. Specifically, the predetermined value Ya1 is computed such that, within an upper limit Ha1 and a lower limit Ha2 of the Predetermined value Ya1, the higher the vehicle speed Vx, the smaller the predetermined value Ya1.

In an execution judgment computation block B17, when the heading angle Ya becomes equal to or greater than the predetermined value Ya1, the determination result (control flag) Sy is changed from the prohibition state (Sy=0) to the permission state (Sy=1). Furthermore, when the heading angle Ya becomes equal to or greater than the predetermined value Ya2, the determination result (control flag) Sy is changed from the permission state (Sy=1) to the prohibition state (Sy=0). This determination computation is based on the thought "that, when the heading angle Ya is small (less than Ya1), the possibility of the vehicle actually traveling in the curve is low (accordingly, the reliability of the curve information is low); and, when the heading angle Ya is large (equal to or greater than Ya1), the possibility of the vehicle actually traveling in the curve is high (accordingly, the reliability of the curve information is high)."

As described above, the heading angle Ya is a cumulative value of the actual yaw rate Yr from the curve entrance Ci. Accordingly, even in the case where the position of the vehicle in the width direction of the road changes (the vehicle staggers) after the vehicle has entered the curve, the heading angle Ya can represent the traveling direction of the vehicle as viewed macroscopically. Accordingly, even in the case where a driver takes an out-in-out traveling line, the degree of the reliability of the curve information; i.e., whether to permit or prohibit execution of the deceleration control can be judged reliably from the determination result (control flag) Sy.

As described above, the fact that the "heading angle Ya has become equal to or greater than the predetermined value Ya1" corresponds to the fact that "turning for a curve is detected." Notably, "turning for a curve" may be detected on the basis of not only the computed heading angle but also the detected values (actual values) such as the actual yaw rate and the steering wheel angle, or may be detected by use of an image capturing apparatus such as an on-board camera or a sensor such as a millimeter wave laser radar.

For example, in the case where an image capturing apparatus is used, "turning for a curve" is detected as follows. In general, when a three-dimensional object is recognized through image recognition, the three-dimensional object moves within a screen at a constant speed corresponding to the vehicle speed, and the position of the three-dimensional object in the screen changes. At that time, the three-dimensional object exhibits a certain motion within the screen around a vanishing point. However, when the vehicle turns left or right, a three-dimensional object uniformly moves horizontally within the screen from an end of the screen. Accordingly, "turning for a curve" can be detected through detection of the fact that a three-dimensional object within the screen uniformly moves horizontally from an end of the screen.

Furthermore, in the case where a sensor (in particular, millimeter wave laser radar) is used, like the case where an image capturing device is used, turning can be judged from the "positional relation between a detected object (stationary object) and the vehicle itself" and the "vehicle speed of the vehicle itself." Specifically, when a stationary object is detected while the vehicle is turning, the stationary object moves laterally within the screen and the distance between the stationary object and the vehicle increases. Accordingly, in the case where a stationary object is detected and the detection result shows that the stationary object moves laterally within the screen after that and the distance between the stationary object and the vehicle increases, "turning for a curve" can be detected.

Referring back to FIG. 10, when the result of the determination in step 103 is "NO" (Ya<Ya1), the present routine is ended immediately. Meanwhile, when the result of the determination in step 103 is "Yes" (Ya Ya1), in step 104, the steering characteristic value Sch is computed, and, in step 105 subsequent thereto, a determination is made as to whether or not the determination result (control flag) So based on Sch is in the permission state (So=1). The computation (processing of steps 104 and 105) of the determination result (control flag) So based on Sch is identical with that performed in the blocks B7, B8, and B9 shown in FIG. 7.

When the result of the determination in step 105 is "NO" (Sch<Sc1), the present routine is ended immediately. Meanwhile, when the result of the determination in step 105 is "Yes" (Sch Sc1), in step 106, the actual turning state quantity Ta is computed, and, in step 107 subsequent thereto, a determination is made as to whether or not the determination result (control flag) Ss based on Ta is in the permission state (Ss=1).

Figure 12:
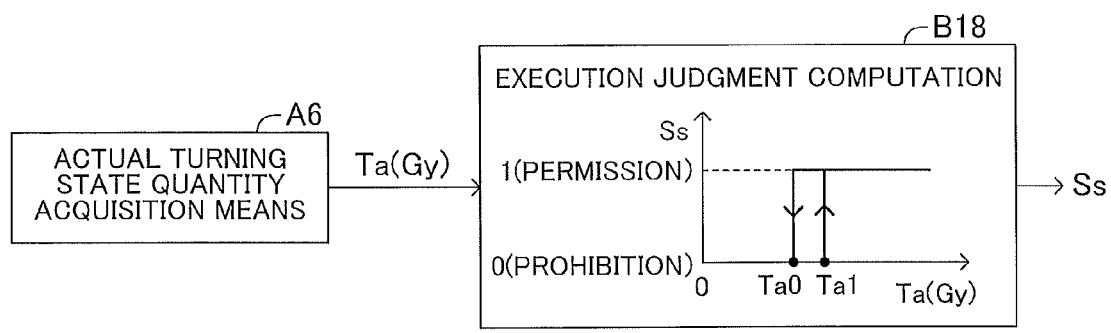
FIG. 12 is a functional block diagram for describing the determination computation on the basis of an actual turning state quantity shown in FIG. 10.

The computation of the determination result (control flag) Ss based on Ta (processing of steps 106 and 107) will now be described in detail with reference to FIG. 12. As shown in FIG. 12, in actual turning state quantity acquisition means A6 (see FIG. 4), the actual turning state quantity Ta (e.g., the actual lateral acceleration Gy, etc.) is obtained.

In an execution judgment computation block B18, in a process in which the actual turning state quantity Ta (e.g., Gy) is increasing, the determination result (control flag) Ss is set as follows. In a stage in which the actual turning state quantity Ta (e.g., Gy) is less than a predetermined value Ta1, the determination result (control flag) Ss is set to the prohibition state (Ss=0). In a stage after the actual turning state quantity Ta (e.g., Gy) has become equal to or greater than the predetermined value Ta1, the determination result (control flag) Ss is changed from the prohibition state (Ss=0) to the permission state (Ss=1). This determination computation is based on the thought "that, when the actual turning state quantity Ta (e.g., Gy) is small (smaller than Ta1), the possibility of the vehicle actually traveling in the curve is low (accordingly, the reliability of the curve information is low); and, when the actual turning state quantity Ta (e.g., Gy) is large (equal to or greater than Ta1), the possibility of the vehicle actually traveling in the curve is high (accordingly, the reliability of the curve information is high)."

Meanwhile, in a process in which the actual turning state quantity Ta (e.g., Gy) is decreasing, the determination result (control flag) Ss is set as follows. In a stage in which the actual turning state quantity Ta (e.g., Gy) is greater than a predetermined value Ta0, the determination result (control flag) Ss is set to the permission state (Ss=1). In a stage after the actual turning state quantity Ta (e.g., Gy) has become equal to or less than the predetermined value Ta0, the determination result (control flag) Ss is changed from the permission state (Ss=1) to the prohibition state (Ss=0). Here, a relation Ta0<Ta1 is present between the predetermined values Ta0 and Ta1. By virtue of this relation, it is possible to prevent occurrence of hunting of the determination result (control flag) Ss as to whether to permit or prohibit execution of the deceleration control.

Referring back to FIG. 10, when the result of the determination in step 107 is "NO" (Ta<Ta1), the present routine is ended immediately. Meanwhile, when the result of the determination in step 107 is "Yes" (Ta Ta1), in step 108, a vehicle turning direction Dvh is computed, and, in step 109 subsequent thereto, a curve direction Dcv is computed. Subsequently, in step 110, a determination is made as to whether or not the determination result (control flag) Sd based on Dvh and Dcv is in the permission state (Sd=1).

Figure 13:
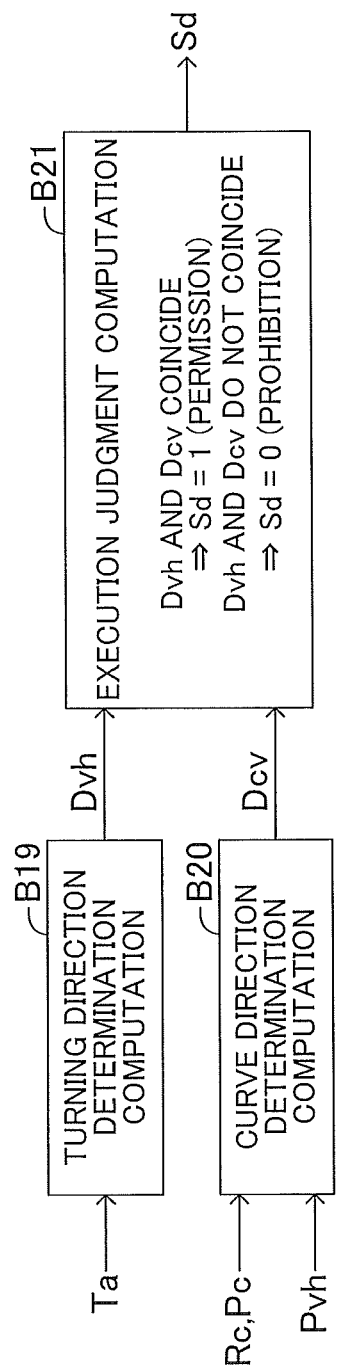
FIG. 13 is a functional block diagram for describing the determination computation trough comparison between a turning direction and a curve direction shown in FIG. 10.

The computation of the determination result (control flag) Sd based on Dvh and Dcv (processing of steps 108, 109, and 110) will now be described in detail with reference to FIG. 13. As shown in FIG. 13, in a turning direction determination computation block B19, the turning direction Dvh of the vehicle is judged on the basis of the actual turning state quantity Ta.

Specifically, when the absolute value of the actual turning state quantity Ta is less than a predetermined value Ts, the vehicle is judged to be in a "straight traveling" state. When the absolute value of the actual turning state quantity Ta is equal to or greater than the predetermined value Ts, the vehicle is judged to be turning. In this case, a determination as to whether the turning is "leftward turning" or "rightward turning" is made on the basis of the sign of the actual turning state quantity Ta at that time. That is, data representing one of the "straight traveling," "leftward turning," and "rightward turning" is computed as the turning direction Dvh.

In a curve direction determination block B20, the curve direction Dcv in relation to the traveling direction of the vehicle is judged on the basis of the curve information Rc, Pc, and the vehicle position Pvh. Specifically, when the curve curvature radius Rvh at the vehicle position Pvh is greater than a predetermined value Rvs, the curve direction Dcv is judged to be "straight" When the curve curvature radius Rvh is equal to or less than the predetermined value Rvs, the curve direction Dcv is judged to be "leftward curve" or "rightward curve" depending on the direction of the curve curvature radius Rvh. That is, data representing one of "straight," "leftward curve," and "rightward curve" is computed as the curve direction Dcv.

In an execution judgment computation block B21, when the turning direction Dvh and the curve direction Dcv coincide with each other, the determination result (control flag) Sd is set to the permission state (Sd=1); and, when the turning direction Dvh and the curve direction Dcv do not coincide with each other, the determination result (control flag) Sd is set to the prohibition state (Sd=0). This determination is based on the thought "that, when the turning direction Dvh and the curve direction Dcv coincide with each other, the reliability of the curve information is high; and, when the turning direction Dvh and the curve direction Dcv do not coincide with each other, the reliability of the curve information is low."

Referring back to FIG. 10, when the result of the determination in step 110 is "NO" (Dvh and Dcv do not coincide), the present routine is ended immediately. Meanwhile, when the result of the determination in step 110 is "Yes" (Dvh and Dcv coincide), in step 111, a calculative turning index Se is computed, and, in step 112 subsequent thereto, an actual turning index Sa is computed. In step 113 subsequent thereto, the result Sh of comparison between Se and Sa is computed. Subsequently, in step 114, a determination is made as to whether or not the determination result (control flag) Sm based on Sh is in the permission state (Sm=1).

Figure 14:
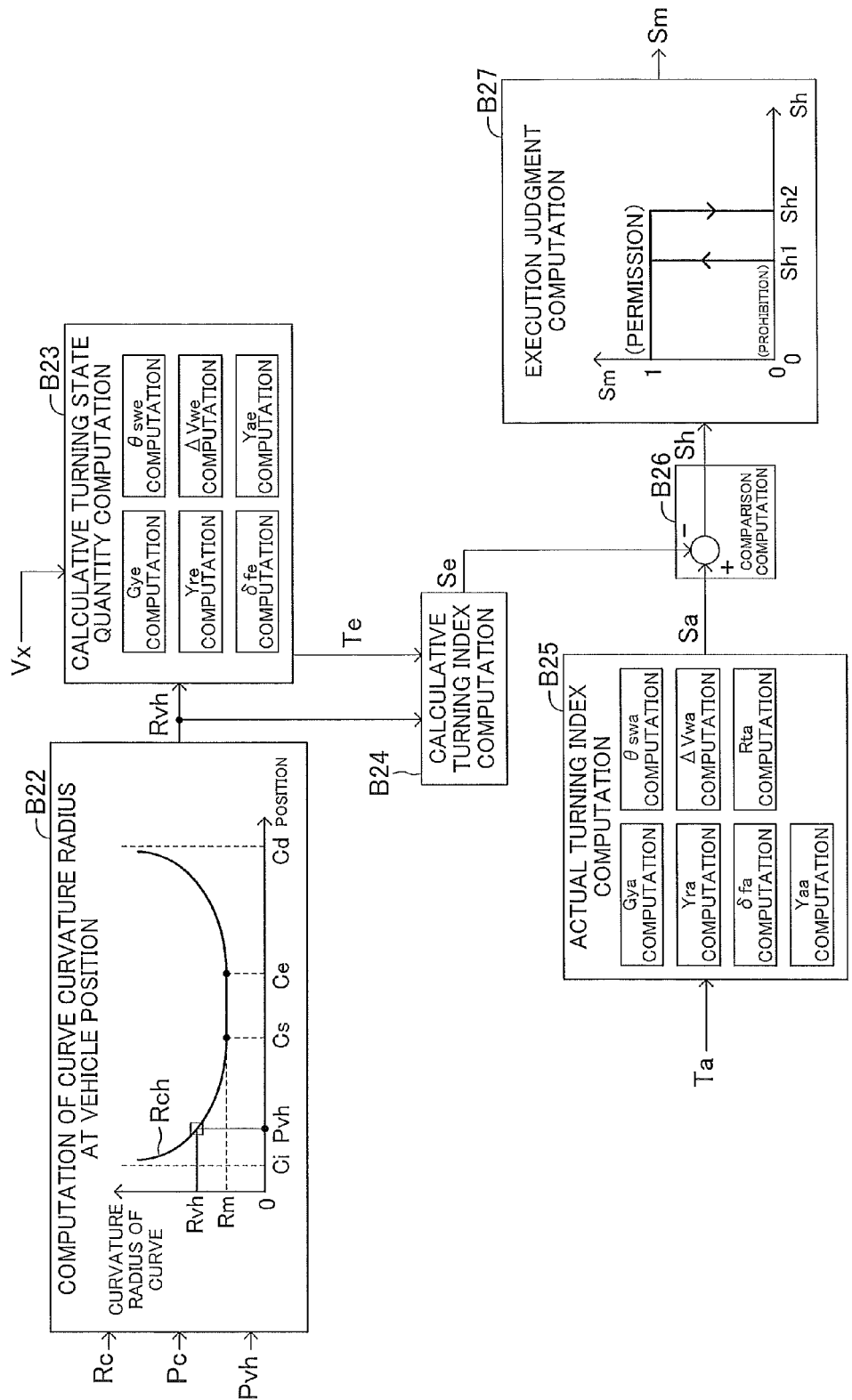
FIG. 14 is a functional block diagram for describing the determination computation trough comparison between a calculative turning index and an actual turning index shown in FIG. 10.

The computation of the determination result (control flag) Sm based on Sh (processing of steps 111, 112, 113, and 114) will now be described in detail with reference to FIG. 14. As shown in FIG. 14, in a curve curvature radius computation block B22, the curvature radius Rvh of the curve at the vehicle position Pvh is computed.

Specifically, first, the relation (curvature radius computation characteristic) Rch between the position Pc within the curve and the curvature radius Rc is computed on the basis of the curve information Rc, Pc. The curvature radius computation characteristic Rch can be estimated on the basis of a curve obtained by geometrically and smoothly connecting the positions of a plurality of points (nodes) on a road, which are stored in advance (see, for example, Japanese Patent No. 3378490). Alternatively, the curvature radius computation characteristic Rch can be stored in the map information database by use of a function representing a transition curve (e.g., clothoid curve) and parameters or the like.

The curve curvature radius Rvh at the vehicle position Pvh is computed on the basis of the curvature radius computation characteristic Rch. That is, by means of inputting the vehicle position Pvh to the curvature radius computation characteristic Rch defined by the relation between position and curvature radius, the curve curvature radius Rvh at the vehicle position Pvh is computed.

In a calculative turning state quantity computation block B23, a calculative turning state quantity Te is computed on the basis of the computed curvature radius Rvh. The following state quantities can be computed as the calculative turning state quantity Te.

Calculative lateral acceleration $Gye = Vx^2/Rvh$

Calculative yaw rate $Yre = Vx/Rvh$

Calculative steering angle $\delta fe = [L \cdot (1 + Kh \cdot Vx^2)]/Rvh$

Calculative steering wheel angle $\theta swe = [SG \cdot L \cdot (1 + Kh \cdot Vx^2)]/Rvh$ Calculative wheel speed difference $\Delta Vwe = (Tr \cdot Vx)/Rvh$ Calculative heading angle Yae (the tangential direction of the curve at the vehicle position Pvh in relation to the direction of the straight section before the curve entrance)

Here, Kh is a stability factor, L is the wheel base of the vehicle, Tr is the tread of the vehicle, and SG is the steering gear ratio of the vehicle.

In a calculative turning index computation block B24, the calculative turning index Se is computed on the basis of the calculative turning state quantity Te. The curve curvature radius Rvh computed as described above can be used as is as the calculative turning index Se. Moreover, two or more of different calculative turning indices Se computed on the basis of the above-described different calculative turning state quantities may be combined so as to compute the calculative turning index Se.

In an actual turning index computation block B25, the actual turning index Sa is computed on the basis of the actual turning state quantity Ta. Physical quantities (state quantities) which are identical to each other (in terms of dimension) are computed as the actual turning index Sa and the calculative turning index Se. For example, in the case where the calculative turning index Se is the curve curvature radius Rvh, the curve curvature radius Rta is computed on the basis of the actual turning state quantity Ta as the actual turning index Sa corresponding to the calculative turning index Se. Rta may be obtained by any of the following computations.

$$Rta = Vx^2/Gya$$

$$Rta = Vx/Yra$$

$$Rta = [L \cdot (1+Kh \cdot Vx^2)]/\delta fa$$

$$Rta = [SG \cdot L \cdot (1+Kh \cdot Vx^2)]/\theta swa$$

Here, Kh is a stability factor, L is the wheel base of the vehicle, and SG is the steering gear ratio of the vehicle.

In a comparison computation block B26, the calculative turning index Se and the actual turning index Sa are compared. The absolute value of the deviation (turning index deviation) between the actual turning index Sa and the calculative turning index Se can be used as the comparison result Sh.

In an execution judgment computation block B27, the determination result (control flag) Sm is computed on the basis of the turning index deviation Sh. When the turning index deviation Sh is equal to or less than a predetermined value Sh1, the determination result (control flag) Sm is set to the permission state (Sm=1). Meanwhile, when the deviation Sh is greater than the predetermined value Sh1, the determination result (control flag) is set to the prohibition state (Sm=0). This determination computation is based on the thought "that, when the calculative turning index Se computed on the basis of the map information substantially coincides with the actually detected actual turning index Sa (Sh≤Sh1), the reliability of the curve information is high, and, when the difference between Se and Sa is large (Sh>Sh1), the reliability of the curve information is low."

The determination as to whether execution of the deceleration control is to be permitted or prohibited can be performed on the basis of a change in the deviation Sh from a point in time when the vehicle has entered the curve to a point in time at which a vehicle turning value Tvh (or the actual turning index Sa or the calculative turning index Se) computed on the basis of at least one of the curve information Rc, Pc and the actual turning state quantity Ta reaches a predetermined value Ths. Furthermore, when a state in which the turning index deviation Sh is equal to or less than the predetermined value Sh1 continues over a predetermined range Hn1 (a predetermined distance Ls1 or a predetermined time Ts1), the determination result can be set to the permission state (Sm=1). This operation enables stable determination as to whether the deceleration control is to be permitted or prohibited, while eliminating influences of noise and the like.

The determination as to whether the deceleration control is to be permitted or prohibited is continued after the deceleration control is started. In the case where the turning index deviation Sh becomes larger than a predetermined value Sh2 during execution of the deceleration control, the determination result can be changed from the permission state (Sm=1) to the prohibition state (Sm=0). Furthermore, in the case where a state in which the turning index deviation Sh is greater than the predetermined value Sh2 continues over a predetermined range Hn2 (a predetermined distance Ls2 or a predetermined time Ts2) during execution of the vehicle speed control, the determination result can be changed from the permission state (Sm=1) to the prohibition state (Sm=0). As a result, the deceleration control which is being executed can be stopped. Here, a relation Sh1<Sh2 exists between the predetermined value Sh1 and the predetermined value Sh2. By virtue of this relation, it is possible to prevent occurrence of hunting of the determination result (control flag) Sm as to whether to permit or prohibit execution of the deceleration control.

Referring back to FIG. 10, when the result of the determination in step 114 is "NO" (Sh>Sh1), the present routine is ended immediately. Meanwhile, when the result of the determination in step 114 is "Yes" (Sh Sh1), in step 115, the final determination result (control flag Sfin) of the execution judgment means A9 (see FIG. 4) is changed from the prohibition state (Sfin=0) to the permission state (Sfin=1) in order to permit the start of execution of the deceleration control.

Notably, the heading angle Ya, the steering characteristic value Sch, the actual turning state quantity Ta, the turning direction Dvh, the curve direction Dcv, and the actual turning index Sa in the processing shown in FIG. 10 will be referred to as a determination state quantity (a state quantity used for the determination as to whether execution of the deceleration control is to be permitted or prohibited).

The predetermined values Ya1, Sc1, Ta1, Ts, Rvs, and Ths can be set to those values corresponding to the state of a curve under consideration or the turning state of the vehicle at the time when the vehicle travels along a portion of the curve between the entrance thereof and the center point of the approaching transition curve section (approaching clothoid curve section) thereof. Therefore, the determination as to whether execution of the deceleration control is to be permitted or prohibited can be completed in the first half of the approaching transition curve section of the curve under consideration. When execution of the deceleration control is permitted (e.g., Sfin=1), the vehicle speed control for decelerating the vehicle can be started in the second half of the approaching transition curve section of the same curve.

As described above, in the example processing shown in FIG. 10, in the case where the control flag Sfin is in the prohibition state (Sfin=0), the control flag Sfin is changed to the permission state (Sfin=1) only when all the five determination results; i.e., the determination result (control flag Sy) based on Ya, the determination result (control flag So) based on Sch, the determination result (control flag Ss) based on Ta, the determination result (control flag Sd) based on Dvh, Dcv, and the determination result (control flag Sm) based on Sh, become the permission state (control flag=1).

The processing shown in FIG. 10 may be modified in such a manner that, in the case where the control flag Sfin is in the prohibition state (Sfin=0), the control flag Sfin is changed to the permission state (Sfin=1) when any one of the five determination results becomes the permission state (Sfin=1), or when arbitrary two to four determination results become the permission state (control flag=1).

Figure 15:
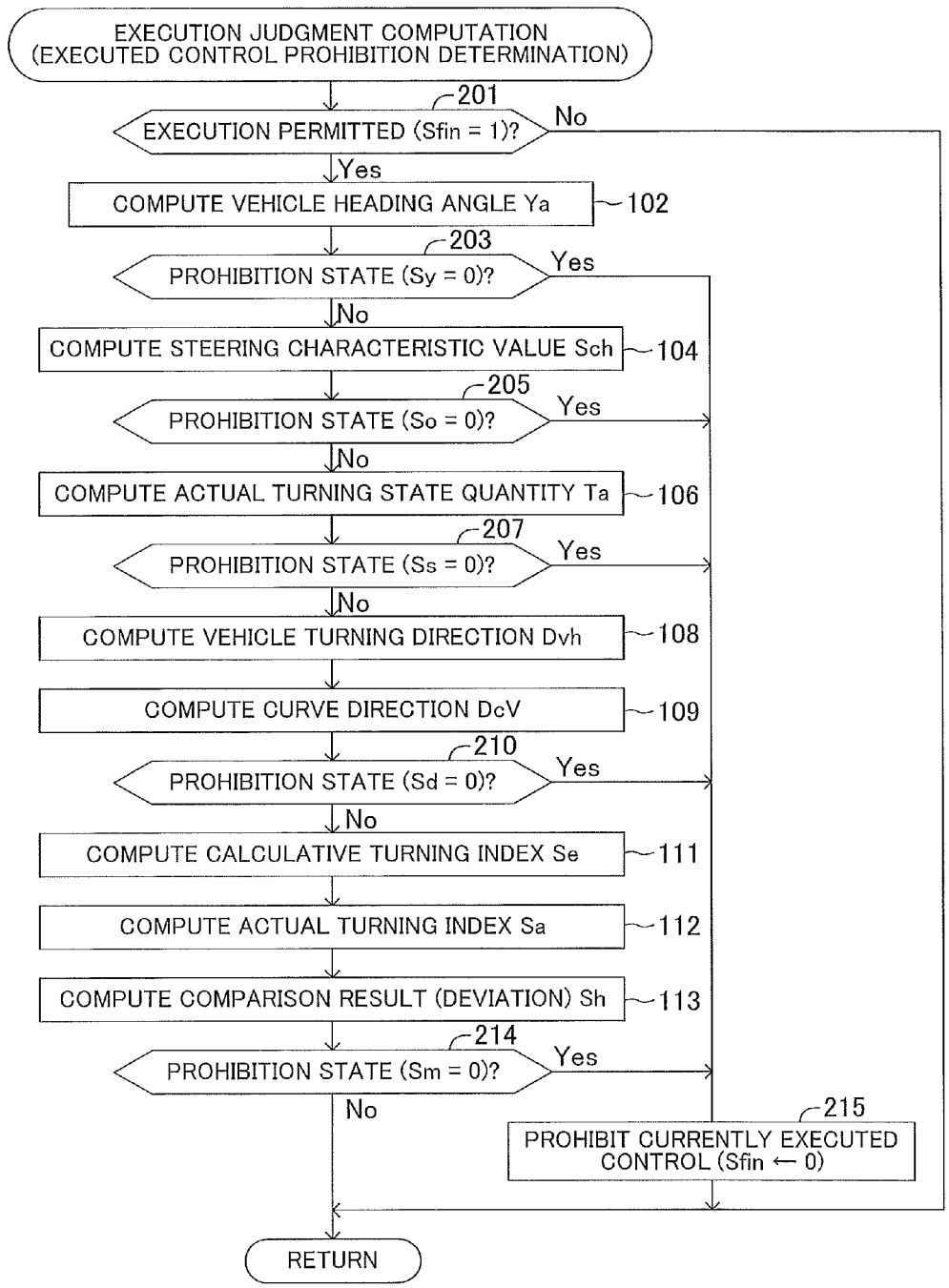
FIG. 15 is a flowchart showing an example of processing which is performed in a traveling control apparatus for a vehicle according to the modification of the first embodiment of the present invention and in which the result of final determination performed by the execution judgment means shown in FIG. 4 is changed from an enabled state to a disabled state on the basis of a plurality of determination computation results.

FIG. 15 is a flowchart showing example processing for the case where the control flag Sfin is changed from the permission state (Sfin=1) to the prohibition state (Sfin=0). Notably, the "prohibition state" corresponds to the "disabled state," and the "permission state" corresponds to the "enabled state." A routine corresponding to this flowchart is also repeatedly executed at predetermined intervals (e.g., 6 msec), like the routine shown in FIG. 10.

The routine of FIG. 15 is obtained by replacing the steps 101, 103, 105, 107, 110, 114, and 115 of the routine of FIG. 10 with steps 201, 203, 205, 207, 210, 214, and 215, respectively. In the following, only the steps of the routine of FIG. 15 which differ from the corresponding steps of FIG. 10 will be described.

In step 201, a determination is made as to whether or not execution of the deceleration control is permitted (Sfin=1). When the result of the determination is "No," the present routine is ended immediately. When the execution of the deceleration control is permitted (Sfin=1), the result of the determination in step 201 is "Yes," and processing of step 102 and subsequent steps is performed.

In step 203, a determination is made as to whether or not the determination result (control flag) Sy based on Ya is in the prohibition state (Sy=0) (whether or not the relation Ya≥Ya2 is satisfied). When the result of the determination is "Yes," processing of step 215 is performed. When the result of the determination is "No," processing of step 104 and subsequent steps is performed.

In step 205, a determination is made as to whether or not the determination result (control flag) So based on Sch is in the prohibition state (So=0) (whether or not the relation Sch Sc0 is satisfied). When the result of the determination is "Yes," processing of step 215 is performed. When the result of the determination is "No," processing of step 106 and subsequent steps is performed.

In step 207, a determination is made as to whether or not the determination result (control flag) Ss based on Ta is in the prohibition state (Ss=0) (whether or not the relation Ta≤Ta0 is satisfied). When the result of the determination is "Yes," processing of step 215 is performed. When the result of the determination is "No," processing of step 108 and subsequent steps is performed.

In step 210, a determination is made as to whether or not the determination result (control flag) Sd based on Dvh and Dcv is in the prohibition state (Sd=0) (whether or not Dvh and Dcv differ from each other). When the result of the determination is "Yes," processing of step 215 is performed. When the result of the determination is "No," processing of step 111 and subsequent steps is performed.

In step 214, a determination is made as to whether or not the determination result (control flag) Sm based on Sh is in the prohibition state (Sm=0) (whether or not the relation Sh≥Sh2 is satisfied). When the result of the determination is "Yes," processing of step 215 is performed. When the result of the determination is "No," the present routine is ended.

In step 215, in order to prohibit the deceleration control which is currently executed, the final determination result (control flag Sfin) of the execution judgment means A9 (see FIG. 4) is changed from the permission state (Sfin=1) to the prohibition state (Sfin=0).

As described above, in the example processing shown in FIG. 15, in the case where the control flag Sfin is in the permission state (Sfin=1), the control flag Sfin is changed to the prohibition state (Sfin=0) when any one of the five determination results; i.e., the determination result (control flag Sy) based on Ya, the determination result (control flag So) based on Sch, the determination result (control flag Ss) based on Ta, the determination result (control flag Sd) based on Dvh, Dcv, and the determination result (control flag Sm) based on Sh, becomes the prohibition state (control flag=0).

The processing shown in FIG. 15 may be modified in such a manner that, in the case where the control flag Sfin is in the permission state (Sfin=1), the control flag Sfin is changed to the prohibition state (Sfin=0), when arbitrary two or more of the five determination results become the prohibition state (control flag=0).

As described above, the accuracy in determining whether execution of the deceleration control is to be permitted or prohibited can be improved by means of computing the final determination result (control flag Sfin) of the execution judgment means A9 (see FIG. 4) on the basis of the plurality of determination computation results (Sy, So, Ss, Sd, and Sm) corresponding to a plurality of determination state quantities (Ya, Sch, Ta, Dvh, Dcv, and Sa) computed on the basis of the actual turning state quantity Ta.

In the execution start permission determination (see FIG. 10) and the executed control prohibition determination (see FIG. 15), there are provided five determination computations; i.e., determination computation based on Ya, determination computation based on Sch, determination computation based on Ta, determination computation based on Dvh and Dcv, and determination computation based on Sh, and computation necessary for these determination computations (e.g., step 102 necessary for the determination computation based on Ya). However, at least one of these determination computations can be omitted. That is, at least one of the five determination computations may be provided so as to perform the execution start permission determination and the executed control prohibition determination.

In the execution start permission determination, any one of the determination computation based on Ya, the determination computation based on Sch, the determination computation based on Ta, the determination computation based on Dvh and Dcv, and the determination computation based on Sh corresponds to the "first execution judgment means." Another one of the determination computations which differs from the first execution judgment means corresponds to the "second execution judgment means different from the first execution judgment means."

Figure 4:
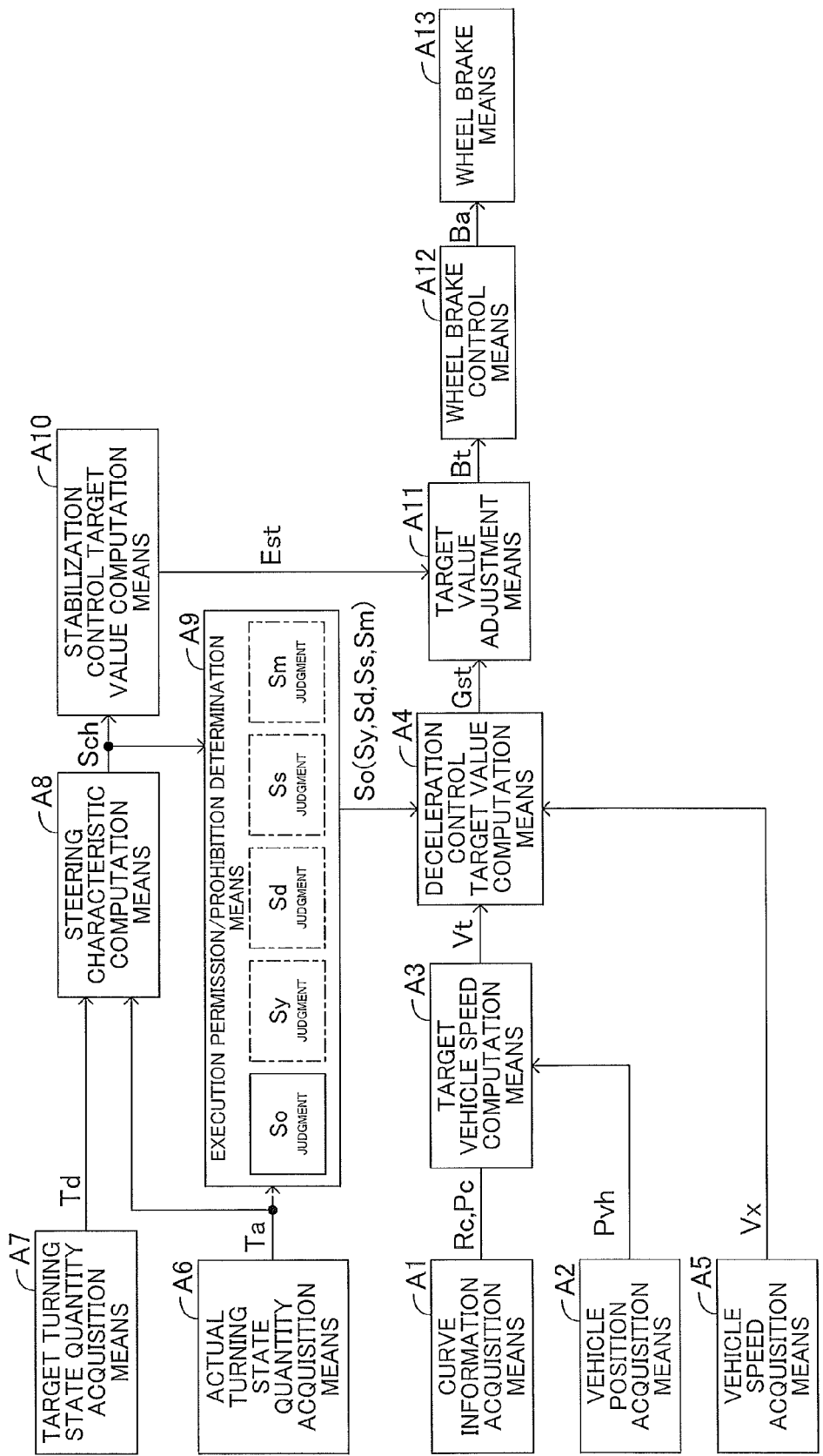
FIG. 4 is a functional block diagram for describing the outlines of deceleration control and stabilization control performed by the traveling control apparatus shown in FIG. 1.

Furthermore, in the above-described first embodiment, the target vehicle speed Vt computed in the target vehicle speed computation means A3 shown in FIG. 4 (specifically, the block B3 shown in FIG. 5) can be adjusted to increase on the basis of an accelerating operation amount Ap (an amount by which the driver operates the accelerating operation member AP.

Figure 16:
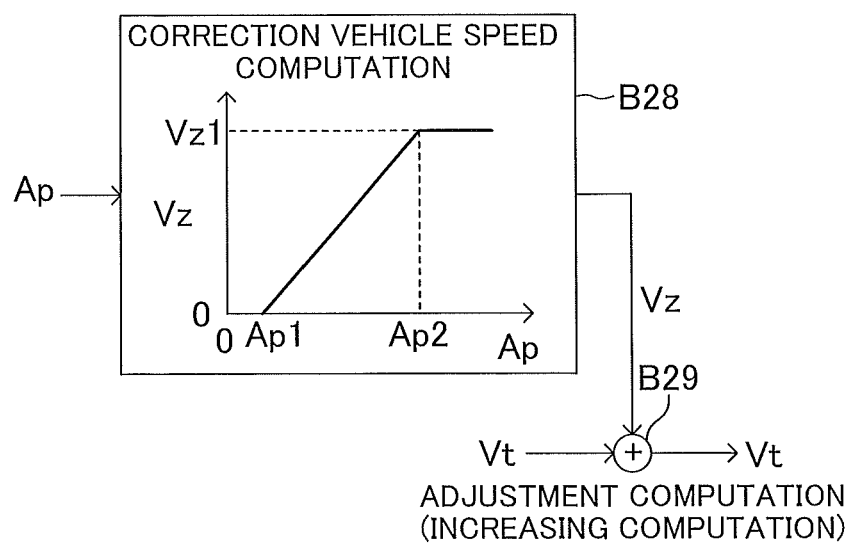
FIG. 16 is a functional block diagram for describing a case where the target vehicle speed is adjusted on the basis of an amount by which an accelerating operation member is operated by a driver.

Specifically, as shown in FIG. 16, in a correction vehicle speed computation block B28, a correction vehicle speed Vz is computed on the basis of the accelerating operation amount Ap. The correction vehicle speed Vz is computed such that the correction vehicle speed Vz is maintained at "0" when Ap is equal to or less than Ap1 (predetermined value), and the correction vehicle speed Vz increases from "0" as Ap increases from Ap1. Furthermore, an upper limit Vz1 may be provided for the correction vehicle speed Vz so that, when Ap is equal to or greater than Ap2 (predetermined value), Vz is maintained at Vz1 (predetermined value).

Figure 5:
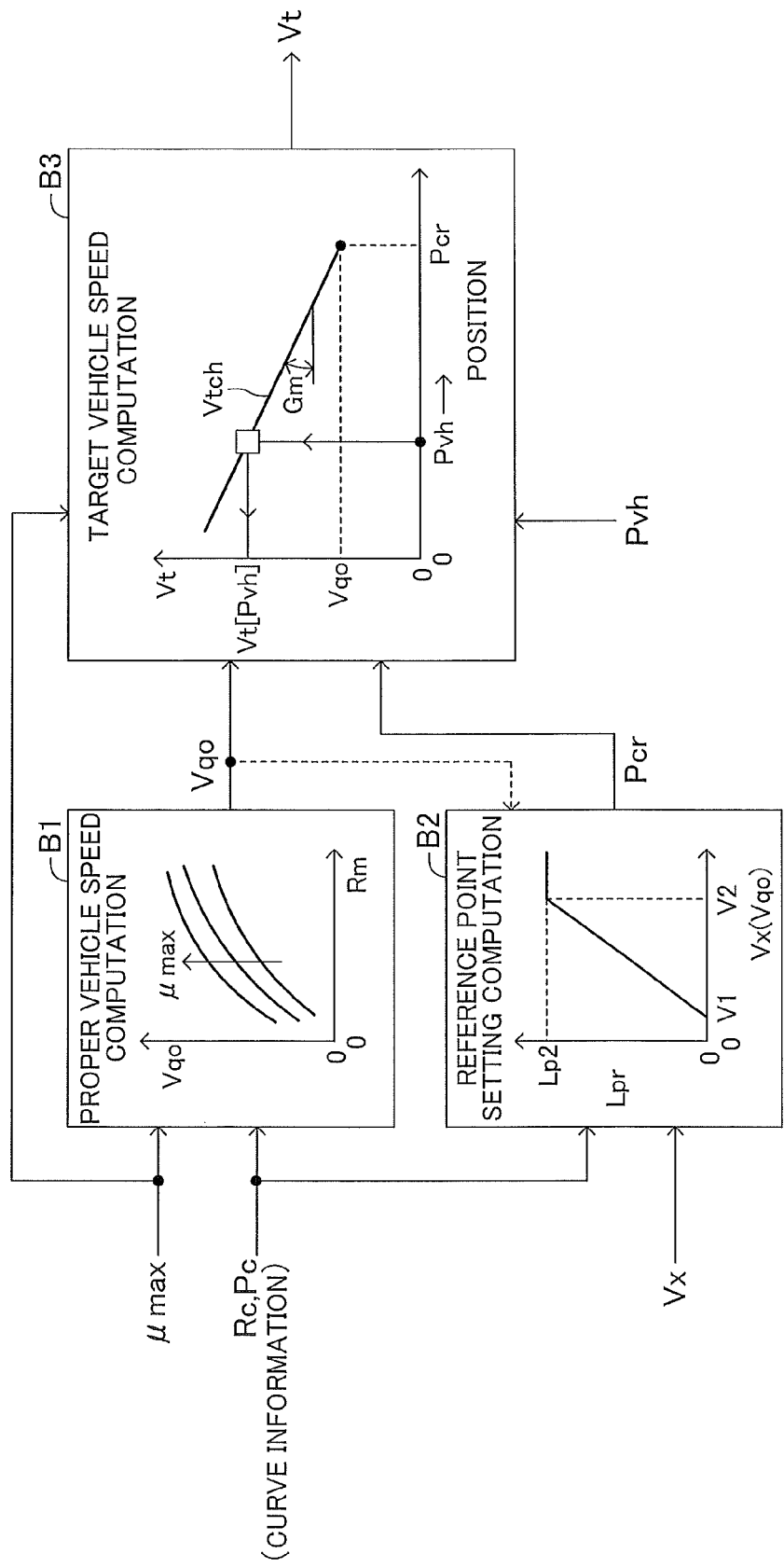
FIG. 5 is a functional block diagram for describing the computation of a target vehicle speed performed by the target vehicle speed computation means shown in FIG. 4.

In an adjustment computation (increasing computation) block B29, the correction vehicle speed Vz is added to the target vehicle speed Vt computed in the block B3 shown in FIG. 5, whereby an adjusted target vehicle speed Vt (=Vt+Vz) is computed. This adjusted target vehicle speed Vt is output to the deceleration control target value computation means A4 (see FIG. 4). As described above, the driver's will of accelerating the vehicle can be reflected on the deceleration control by means of computing the correction vehicle speed Vz on the basis of the accelerating operation amount Ap, and adjusting the target vehicle speed Vt to increase by the correction vehicle speed Vz. Moreover, through provision of the upper limit Vz1 for the correction vehicle speed Vz, unnecessary acceleration of the vehicle can be suppressed.

A specific example of the processing associated with the computation of the heading angle in the heading angle computation block B14 shown in FIG. 11 will now be additionally described with reference to the flowchart shown in FIG. 17.

In step 301, there is set a cumulation start point Psk, at which integral computation for obtaining the heading angle Ya is started. The point Psk is a point shifted from the curve entrance Ci toward the vehicle (near side) by a predetermined distance (predetermined value) Lsk. The point Psk is judged on the basis of the position of the curve entrance Ci stored in the storage section MAP (or computed on the basis of the information stored in the storage section MAP). Further, the position of the point Psk can be stored in the storage section MAP in advance. The point Psk may coincide with the curve entrance Ci (that is, Lsk=0).

In step 302, there is set a cumulation end point Psl, at which the integral computation is ended. The point Psl is a point shifted from the curve exit Cd toward the vehicle (near side) by a predetermined distance (predetermined value) Lsl. The point Psl is judged on the basis of the position of the curve exit Cd stored in the storage section MAP (or computed on the basis of the information stored in the storage section MAP). Further, the position of the point Psl can be stored in the storage section MAP in advance. The point Psl may coincide with the curve exit Cd (that is, Lsl=0). In the case where two curves are present continuously, a cumulation end point Psl1 corresponding to a curve closest to the vehicle (hereinafter referred to as the "first curve") coincides with or is located on the near side (side toward the vehicle) of a cumulation start point Psk2 corresponding to a curve second closest to the vehicle (hereinafter referred to as the "second curve").

In step 303, a determination is made as to whether or not the integral computation for obtaining the heading angle Ya is being executed. In the case where the integral computation for obtaining the heading angle Ya has been started, and an affirmative determination (YES) is made in step 303, the computation processing proceeds to step 305. In the case where the integral computation for obtaining the heading angle Ya has not yet been started, and a denial determination (NO) is made in step 303, the computation processing proceeds to step 304.

In step 304, a determination is made as to whether or not the vehicle has passed through the point Psk. In the case where the vehicle has not yet reached the point Psk, a denial determination is made in step 304, and the computation of the heading angle is not performed. Meanwhile, in the case where the vehicle has reached or passed through the point Psk, an affirmative determination is made in step 304, and the computation processing proceeds to step 305.

In step 305, a determination is made as to whether or not the vehicle has passed through the point Psl. In the case where the vehicle has reached or passed through the point Psl, an affirmative determination is made in step 305, and the computation processing proceeds to step 309. In step 309, the heading angle computation (cumulation) is ended, and the heading angle Ya is reset to "0." Meanwhile, in the case where the vehicle has not yet reached the point Psl, a denial determination is made in step 305, and the computation processing proceeds to step 306.

In step 306, a determination is made as to whether or not the actual turning state quantity Ta (e.g., steering wheel angle θsw, front wheel steering angle δf) is within a predetermined range (the absolute value |Ta| of Ta is equal to or less than a predetermined value Tsk). In the case where the actual turning state quantity Ta falls within the range of the predetermined value Tsk (|Ta|≤Tsk), an affirmative determination is made in step 306, and the computation processing proceeds to step 307. In the case where the actual turning state quantity Ta falls outside the range of the predetermined value Tsk (|Ta|>Tsk), a denial determination is made in step 306, and the computation processing proceeds to step 308.

In step 307, processing for resetting the heading angle Ya is performed. In the reset processing, the heading angle Ya (cumulative value) is reset to "0." In step 308, integral computation (cumulation) processing for computing the heading angle Ya is executed.

Notably, in the above-described computation of the heading angle, when the actual turning state quantity Ta falls within the predetermined range, the heading angle Ya is reset, provided that the vehicle has passed through the point Psk but has not yet passed through the point Psl. However, the above-described computation of the heading angle may be modified such that, irrespective of whether or not the vehicle has passed through the points Psk, Psl, the heading angle Ya is always reset when the actual turning state quantity Ta falls within the predetermined range.

An error is contained in the position of the curve entrance Ci judged on the basis of the information stored in the storage section MAP. Similarly, an error is contained in the vehicle position Pvh obtained by use of the global positioning system GPS or the like. In the above-described computation of the heading angle, the integral computation for obtaining the heading angle Ya is started from a point shifted toward the vehicle from the curve entrance Ci by the predetermined value (predetermined distance) Lsk. Therefore, these errors can be compensated. A value which can absorb these errors is used as the predetermined value Lsk. Specifically, Lsk can be set on the basis of at least one of the accuracy of the storage section MAP and the performance of the GPS.

Notably, the near side (vehicle side) of the curve entrance Ci is a straight section, and the integral computation for obtaining the heading angle Ya is started on the near side of the curve entrance Ci (on the side toward the vehicle). Therefore, in the section extending to the curve entrance Ci, the heading angle Ya is computed to be approximately zero.

Furthermore, in the above-described computation of the heading angle, when the actual turning state quantity Ta (e.g., steering angle Str (generic term for θsw and δf)) falls within the predetermined range (that is, Ta falls within a range corresponding to straight travelling), the value of the heading angle Ya is reset to "0." The heading angle Ya is also generated when a lane changing or the like is performed during straight travelling. However, since Ta returns to "0" after completion of the lane changing, the heading angle Ya is reset. By virtue of this operation, entry of the vehicle into a curve can be judged without fail.

The action and effects of the above-described heading angle computation will now be described with reference to FIGS. 18 and 19.

First, the case of a single curve (the case where only one curve is present) will be described with reference to FIG. 18. At a vehicle position (1), a curve ahead of the vehicle is recognized. The start point Psk of the heading angle computation is set at a point shifted toward the near side (side toward the vehicle) from the curve entrance Ci by the predetermined value Lsk. Also, the end point Psl of the heading angle computation is set at a point shifted toward the near side from the curve exit Cd by the predetermined value Lsl (or a point shifted toward the far side (side away from the vehicle) from the end point Ce of the constant curvature radius section by a predetermined distance Lsm).

When the vehicle reaches (or passes through) the cumulation start point Psk, the computation (cumulation computation) of the heading angle Ya is started. The heading angle Ya is an angle between the direction of the straight section Zst and the traveling direction of the vehicle. Since the section between the point Psk and the curve entrance Ci is straight, the heading angle Ya is computed to be approximately "0."

Figure 17:
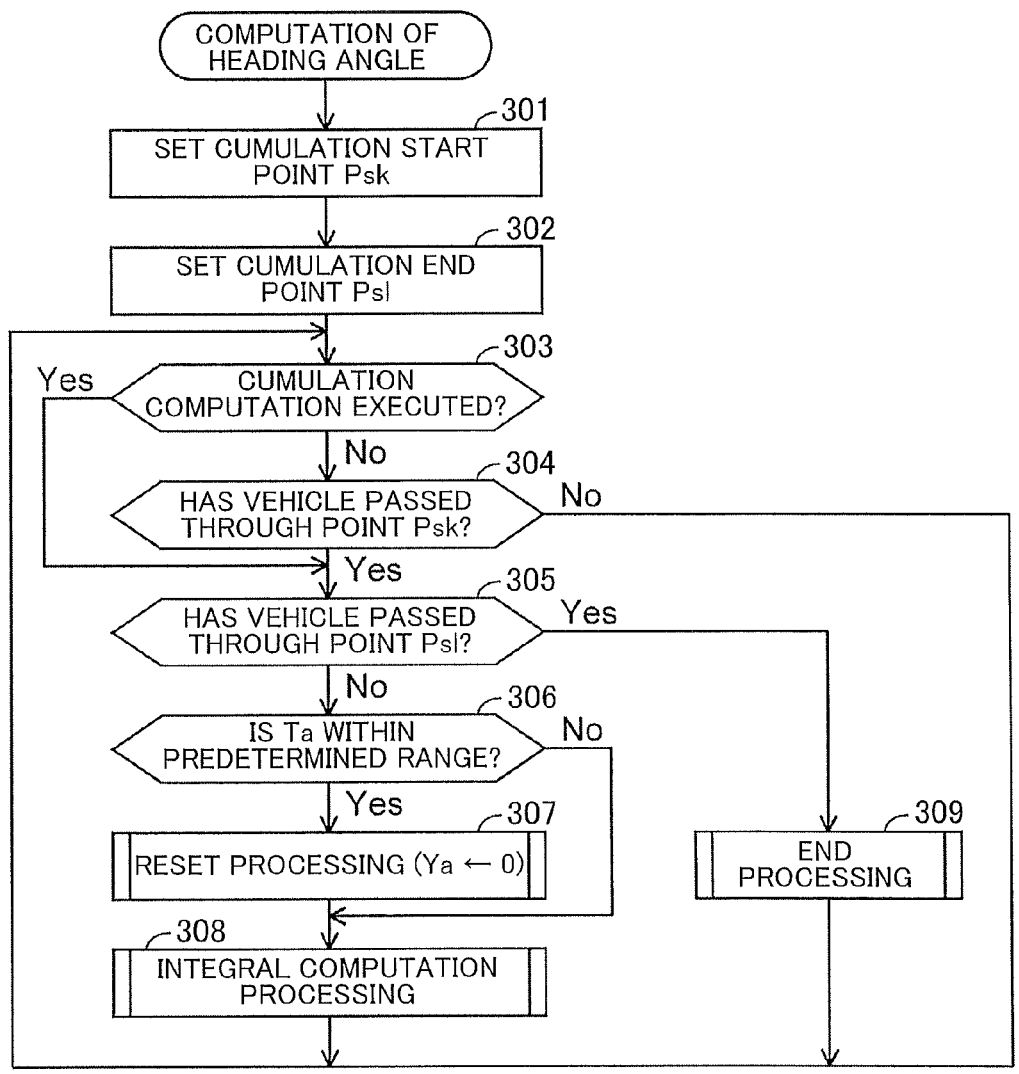
FIG. 17 is a flowchart showing an example of processing regarding the computation of the heading angle shown in FIG. 11.

Although the Ya computation is started after the vehicle has passed through the curve entrance Ci, when the actual turning state quantity Ta falls within the predetermined range (when the absolute value of Ta is equal to or less than the predetermined value Tsk), the heading angle Ya is reset to "0" at the computation intervals of the routine shown in FIG. 17. When the vehicle enters an approaching transition curve section Zci, the heading angle Ya increases gradually from "0 (corresponding to traveling within a straight section)." When the heading angle Ya becomes equal to or greater than the predetermined value Ya1 at a vehicle position (2), the determination result Sy is switched from the prohibition state (state in which the deceleration control is disabled) to the permission state (state in which the deceleration control is enabled). The heading angle computation is ended when the vehicle travels further and reaches the cumulation end point Psl. The determination result Sy is switched from the permission state (enabled state) to the prohibition state (disabled state) when the heading angle Ya becomes equal to or greater than the predetermined value Ya2 or when the heading angle computation is ended.

As described above, the cumulation computation of the heading angle is started at a point shifted toward the near side from the curve entrance Ci (by the distance Lsk). Therefore, the errors of the storage section MAP and the GPS can be compensated. In addition, the heading angle Ya is reset on the basis of the actual turning state quantity Ta. Therefore, even when lane changing or staggering within a lane occurs, entry of the vehicle into a curve can be judged without fail.

Next, the case where a plurality of curves are present continuously (in the case were two curves are connected without interposition of a straight section therebetween) will be described with reference to FIG. 19. This is called an S-shaped curve. In this example, a departing transition curve section Zcj of a first curve (a curve closest to the vehicle) and an approaching transition curve section Zci of a second curve (a curve located ahead of the vehicle and second closest to the vehicle) are connected together at a point Ci. That is, the exit of a curve including a portion having a constant curvature radius Rn coincides with the entrance of a curve including a portion having a constant curvature radius Rm. In the S-shaped curve, the direction of the vehicle at the point Ci where the sections Zcj and Zci are connected together corresponds to the direction of a straight section. The following description is made under the assumption that the vehicle is traveling at a position (3) and deceleration control is performed in the curve (second curve) including the portion having the constant curvature radius Rm.

After the vehicle has passed through the point Psl1, the computation of Ya is temporarily ended. When the vehicle has passed through the point Psk2 corresponding to the second curve, the Ya computation is started. The point Psk2 is set at a point shifted toward the vehicle side from the curve entrance Ci by a predetermined value Lsk. The point Psk2 is set within the departing transition curve section Zcj of the first curve. Therefore, the heading angle Ya is computed; however, since the actual turning state quantity Ta falls with the predetermined range (Ta<Tsk), Ya is reset to zero at the computation intervals.

When the vehicle has passed through the point Psk2 and the actual turning state quantity Ta falls outside the predetermined range (Ta Tsk), the heading angle Ya is gradually increased from zero. When the heading angle Ya becomes equal to or greater than the predetermined value Ya1 at a vehicle position (4), the determination result Sy is switched from the prohibition state (disabled state) to the permission state (enabled state). Subsequently, the determination result Sy is switched from the permission state to the prohibition state when the heading angle Ya becomes equal to or greater than the predetermined value Ya2 or when the vehicle passes through the point Psl2 and the heading angle computation is ended.

As described above, the heading angle Ya is reset on the basis of the actual turning state quantity Ta. Therefore, even in the case where the point Psk is set within a transition curve section (corresponding to the first curve), entry of the vehicle into a curve (second curve) can be judged without fail.

In the above-described example, the computation of the heading angle Ya is performed on the basis of the actual yaw rate Yr. In place of the actual yaw rate Yr, a calculative yaw rate Yre computed from any other state quantity (e.g., steering angle Str) may be used. Notably, the steering wheel angle θsw detected by the steering wheel angle sensor SA and the steering angle δf of the steerable wheels (front wheels) detected by the front wheel steering angle sensor FS are collectively referred to as the steering angle Str.

The calculative yaw rate Yre1 (first calculative yaw rate) can be computed on the basis of a speed difference ΔVw between the left and right wheels. The calculative yaw rate Yre2 (second calculative yaw rate) can be computed on the basis of the steering angle. The calculative yaw rate Yre3 (third calculative yaw rate) can be computed on the basis of the actual lateral acceleration Gy. That is, the heading angle Ya can be computed by means of cumulating one of the speed difference ΔVw between the left and right wheels, the steering angle Str, and the actual lateral acceleration Gy. Alternatively, the heading angle Ya may be computed by combining two or more of the actual yaw rate Yr and the calculative yaw rates Yre1, Yre2, and Yre3.

(Second Embodiment)

Next, a traveling control apparatus and a curve information reliability evaluation apparatus according to a second embodiment of the present invention (hereinafter may be referred to as the "present apparatus") will be described. Since the mechanical configuration of the second embodiment is identical with that of the first embodiment, its detailed description is omitted here.

(Outline of Evaluation of the Reliability of the Curve Information by the Present Apparatus)

Figure 20:
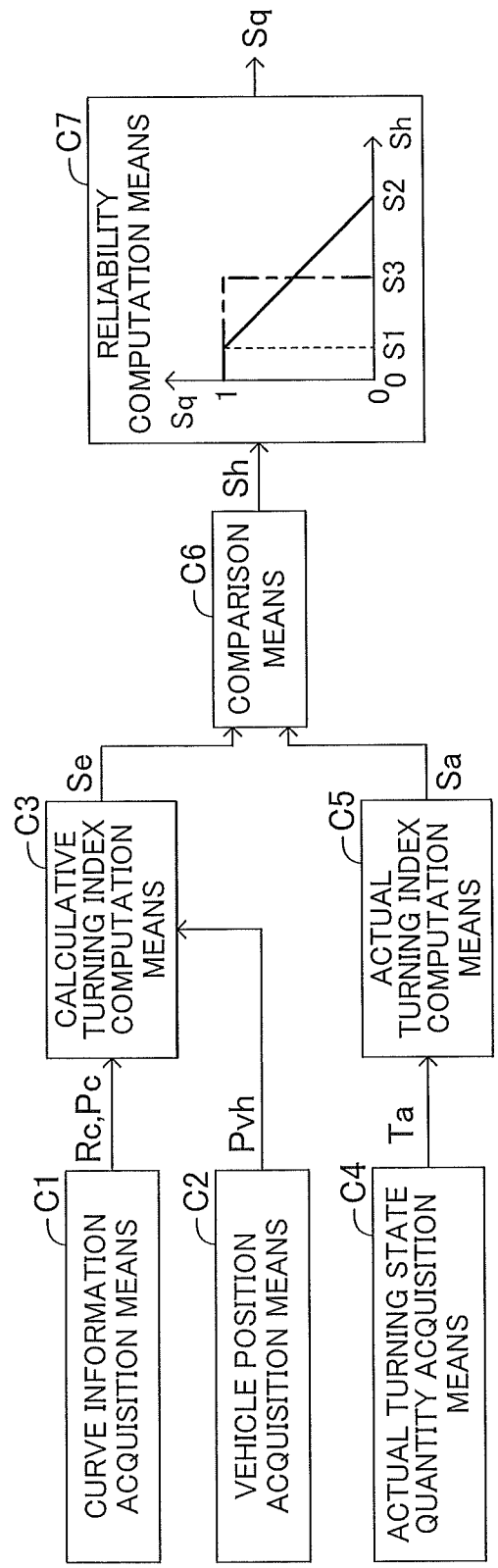
FIG. 20 is a functional block diagram for describing the outline of evaluation of the reliability of curve information executed by a traveling control apparatus (an apparatus for evaluating the reliability of curve information) for a vehicle according to a second embodiment of the present invention.

Hereinafter, a method for computing the reliability Sq of the curve information by the present apparatus will be described with reference to FIG. 20.

First, curve information acquisition means C1 acquires information Rc, Pc (a position Pc and a curve curvature radius Rc at that position) of a curve ahead of the vehicle. The curve information Rc, Pc is stored in the map information database of the storage section MAP. The curve information includes pieces of information each representing a position Pc (e.g., information of latitude and longitude) and the curvature radius Rc of the curve at that position Pc. That is, the position Pc and the curvature radius Rc are stored in a pair. Alternatively, the position Pc and the curvature radius Rc may be stored in the above-mentioned database in a form (e.g., a computation expression and coefficient) which enables computation of the position Pc and the curvature radius Rc.

Vehicle position acquisition means C2 acquires the present position Pvh of the vehicle. The vehicle position Pvh is detected by use of the global positioning system GPS.

Calculative turning index computation means C3 calculates a calculative turning index Se at the vehicle position Pvh of the curve through which the vehicle is traveling, on the basis of the curve information Rc, Pc and the vehicle position Pvh. This calculative turning index Se is an index which is calculated on the basis of the vehicle position Pvh and the curve information Rc, Pc and which represents the degree of turning of the vehicle.

FIG. 21 shows examples of the calculative turning index Se. As shown in FIG. 21, the curvature radius Rvh at the present vehicle position Pvh can be used as is as the calculative turning index Se. The curvature radius Rvh can be computed by inputting the vehicle position Pvh into a relation Rch (to be described later) between position and curve curvature radius within a curve under consideration.

Furthermore, as shown in FIG. 21, it is possible to compute at least one of the calculative lateral acceleration Gye, the calculative yaw rate Yre, the calculative front wheel steering angle δfe, the calculative steering wheel angle θswe, the calculative wheel speed difference ΔVwe between the left and right wheels, and the calculative heading angle Yae on the basis of the curvature radius Rvh at the present vehicle position Pvh, and to use it as the calculative turning index Se. Alternatively, a value computed through a combined use of two or more (two types or more) of these values may be used as the calculative turning index Se.

Actual turning state quantity acquisition means C4 acquires the actual turning state quantity Ta (a value representing the actual turning state) of the vehicle. At least one of actual lateral acceleration Gya, actual yaw rate Yra, actual front wheel steering angle δfa, actual steering wheel angle θswa, actual wheel speed difference ΔVwa between the left and right wheels, and actual heading angle Yaa is obtained (detected or computed) as the actual turning state quantity Ta.

Actual turning index computation means C5 computes an actual turning index Sa on the basis of the actual turning state quantity Ta. The actual turning index Sa is an index representing the degree of actual turning of the vehicle. As shown in FIG. 21, at least one of the actual lateral acceleration Gya, the actual yaw rate Yra, the actual front wheel steering angle δfa, the actual steering wheel angle θswa, the actual wheel speed difference ΔVwa between the left and right wheels, and the actual heading angle Yaa, each of which is the actual turning state quantity Ta, can be used as the actual turning index Sa. Furthermore, as shown in FIG. 21, the curvature radius Rta of the curve computed by use of these actual turning state quantities Ta can be used as the actual turning index Sa. Alternatively, a value computed through a combined use of two or more (two types or more) of these values may be used as the actual turning index Sa.

Notably, in the case where a value computed through a combined use of two or more (two types or more) values is used as the turning index Se, Sa as described above, the redundancy of evaluation of the reliability of the curve information can be secured.

Comparison means C6 compares the calculative turning index Se and the actual turning index Sa. Specifically, the deviation Sh between the turning indices (the absolute value |Sa−Se| of the deviation between the actual turning index Sa and the calculative turning index Se) is computed.

Reliability computation means C7 computes a reliability Sq which represents the evaluated reliability of the obtained curve information Rc, Pc. When the turning index deviation Sh (=|Sa−Se|) is equal to or less than a predetermined value S1 and approximately "0," the reliability Sq is set to 1, and an evaluation result indicating that the reliability of the curve information Rc, Pc. is high is output. As the deviation Sh is increases from the predetermined value S1, the reliability Sq is lowered gradually from "1," and an evaluation result indicating that the reliability of the curve information decreases is output. When the deviation Sh is equal to or greater than a predetermined value S2, the reliability Sq is set to 0, and an evaluation result indicating that the reliability of the curve information is very low is output.

Alternatively, the reliability Sq of the curve information Rc, Pc may be judged to assume one of two values; i.e., (Sq=1) indicating that "the curve information is reliable," and (Sq=0) indicating that "the curve information is unreliable." In this case, when the turning index deviation Sh (=|Sa−Se|) is equal to or less than a predetermined value S3, the reliability Sq is set to 1, and an evaluation result indicating that the reliability of the curve information Rc, Pc is high is output. When the deviation Sh is greater than the predetermined value S3, the reliability Sq is set to 0, and an evaluation result indicating that the reliability of the curve information Rc, Pc decreases is output.

Alternatively, the reliability Sq of the curve information Rc, Pc may be judged to assume one of a plurality of values or a variable value between 1 indicating that "the curve information is reliable" and 0 indicating that "the curve information is unreliable." The output reliability Sq can be used for vehicle control and reporting to a driver, which are performed by making use of the curve information.

In the above-described computation, the reliability Sq is computed on the basis of the calculative turning index Se and the actual turning index Sa, which change every moment. Alternatively, the reliability Sq may be computed on the basis of the averages of the calculative turning index Se and the actual turning index Sa over a predetermined range (a predetermined time or a predetermined distance). Alternatively the reliability Sq may be computed on the basis of a change in the turning index deviation Sh in a period between a point in time when the vehicle has passed through the curve start point Ci and a point in time when the calculative turning index Se or the actual turning index Sa reaches the predetermined value Ths.

(Outline of Vehicle Speed Control within a Curve Performed by the Present Apparatus)

Figure 22:
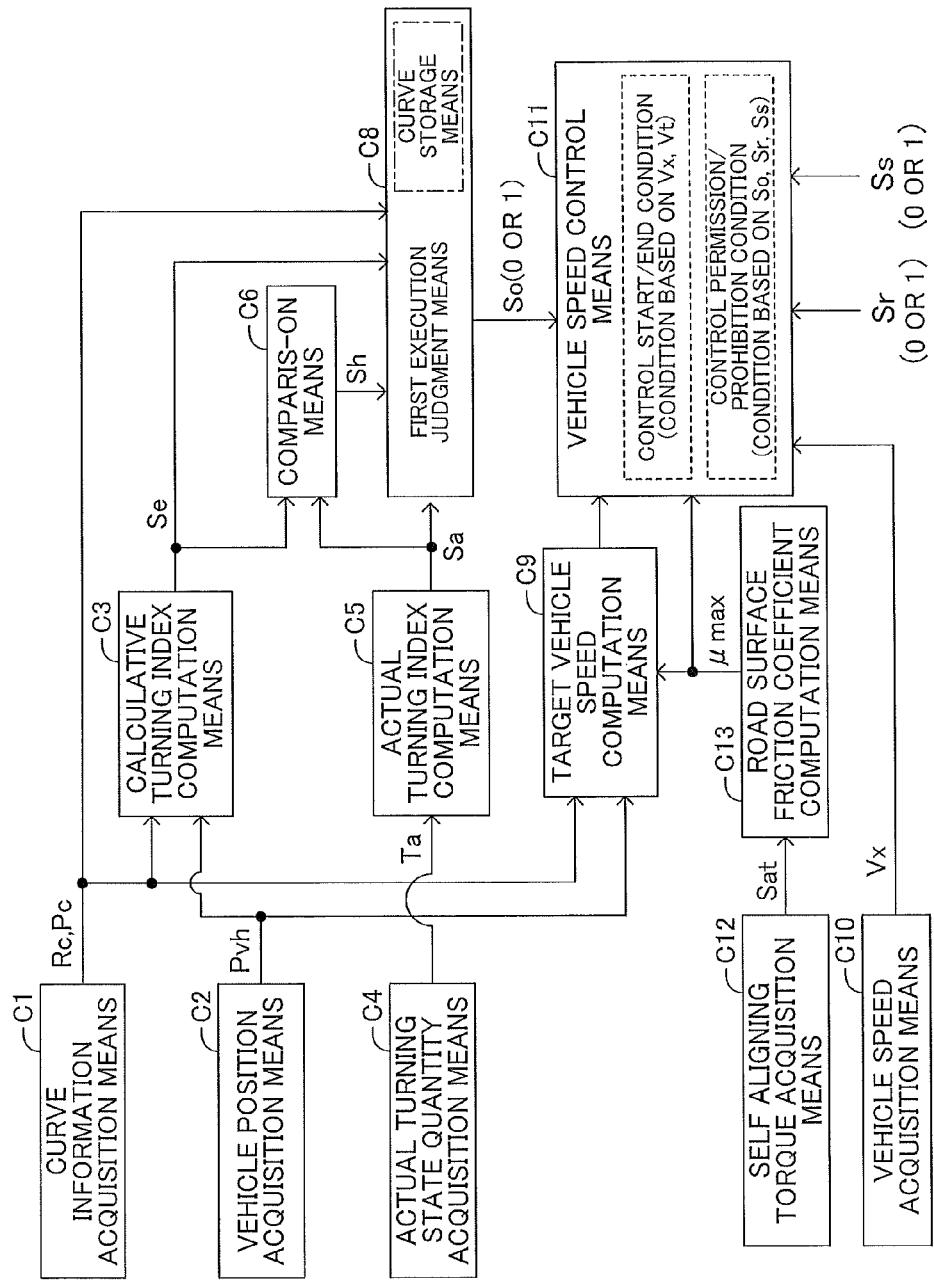
FIG. 22 is a functional block diagram for describing the outline of vehicle speed control executed by the traveling control apparatus for a vehicle according to the second embodiment of the present invention.

Vehicle speed control (in-curve vehicle speed control) which is executed by the present apparatus in order to decelerate the vehicle within a curve will be described with reference to FIG. 22. In the following description, means and the like which are identical with or equivalent to those shown in the above-mentioned drawings are denoted by the same symbols as those used in the above-mentioned drawings, and description of such means and the like will not be repeated. For example, curve information acquisition means C1, vehicle position acquisition means C2, calculative turning index computation means C3, actual turning state quantity acquisition means C4, actual turning index computation means C5, and comparison means C6 shown in FIG. 22 are identical with those shown in FIG. 20.

First execution judgment means C8 judges, on the basis of the above-described turning index deviation Sh, whether or not the in-curve vehicle speed control is to be executed. A value (vehicle turning value) Tvh which is computed on the basis of at least one of the curve information Rc, Pc and the actual turning state quantity Ta and which represents the turning state of the vehicle is provided to the first execution judgment means C8. The determination as to whether execution of the control is to be permitted or prohibited is made on the basis of a change in the turning index deviation Sh in a period between a point in time when the vehicle has entered the curve (a point in time when the vehicle has passed through the curve start point Ci) and a point in time when the vehicle turning value Tvh reaches the previously set predetermined value Ths.

Furthermore, the present embodiment may be modified such that at least one of the actual turning index Sa and the calculative turning index Se is provided, and the determination as to whether execution of the control is to be permitted or prohibited is made on the basis of a change in the turning index deviation Sh up to a point time when the actual turning index Sa or the calculative turning index Se reaches the previously set predetermined value Ths after the vehicle has entered the curve.

Here, the predetermined value Ths may be a value corresponding to the turning state of the vehicle when the vehicle travels within a portion of a curve under consideration between the entrance thereof and the center point of an approaching transition curve section (approaching clothoid curve section) thereof. Alternatively, the predetermined value Ths may be a value corresponding to a previously set vehicle turning state (e.g., a state in which a lateral acceleration of 0.3 to 0.4 G acts on the vehicle).

As will be described in detail later, in the case where the turning index deviation Sh changes, without exceeding the predetermined value Sh1, in the period between the point in time when the vehicle has entered the curve and the point in time when the vehicle turning value Tvh (or the actual turning index Sa or the calculative turning index Se) computed on the basis of at least one of the curve information Rc, Pc and the actual turning state quantity Ta reaches the predetermined value Ths, the determination result is changed from the prohibition state (initial state, So=0) to the permission state (So=1). Meanwhile, in the case where the deviation Sh exceeds the predetermined value Sh1 within the above-described period, the determination result is maintained in the prohibition state (So=0). Here, So is a control flag which represents prohibition/permission of execution of the control; and "0" represents prohibition of execution of the control, and "1" represents permission of execution of the control.

The first execution judgment means C8 can change the determination result from the prohibition state (So=0) to the permission state (So=1) when a state in which the turning index deviation Sh is equal to or less than the predetermined value Sh1 continues over the predetermined range Hn1 (the predetermined distance Ls1 or the predetermined time Ts1) after the vehicle has entered the curve. This operation enables stable determination as to whether execution of the control is to be permitted or prohibited, while eliminating influences of noise and the like.

As described above, the determination as to whether execution of the control is to be permitted or prohibited is performed by the time when the vehicle turning value Tvh (or the actual turning index Sa or the calculative turning index Se) computed on the basis of at least one of the curve information Rc, Pc and the actual turning state quantity Ta reaches the predetermined value Ths. Therefore, the determination as to whether execution of the control is to be permitted or prohibited can be completed in the first half of the approaching transition curve section of the curve under consideration. When execution of the control is permitted (e.g., Sfin=1), the vehicle speed control for decelerating the vehicle can be started in the second half of the approaching transition curve section of the same curve.

Moreover, even after vehicle speed control means C11 (to be described later) starts the vehicle speed control, the first execution judgment means C8 continues the computation of the deviation Sh. As a result, when the deviation Sh becomes greater than the predetermined value Sh2, the determination result is changed from the permission state (So=1) to the prohibition state (So=0) in order to stop the vehicle speed control which is currently executed. Here, when a state in which the turning index deviation Sh is greater than the predetermined value Sh2 continues over the predetermined range Hn2 (the predetermined distance Ls2 or the predetermined time Ts2), the determination result can be changed from the permission state (So=1) to the prohibition state (So=0). Notably, a relation Sh1<Sh2 exists between the predetermined values Sh1 and Sh2. By virtue of this relation in magnitude, it is possible to prevent occurrence of hunting of the determination result as to whether execution of the control is to be permitted or prohibited.

Target vehicle speed computation means C9 computes the target vehicle speed Vt for stably passing through the curve under consideration, on the basis of the curve information Rc, Pc and the vehicle position Pvh. The details of this computation will be described later. Vehicle speed acquisition means C10 acquires the actual vehicle speed Vx of the vehicle.

Vehicle speed control means C11 considers a "control start/end condition" and a "control permission/prohibition condition." The determination as to whether or not the in-curve vehicle speed control is to be executed is performed in accordance with the "control start/end condition." Specifically, the acquired vehicle speed Vx and the target vehicle speed Vt are compared, and the control start condition is satisfied when the actual vehicle speed Vx exceeds the target vehicle speed Vt. The control end condition is satisfied when the actual vehicle speed Vx becomes lower than the target vehicle speed Vt.

Meanwhile, the determination as to whether or not execution of the vehicle speed control is to be permitted is performed in accordance with the "control permission/prohibition condition." Specifically, the determination as to whether execution of the vehicle speed control is to be permitted or prohibited is performed on the basis of the determination result (control flag So) of the first execution judgment means C8. Furthermore, the determination as to whether execution of the vehicle speed control is to be permitted or prohibited is performed on the basis of the combination of this control flag So and control flags Sr and Ss to be described later.

When execution of the control is permitted by the first execution judgment means C8 (So=1) and the control start condition is satisfied (Vx>Vt), the in-curve vehicle speed control is actually started by the vehicle speed control means C11. Meanwhile, when execution of the control is prohibited by the first execution judgment means C8 (So=0) or the control start condition is not satisfied (Vx≤Vt), the in-curve vehicle speed control is not started actually.

Within the approaching transition curve section Zci of the curve under consideration, in addition to performing the determination as to whether execution of the vehicle speed control is to be permitted or prohibited as described above, computation of a road surface friction coefficient μmax may be performed. The computation of the road surface friction coefficient μmax is performed by road surface friction coefficient computation means C13 on the basis of the self aligning torque Sat acquired by self aligning torque acquisition means C12. In a process in which the lateral forces of the wheels increase, the self aligning torque Sat also increases. In this process, the self aligning torque Sat reaches the maximum value before the vehicle enters a state in which the lateral forces become saturated (that is, a turning limit state). Therefore, the road surface friction coefficient μmax can be estimated before the turning of the vehicle reaches the limit. The estimated road surface friction coefficient μmax is used in computation of the target vehicle speed Vt and computation in the vehicle speed control means C11.

For the detection of the self aligning torque Sat, one of publicly known methods disclosed in, for example, Japanese Patent Application Laid-Open (kokai) Nos. 2008-24073, 2007-245901, 2004-233331, etc. can be used. Furthermore, for the computation of the road surface friction coefficient μmax based on the self aligning torque, one of publicly known methods disclosed in, for example, Japanese Patent Application Laid-Open (kokai) No. 2007-245901, etc. can be used.

In the case where the first execution judgment means C8 prohibits execution of the control in a certain curve, the fact that execution of the control is prohibited can be stored such that it is related to the curve information. In this case, it is possible to prevent the vehicle speed control from being performed when the vehicle passes through that curve again. As a result, in the case where a second half portion of a curve has been renovated, the vehicle speed control is prohibited even in a first half portion of the curve, whereby an unnatural sensation imparted to the driver can be suppressed.

(Details of the Determination as to Whether Execution of the Control is to be Permitted or Prohibited Through Comparison Between the Actual Turning Index and the Calculative Turning Index)

Figure 23:
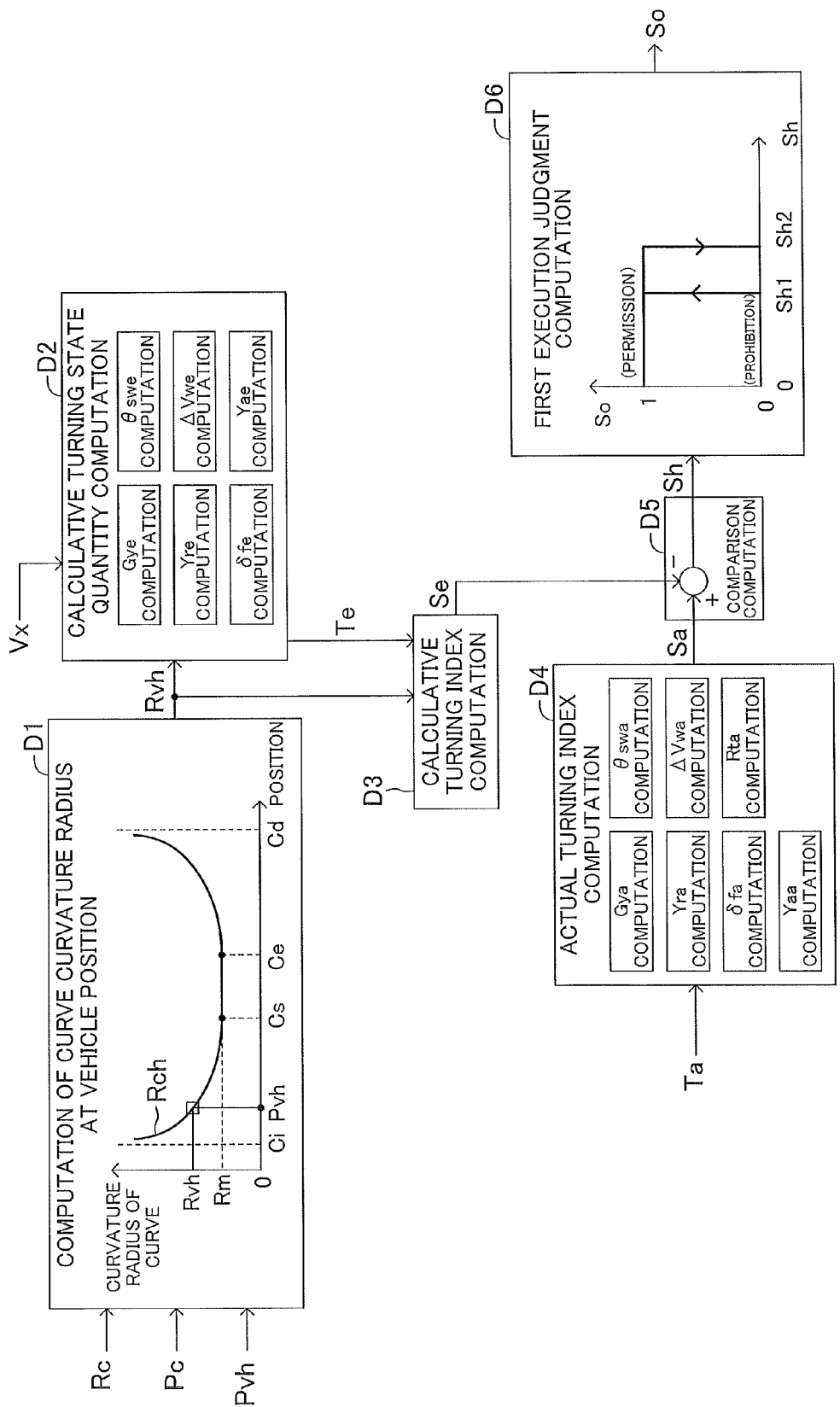
FIG. 23 is a functional block diagram for describing the determination computation performed by the first execution judgment means shown in FIG. 22.

Next, with reference to FIG. 23, there will be described in detail the determination as to whether execution of the control is to be permitted or prohibited (setting of the control flag So) through comparison between the actual turning index and the calculative turning index, which determination is executed by the present apparatus (the first execution judgment means C8 shown in FIG. 22).

In a curve curvature radius computation block D1, the curvature radius Rvh of the curve at the vehicle position Pvh is computed. The vehicle position Pvh is detected by use of the global positioning system.

Specifically, first, the relation (curvature radius computation characteristic) Rch between the position Pc within the curve and the curvature radius Rc is computed on the basis of the curve information Rc, Pc. The curvature radius computation characteristic Rch can be estimated on the basis of a curve obtained by geometrically and smoothly connecting the positions of a plurality of points (nodes) on a road, which are stored in advance (see, for example, Japanese Patent No. 3378490). Alternatively, the curvature radius computation characteristic Rch can be stored in the map information database by use of a function representing a transition curve (e.g., clothoid curve) and parameters or the like.

The curve curvature radius Rvh at the vehicle position Pvh is computed on the basis of the curvature radius computation characteristic Rch. That is, by means of inputting the vehicle position Pvh to the curvature radius computation characteristic Rch defined by the relation between position and curvature radius, the curve curvature radius Rvh at the vehicle position Pvh is computed.

In a calculative turning state quantity computation block D2, a calculative turning state quantity Te is computed on the basis of the computed curvature radius Rvh. The following state quantities can be computed as the calculative turning state quantity Te.

Calculative lateral acceleration $Gye = Vx^2/Rvh$

Calculative yaw rate $Yre = Vx/Rvh$

Calculative steering angle $\delta fe = [L \cdot (1 + Kh \cdot Vx^2)]/Rvh$

Calculative steering wheel angle $\theta swe = [SG \cdot L \cdot (1 + Kh \cdot Vx^2)]/Rvh$ Calculative wheel speed difference $\Delta Vwe = (Tr \cdot Vx)/Rvh$ Calculative heading angle Yae (the angle of the tangential direction of the curve at the vehicle position Pvh in relation to the direction of the straight section before the curve entrance)

Here, Kh is a stability factor, L is the wheel base of the vehicle, Tr is the tread of the vehicle, and SG is the steering gear ratio of the vehicle.

In a calculative turning index computation block D3, the calculative turning index Se is computed on the basis of the calculative turning state quantity Te. The curve curvature radius Rvh computed as described above can be used as is as the calculative turning index Se. Moreover, two or more of different calculative turning indices Se computed on the basis of the above-described different calculative turning state quantities may be combined so as to compute the calculative turning index Se. The blocks D1, D2, and D3 correspond to the above-described calculative turning index computation means C3.

In an actual turning index computation block D4, the actual turning index Sa is computed on the basis of the actual turning state quantity Ta. Physical quantities (state quantities) which are identical to each other (in terms of order) are computed as the actual turning index Sa and the calculative turning index Se. For example, in the case where the calculative turning index Se is the curve curvature radius Rvh, the curve curvature radius Rta is computed on the basis of the actual turning state quantity Ta as the actual turning index Sa corresponding to the calculative turning index Se (as to the details of computation of Rta, see FIG. 21). The block D4 corresponds to the above-described actual turning index computation means C5.

In a comparison computation block D5, the calculative turning index Se and the actual turning index Sa are compared. The absolute value of the deviation (turning index deviation) between the actual turning index Sa and the calculative turning index Se can be used as the comparison result Sh. The block D5 corresponds to the above-described comparison means C6.

In a first execution judgment computation block D6, the determination as to whether or not the vehicle speed control is to be executed is performed on the basis of the turning index deviation Sh. When the turning index deviation Sh is equal to or less than a predetermined value Sh1, the determination result is set to the permission state, and the control flag So (=1) is output. Meanwhile, when the deviation Sh is greater than the predetermined value Sh1, the determination result is set to the prohibition state, and the control flag So (=0) is output.

The determination as to whether execution of the deceleration control is to be permitted or prohibited can be performed on the basis of a change in the deviation Sh from a point in time when the vehicle has entered the curve to a point in time at which a vehicle turning value Tvh (or the actual turning index Sa or the calculative turning index Se) computed on the basis of at least one of the curve information Rc, Pc and the actual turning state quantity Ta reaches a predetermined value Ths. Furthermore, when a state in which the turning index deviation Sh is equal to or less than the predetermined value Sh1 continues over a predetermined range Hn1 (a predetermined distance Ls1 or a predetermined time Ts1), the determination result can be set to the permission state (So=1). This operation enables stable determination as to whether the deceleration control is to be permitted or prohibited, while eliminating influences of noise and the like.

The determination as to whether the deceleration control is to be permitted or prohibited is continued even after the vehicle speed control is started by the vehicle speed control means C11. In the case where the turning index deviation Sh becomes larger than a predetermined value Sh2 during execution of the vehicle speed control, the determination result can be changed from the permission state (So=1) to the prohibition state (So=0). Furthermore, in the case where a state in which the turning index deviation Sh is greater than the predetermined value Sh2 continues over a predetermined range Hn2 (a predetermined distance Ls2 or a predetermined time Ts2) during execution of the vehicle speed control, the determination result can be changed from the permission state (So=1) to the prohibition state (So=0). As a result, the vehicle speed control which is being executed can be stopped. Here, a relation Sh1<Sh2 exists between the predetermined value Sh1 and the predetermined value Sh2. By virtue of this relation, it is possible to prevent occurrence of hunting of the determination result as to whether to permit or prohibit execution of the control. The block D6 corresponds to the above-described first execution judgment means C8.

(Details of Computation of the Target Vehicle Speed)

Next, the details of the computation of the target vehicle speed Vt executed by the present apparatus (the target vehicle speed computation means C9 shown in FIG. 22) will be described with reference to FIG. 24.

In a proper vehicle speed computation block D7, a proper vehicle speed Vqo at which the vehicle can properly pass through the curve (in particular, the constant curvature radius section Zit) is computed. Specifically, the curvature radius Rm of a section of the curve in which the radius of curvature becomes constant (the constant curvature radius section Zit) is judged on the basis of the curve information Rc, Pc. The proper vehicle speed Vqo is computed on the basis of the curvature radius Rm. The proper vehicle speed Vqo can also be calculated on the basis of the minimum curvature radius within the curve.

The greater the curvature radius Rm, the greater the computed value of the proper vehicle speed Vqo. The proper vehicle speed Vqo is judged so that the vehicle can pass through the curve with a generally constant lateral acceleration corresponding to the curvature radius.

Furthermore, the proper vehicle speed Vqo may be adjusted on the basis of at least one of uphill/downhill grade Kud, road width Wrd, front visibility Msk, and vehicle speed Vx. When the uphill/downhill grade Kud indicates that the road is downhill, the proper vehicle speed Vqo is adjusted to a smaller value as compared with the case where the road is horizontal. When the uphill/downhill grade Kud indicates that the road is uphill, the proper vehicle speed Vqo is adjusted to a larger value as compared with the case where the road is horizontal. When the road width Wrd is small, the proper vehicle speed Vqo is adjusted to a smaller value as compared with the case where the road width Wrd is large. When the road width Wrd is large, the proper vehicle speed Vqo is adjusted to a larger value as compared with the case where the road width Wrd is small. When the front visibility Msk is poor, the proper vehicle speed Vqo is adjusted to a smaller value as compared with the case where the visibility Msk is good. When the front visibility Msk is good, the proper vehicle speed Vqo is adjusted to a larger value as compared with the case where the visibility Msk is poor. When the vehicle speed Vx is high, the proper vehicle speed Vqo is adjusted to a smaller value as compared with the case where the vehicle speed Vx is low. When the vehicle speed Vx is low, the proper vehicle speed Vqo is adjusted to a larger value as compared with the case where the vehicle speed Vx is high.

The proper vehicle speed Vqo may be adjusted on the basis of road surface friction coefficient μmax. When the road surface friction coefficient μmax is large, the proper vehicle speed Vqo is adjusted to a larger value. When the road surface friction coefficient μmax is small, the proper vehicle speed Vqo is adjusted to a smaller value.

In a reference point determination computation block D8, a reference point Pc# for performing the vehicle speed control is judged. The suffix "#" represents each reference point. Specifically, "r" represents a deceleration reference point which serves as a reference for deceleration control; "a" represents a maintenance reference point which serves as a reference for vehicle speed maintenance control; and "s" represents an acceleration reference point which serves as a reference for acceleration restraining control. A method for determining these reference points will be described later.

In a target vehicle speed computation block D9, the target vehicle speed Vt is computed. A target vehicle speed computation characteristic Vtch for computing the target vehicle speed Vt at the vehicle position Pvh is judged on the basis of the reference point Pc# and the proper vehicle speed Vqo. Specifically, the target vehicle speed computation characteristic Vtch is judged by means of combining a characteristic in which the vehicle speed decreases at a deceleration Gi (e.g., a previously set constant) from the curve entrance side to a reference point Pcr (point A), and the vehicle speed becomes the proper vehicle speed Vqo at the reference point Pcr (point A); a characteristic in which the vehicle speed is maintained at the proper vehicle speed Vqo from the reference point Pcr (point A) to a reference point Pca (point B); and a characteristic in which the vehicle speed becomes the proper vehicle speed Vqo at the reference point Pca (point B), and the vehicle speed increases at an acceleration Go (e.g., a previously set constant) from the reference point Pca (point B) to a reference point Pcs (point C) toward the curve exit.

At least one of the deceleration Gi and the acceleration Go can be adjusted on the basis of the road surface friction coefficient μmax. When the road surface friction coefficient μmax is large, the deceleration Gi or the acceleration Go can be adjusted to a larger value. When the road surface friction coefficient μmax is small, the deceleration Gi or the acceleration Go can be adjusted to a smaller value.

The target vehicle speed Vt at the vehicle position Pvh is computed by means of inputting the vehicle position Pvh to the target vehicle speed computation characteristic Vtch judged on the basis of the reference point Pc# and the proper vehicle speed Vqo as described above. The blocks D7, D8, and D9 correspond to the above-described target vehicle speed computation means C9.

(Details of Setting of Reference Points)

Next, the details of setting of the reference point Pc# performed by the present apparatus (the reference point determination computation block D8 shown in FIG. 24) will be described with reference to FIG. 25.

<Setting of the Deceleration Reference Point Pcr>

The deceleration reference point Pcr can be set at the entrance point Cs of the curve at which the radius of curvature becomes constant (a point within the constant curvature radius section closest to the vehicle). Alternatively, the point Cs within the curve at which the radius of curvature becomes the minimum may be set as the reference point Pcr. The point Cs is judged on the basis of the curve shape Rc and the curve position Pc.

The point Pcr can be set so that it coincides with the entrance point Cs of the constant curvature radius section or a point shifted toward the vehicle from the point of the minimum radius of curvature by a distance Lpr (in the vicinity of an end portion of a transition curve corresponding to an approaching portion to the curve closer to the vehicle). The distance Lpr may be a constant value.

In a block D10, the distance Lpr can be computed in accordance with the proper vehicle speed Vqo. Specifically, when the proper vehicle speed Vqo is equal to or less than a predetermined value Vq1, the distance Lpr is set to "0" (that is, the point Pcr coincides with Cs); and when Vqo>Vq1 (predetermined value), the distance Lpr is set to increase from "0" as the proper vehicle speed Vqo increases from Vq1.

In this case, in a block D11, the point Pcr is set such that it coincides with a point on the curve shifted from the point Cs toward the curve start point Ci by the distance Lpr. That is, the point Pcr is set on the basis of the distance Lpr, the curve shape Rc, and the point Cs (curve position Pc).

The point Pcr is a target point which is used to decrease the vehicle speed to the proper vehicle speed Vqo. In some cases, the map information, etc. contain errors. Such errors can be eliminated by means of setting the point Pcr such that it coincides with a point shifted from the point Cs toward the curve entrance Ci by the distance Lpr. That is, within the curve, the vehicle speed control is started a little early, whereby the vehicle speed can be decreased to the proper vehicle speed Vqo without fail at a point on the curve shifted from the point Pcr toward the curve entrance Ci.

<Setting of the Maintenance Reference Point Pca>

The vehicle speed maintenance reference point Pca can be set at the exit point Ce of the curve at which the radius of curvature becomes constant (a point within the constant curvature radius section most remote from the vehicle). The point Ce is judged on the basis of the curve shape Rc and the curve position Pc.

The point Pca can be set, on the basis of the exit point Ce of the constant curvature radius section, such that it coincides with a point shifted toward the vehicle from the point Ce by a distance Lpa (in the vicinity of an end portion of the constant curvature radius section). The distance Lpa may be a constant value.

In a block D12, the distance Lpa can be computed in accordance with at least one of the distance Lit of the constant curvature radius section and the proper vehicle speed Vqo. Specifically, when the distance Lit is equal to or less than a predetermined value Li1, the distance Lpa is set to "0" (that is, the point Pca coincides with the point Ce); and, when Lit>Li1 (predetermined value), the distance Lpa is judged such that the distance Lpa increases from "0" as the distance Lit increases from Li1. Furthermore, the distance Lpa can be computed such that the greater the proper vehicle speed Vqo, the smaller the computed value of the distance Lpa.

In this case, in a block D13, the point Pca is set such that it coincides with a point on the curve shifted from the point Ce toward the curve entrance Ci by the distance Lpa. That is, the point Pca is set on the basis of the distance Lpa, the curve shape Rc, and the point Ce (curve position Pc).

In the in-curve vehicle speed control, the vehicle speed Vx is controlled (restricted) such that the vehicle speed Vx changes, without exceeding the proper vehicle speed Vqo, between the point Pcr and the point Pca. The purpose of setting the point Pca at a point on the curve shifted from the point Ce toward the curve entrance Ci by the distance Lpa is to reflect a driver's will of accelerating a little early toward the curve exit in a state in which the vehicle speed Vx is controlled to the proper vehicle speed Vqo or less. Furthermore, in order to secure stable traveling of the vehicle, the distance Lpa can be set such that the distance Lpa decreases as the vehicle speed increases. Thus, it is possible to prevent the operation of maintaining the vehicle speed from being cancelled too early (prevent acceleration from being permitted too early).

<Setting of the Acceleration Reference Point Pcs>

The acceleration reference point Pcs can be set, on the basis of the exit point Ce of the constant curvature radius section, such that it coincides with a point shifted from the point Ce in a direction away from the vehicle by a distance Lps. The distance Lps may be a constant value.

In a block D14, the distance Lps can be computed in accordance with at least one of the proper vehicle speed Vqo and the distance Led of the departing transition curve section. Specifically, the distance Lps is computed to increase with the proper vehicle speed Vqo and to increase with the distance Led.

In this case, in a block D15, the point Pcs is set such that it coincides with a point on the curve shifted from the point Ce toward the curve exit Cd by the distance Lpa. That is, the point Pcs is set on the basis of the distance Lps, the curve shape Rc, and the point Ce (curve position Pc).

In the in-curve vehicle speed control, acceleration of the vehicle is restricted between the point Pca and the point Pcs. That is, the acceleration of the vehicle in response to a driver's acceleration operation is restricted to a smaller degree as compared with an ordinary case where the in-curve vehicle speed control is not executed. The purpose of computing the distance Lps such that it increases with the proper vehicle speed Vqo is to increase a distance over which the acceleration is restricted when the vehicle speed is large, to thereby secure stable traveling. The purpose of computing the distance Lps such that it increases with the distance Led is to execute the acceleration restriction in an entrance-side portion of the departing transition curve section, the length of the portion having a constant percentage to the entire length of the departing transition curve section, irrespective of the length of the departing transition curve section, to thereby secure stable traveling. The blocks D10, D11, D12, D13, D14, and D15 correspond to the above-described target vehicle speed computation means C9.

(Details of Processing by the Vehicle Speed Control Means)

Figure 26:
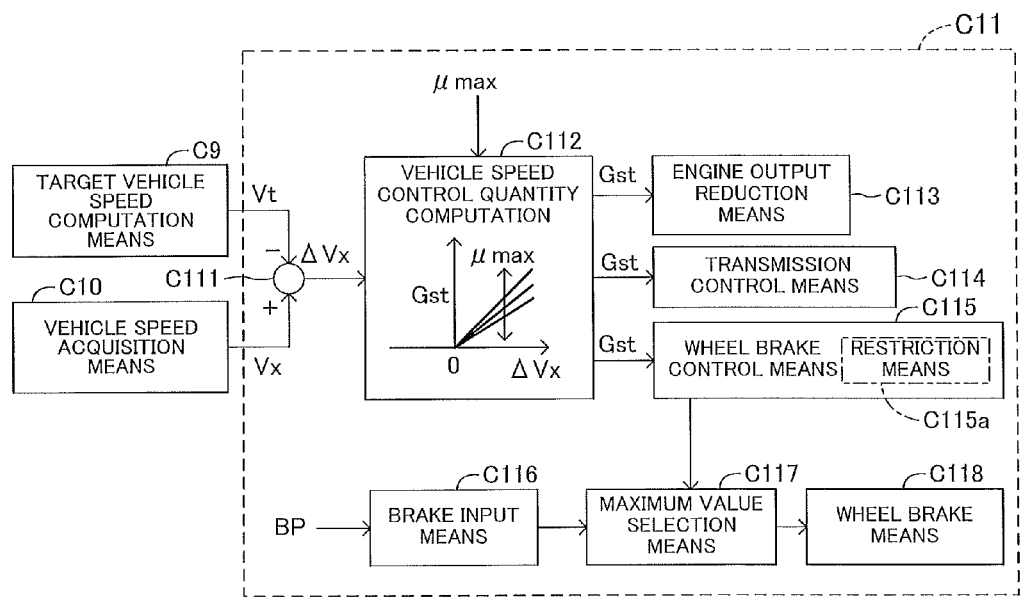
FIG. 26 is a functional block diagram for describing the vehicle speed control performed by the vehicle speed control means shown in FIG. 22.

The processing performed by the vehicle speed control means C11 shown in FIG. 22 will be described in detail with reference to FIG. 26.

First, comparison means C111 computes the deviation $\Delta Vx$ ($=Vx-Vt$) between the current actual vehicle speed Vx obtained by the vehicle speed acquisition means C10 (see FIG. 22) and the target vehicle speed Vt at the vehicle position Pvh obtained by the target vehicle speed computation means C9.

In a vehicle speed control quantity computation block C112, a vehicle speed control quantity Gst is computed on the basis of the vehicle speed deviation $\Delta Vx$. The vehicle speed control quantity Gst is computed as follows. When the deviation $\Delta Vx$ is negative, the vehicle speed control quantity Gst is "0." When the deviation $\Delta Vx$ is positive, the vehicle speed control quantity Gst increases with the deviation $\Delta Vx$. The vehicle speed control quantity Gst can be adjusted on the basis of the road surface friction coefficient $\mu max$. In this case, the greater the road surface friction coefficient $\mu max$, the greater the value to which the vehicle speed control quantity Gst is adjusted.

In the case where the determination result of the first execution judgment means C8 is in the permission state (So=1), on the basis of the vehicle speed control quantity Gst, at least one of engine output reduction means C113, transmission control means C114 and wheel brake control means C115 is operated such that the actual vehicle speed Vx does not exceed the target vehicle speed Vt. The engine output reduction means C113 reduces the output of the engine (executes at least one of an operation of decreasing throttle opening, an operation of delaying ignition timing, and an operation of reducing fuel injection amount). The transmission control means C114 enhances engine braking through transmission control (increases the reduction ration of the transmission through down shift). The wheel brake control means C115 produces a braking torque (braking pressure).

As a result, the in-curve vehicle speed control is executed, whereby the vehicle is decelerated in accordance with the vehicle speed control quantity Gst. Meanwhile, when the determination result is in the prohibition state (So=0), the in-curve vehicle speed control is not executed.

When a driver operates the brake operation member (brake pedal BP), maximum value selection means C117 selects a larger one of the braking torque (braking pressure) generated by the wheel brake control means C115 and a braking torque (braking pressure) corresponding to the amount of operation of the brake operation member obtained by brake input means C116. The selected braking torque (braking pressure) is applied to a predetermined wheel(s) by making use of wheel brake means C118 (e.g., a brake disc and a caliper). As a result, during the in-curve vehicle speed control, overriding of the braking torque based on the driver's braking operation becomes possible.

The wheel brake control means C115 includes restriction means C115a for restricting the increase gradient of the braking torque with respect to time to a predetermined value Lwc. The purpose of this restriction is to prevent a stepwise increase of the vehicle speed control quantity Gst from "0" to thereby prevent abrupt deceleration of the vehicle, which stepwise increase would otherwise occur when the determination result is changed to the permission state (So=1) in a state in which the above-described control start condition (Vx>Vt) is satisfied and the determination result is in the prohibition state (So=0).

Also, the restriction means C115a restricts the decrease gradient of the braking torque with respect to time to a predetermined value Lwd. The purpose of this restriction is to prevent a stepwise decrease of the vehicle speed control quantity Gst to "0" to thereby prevent the deceleration of the vehicle from decreasing abruptly, which abrupt decreasing would otherwise occur when the determination result is changed from the permission state (So=1) to the prohibition state (So=0) in a state in which the in-curve vehicle speed control is being executed (Gst>0).

Figure 27:
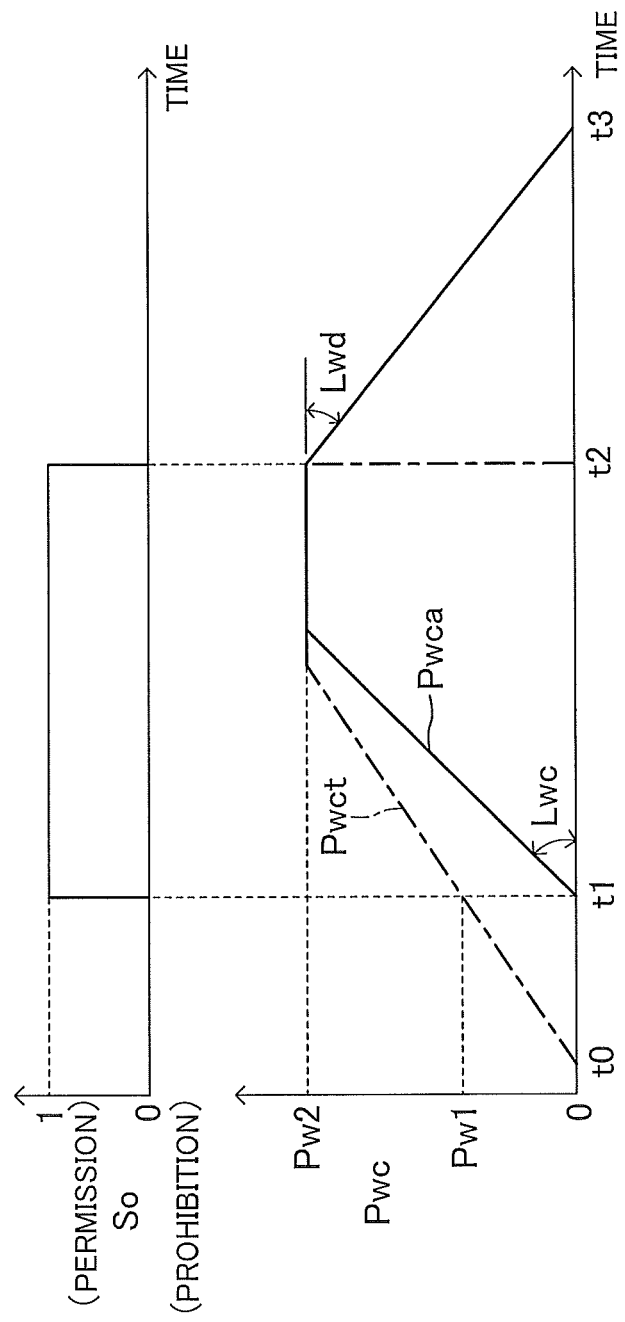
FIG. 27 is a flowchart for describing an operation of restriction means of the wheel brake control means shown in FIG. 26 for restricting the changing gradient of braking torque.

The action and effects of the above-described operation of restricting the changing gradient of the braking torque with respect to time by the restriction means C115a will be described with reference to FIG. 27.

Even in the case where the relation Vx>Vt is satisfied (ΔVx>0) and the vehicle speed control quantity Gst (>0) is generated, the in-curve vehicle speed control is not executed if the determination result of the first execution judgment means C8 is in the prohibition state. However, in this case, a target control quantity (e.g., a target braking hydraulic pressure Pwct) for the wheel brake is generated on the basis of the vehicle speed control quantity Gst (>0).

It is assumed that the determination result was in the prohibition state (So=0) before time t0, and the actual vehicle speed Vx has become greater than the target vehicle speed Vt at time t0 in a state in which the determination result is maintained in the prohibition state. In this case, after t0, the vehicle speed control quantity Gst (>0) is generated, and the target braking hydraulic pressure Pwct for the wheel brake (see a chain line in the drawing) is generate. However, since the determination result is still in the prohibition state, the actual control quantity (e.g., actual braking hydraulic pressure Pwca) is not generated (maintained at "0").

It is assumed that the determination result is switched from the prohibition state (So=0) to the permission state (So=1) at time t1. In this case, if the actual control quantity (actual braking hydraulic pressure Pwca) equal to the already generated target braking hydraulic pressure Pwct is assumed to be generated, immediately after time t1, the actual braking hydraulic pressure Pwca increases stepwise from "0" to Pw1. As a result, the vehicle decelerates sharply, which imparts an unnatural sensation to the driver.

In contrast, in the present apparatus, a restriction (time gradient restriction value Lwc) is imposed on the increase gradient, with respect to time, of the control quantity (braking pressure, braking torque) of the wheel brake control means C115. Since the time gradient restriction value Lwc is set, the increase gradient of the actual braking hydraulic pressure Pwca (braking torque) with respect to time does not exceed the value Lwc. As a result, after time t1, the actual braking hydraulic pressure Pwca increases from "0" at an increase gradient equal to Lwc (see a solid line in the drawing). With this operation, the sharp deceleration of the vehicle can be restrained. The restriction on the increase gradient of the actual control quantity (braking pressure, braking torque) of the wheel brake control means C115 may be achieved by means of imposing a restriction on the target control quantity or by means of mechanically imposing a restriction on the actual control quantity (e.g., in the case of braking hydraulic pressure, a restriction by an orifice or the like).

Similarly, when the determination result is switched from the permission state (So=1) to the prohibition state (So=0) in a state in which the in-curve vehicle speed control is being executed and the control quantity (braking pressure, braking torque) of the wheel brake control means C115 is generated, a restriction (time gradient restriction value Lwd) is imposed on the decrease of the control quantity (braking pressure, braking torque) of the wheel brake control means C115.

It is assumed that, in a period in which the in-curve vehicle speed control is being executed, the determination result is switched from the permission state (So=1) to the prohibition state (So=0) at time t2. In this case, if the generation of the actual control quantity (actual braking hydraulic pressure Pwca) having already being generated is assumed to be stopped, immediately after time t2, the actual braking hydraulic pressure Pwca decreases stepwise from Pw2 to "0." As a result, the deceleration of the vehicle decreases sharply, which imparts an unnatural sensation to the driver.

In contrast, in the present apparatus, a restriction (time gradient restriction value Lwd>0) is imposed on the decrease of the control quantity (braking pressure, braking torque) of the wheel brake control means C115. Since the time gradient restriction value Lwd is set, the decrease gradient of the actual braking hydraulic pressure Pwca (braking torque) with respect to time does not exceed the value Lwd. As a result, after time t2, the actual braking hydraulic pressure Pwca decreases from Pw2 at a decrease gradient equal to Lwd (see a solid line in the drawing). With this operation, the sharp decrease of the deceleration of the vehicle is restrained. The restriction on the decrease gradient of the actual control quantity (braking pressure, braking torque) of the wheel brake control means C115 may be achieved by means of imposing a restriction on the target control quantity or by means of mechanically imposing a restriction on the actual control quantity (e.g., in the case of braking hydraulic pressure, a restriction by an orifice or the like).

(Action)

Next, with reference to FIG. 28, the action of the present apparatus will be described for the case where the present apparatus performs the in-curve vehicle speed control, while determining whether execution of the vehicle speed control is to be permitted or prohibited.

A point e1 is the curve entrance Ci, and an approaching transition curve section Zci starts from the point e1. As a result of the driver rotating the steering wheel to cause the vehicle to travel along the curve of the approaching transition curve section Zci, after the point e1, the vehicle turning value Tvh (or actual turning index Sa, calculative turning index Se) representing the turning state of the vehicle increases.

After the point e1, the actual turning index Sa is computed on the basis of the actual vehicle turning state quantity Ta. Furthermore, the curvature radius Rvh at the present vehicle position Pvh is computed on the basis of the curve information Rc, Pc, and the calculative turning index Se is computed on the basis of the curvature radius Rvh. At the point e1, the determination result of the first execution judgment means C8 is initialized to the prohibition state (So=0).

Figure 28:
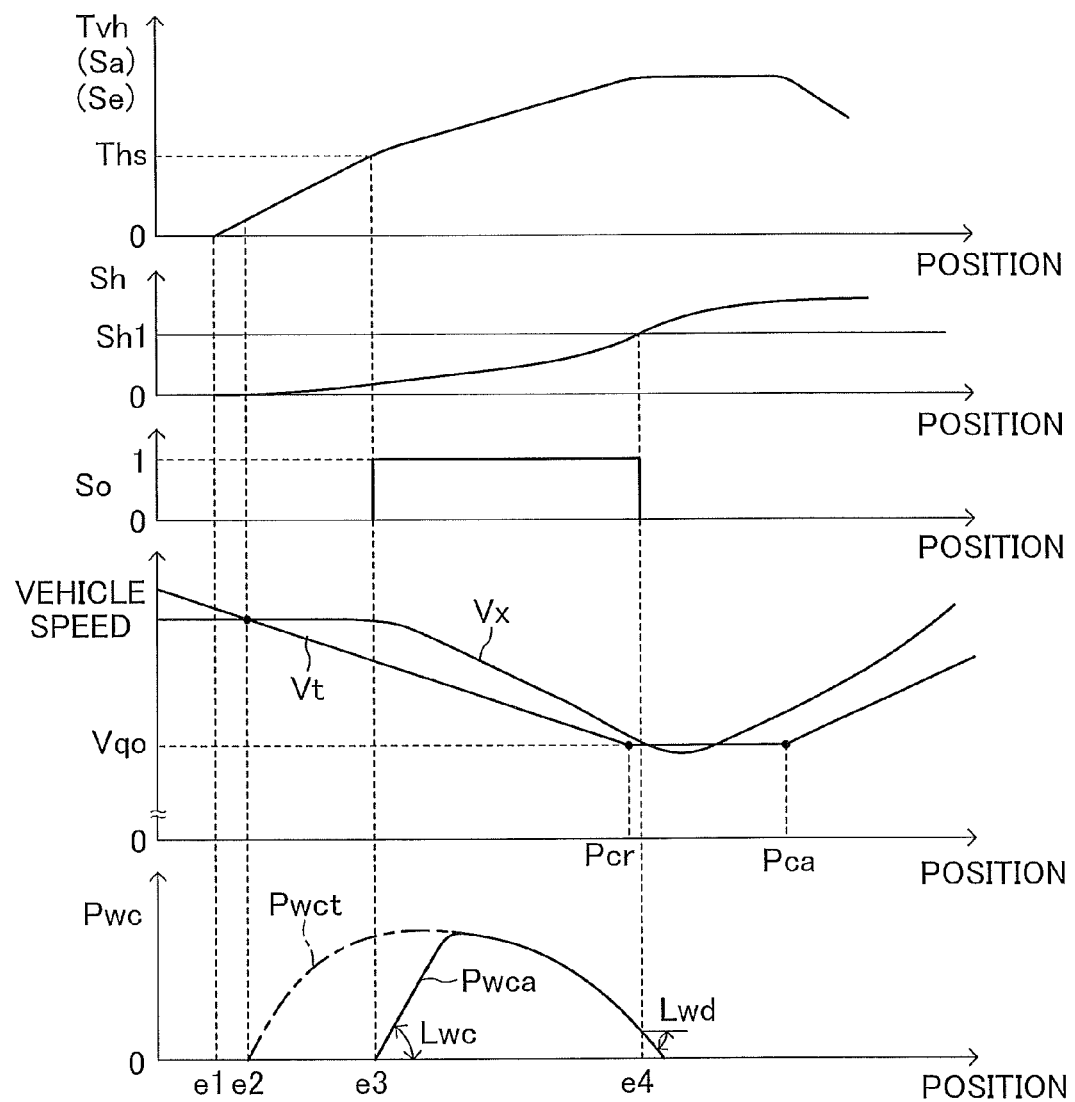
FIG. 28 is a time chart showing an example case where vehicle speed control is executed by the traveling control apparatus for a vehicle according to the second embodiment of the present invention.

In the example shown in FIG. 28, when the vehicle passes through the point e2, the actual vehicle speed Vx becomes greater than the target vehicle speed Vt, and the vehicle speed deviation $\Delta Vx$ (=Vx−Vt) is generated. As a result, the vehicle speed control quantity Gst (>0) judged on the basis of the vehicle speed deviation $\Delta Vx$ is produced. However, since the determination result is maintained in the prohibition state (So=0), the in-curve vehicle speed control is not started. Specifically, although the target braking torque (target braking pressure) Pwct (shown by a chain line in the drawing) is computed on the basis of Gst based on $\Delta Vx$, the actual braking torque (actual braking pressure) Pwca is not generated.

Before a point in time when the vehicle turning value Tvh (or actual turning index Sa, calculative turning index Se) reaches the predetermined value Ths, the actual turning index Sa and the calculative turning index Se are computed, and the determination as to whether execution of the vehicle speed control is to be permitted or prohibited is performed on the basis of the comparison result Sh (=|Sa−Se|). When a state in which the turning index deviation Sh is equal to or less than the predetermined value Sh1 continues until the vehicle turning value Tvh or the like reaches the predetermined value Ths, the determination result is changed from the prohibition state (So=0) to the permission state (So=1). Meanwhile, when the turning index deviation Sh becomes greater than the predetermined value Sh1, the determination result is maintained in the prohibition state (So=0).

In the example shown in FIG. 28, at a point e3, the vehicle turning value Tvh (or actual turning index Sa, calculative turning index Se) reaches the predetermined value Ths, and a state in which the turning index deviation Sh is equal to or less than the predetermined value Sh1 continues up to the point e3. Accordingly, at the point e3, the determination result is changed from the prohibition state (So=0) to the permission state (So=1). As a result, at the point e3, the in-curve vehicle speed control is started, and the vehicle starts deceleration.

As described above, the time gradient restriction value Lwc is provided for the increase of the braking torque (braking pressure). Therefore, after the point e3, the actual braking torque (braking pressure) Pwca does not increase sharply, and, accordingly, the vehicle is not decelerated sharply. When the actual braking torque (braking pressure) whose increase gradient is restricted increases and reaches the target braking torque (target braking pressure), after that, the actual braking torque (braking pressure) is adjusted such that it coincides with the target braking torque (target braking pressure).

In the example shown in FIG. 28, the deviation Sh becomes greater than the predetermined value Sh1 at the point e4. As a result, the determination result is changed from the permission state (So=1) to the prohibition state (So=0) at the point e4. Accordingly, the deceleration by the in-curve vehicle speed control is interrupted. As described above, the time gradient restriction value Lwd is provided for the decrease of the braking torque (braking pressure). Therefore, after the point e4, the actual braking torque (braking pressure) Pwca does not decrease sharply, and, accordingly, sharp decrease of the vehicle deceleration is restrained.

In the example shown in FIG. 28, the control start condition (Vx>Vt) is first satisfied, and execution of the control is then permitted. However, in some cases, the control start condition (Vx>Vt) is satisfied after execution of the control is permitted, whereby the in-curve vehicle speed control is started.

As described above, according to the traveling control apparatus for a vehicle according to a second embodiment of the present invention, after the vehicle has entered a curve, there is computed the deviation Sh between the actual turning index Sa based on the actual turning state quantity Ta, and the calculative turning index Se based on the vehicle position Pvh and the curve information Rc, Pc. In the case where the deviation Sh changes, without exceeding the predetermined value Sh1, over a period between the entry into the curve and a point in time when the index Sa or Se reaches the predetermined value Ths, the reliability of the curve information Rc, Pc is judged to be high, and a determination (So=1) for permitting execution of the in-curve vehicle speed control is made. Otherwise, the reliability of the curve information Rc, Pc is judged to be low, and a determination (So=0) for prohibiting execution of the in-curve vehicle speed control is made. The in-curve vehicle speed control is started and executed only when the control start condition (Vx>Vt) is satisfied, and execution of the control is permitted (So=1). Accordingly, even when the control start condition is satisfied, the in-curve vehicle speed control is not started if execution of the control is prohibited (So=0).

Therefore, the in-curve vehicle speed control can be executed on the basis of only curve information whose reliability is sufficiently high. In other words, it is possible to prevent the in-curve vehicle speed control from unnecessarily being started and executed on the basis of curve information which is low in reliability. For example, in the case where the acquired curve information Rc, Pc and the actual shape of the curve differ because of renovation of the curve in the vicinity of the curve entrance (in particular, renovation to change a curved section to a straight section), the in-curve vehicle speed control, which should not be started, can be prohibited from being started.

Furthermore, the determination as to whether execution of the control is to be permitted or prohibited is made before the actual turning state quantity Sa or the calculative turning state quantity Se reaches the predetermined value Ths. Therefore, the determination as to whether execution of the control is to be permitted or prohibited can be completed in the first half of the approaching transition curve section of the curve under consideration. When execution of the control is permitted (So=1), the vehicle speed control for decelerating the vehicle can be started in the second half of the approaching transition curve section of the same curve.

Even after the in-curve vehicle speed control is started within the curve, the computation of the deviation Sh is continued. As a result, when the deviation Sh becomes greater than the predetermined value Sh1 (Sh2), the determination result is changed from the permission state (So=1) to the prohibition state (So=0), whereby the in-curve vehicle speed control which is being executed, is interrupted. For example, in the case where renovation is not performed in the vicinity of the curve entrance but renovation is performed only in the vicinity of the curve exit, when the vehicle passes through the vicinity of the curve entrance, the determination result is brought into the permission state (So=1), whereby the in-curve vehicle speed control is started. However, when the vehicle passes through the vicinity of the curve exit, the determination result is changed from the permission state (So=1) to the prohibition state (So=0), whereby the in-curve vehicle speed control which is being executed can be stopped.

The present invention is not limited to the above-described second embodiment, and various modifications can be employed within the scope of the present invention. For example, in the above-described second embodiment, the in-curve vehicle speed control is executed by use of the target vehicle speed Vt computed in the block D9 of FIG. 24. However, this target vehicle speed Vt may be adjusted on the basis of the amount Ap of the driver's operation of the accelerating operation member AP.

Figure 29:
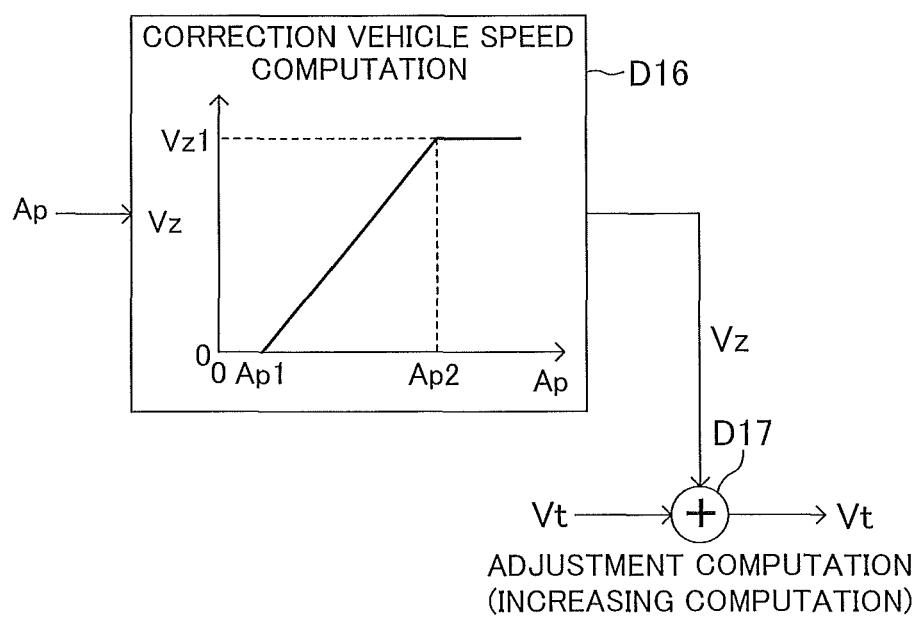
FIG. 29 is a functional block diagram for describing computation for the case where the target vehicle speed is adjusted on the basis of an amount by which an accelerating operation member is operated by a driver.

Specifically, in a correction vehicle speed computation block D16 shown in FIG. 29, a correction vehicle speed Vz is computed on the basis of the accelerating operation amount Ap. The correction vehicle speed Vz is computed as follows. When the accelerating operation amount Ap is equal to or less than Ap1 (predetermined value), the correction vehicle speed Vz is set to "0." When Ap>Ap1, the correction vehicle speed Vz is computed to increase from "0" as the accelerating operation amount Ap increases from Ap1. Moreover, an upper limit vehicle speed Vz1 may be provided for the correction vehicle speed Vz such that, when the accelerating operation amount Ap is equal to or greater than Ap2 (predetermined value), the correction vehicle speed Vz is maintained at Vz1 (predetermined value).

Figure 24:
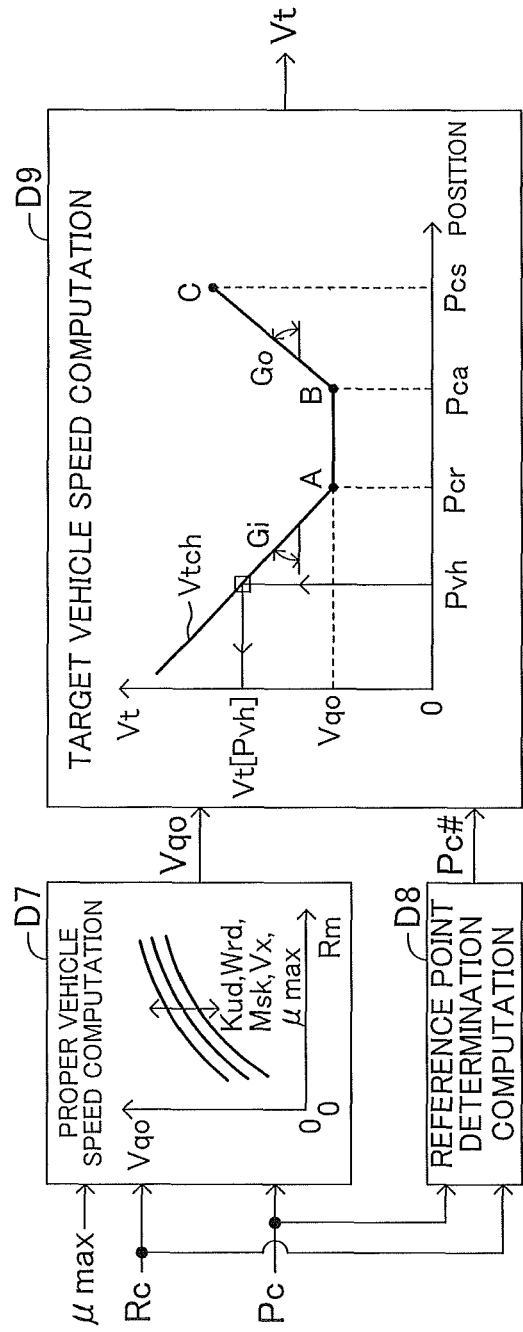
FIG. 24 is a functional block diagram for describing the computation of the target vehicle speed performed by the target vehicle speed computation mean shown in FIG. 22.
Figure 25:
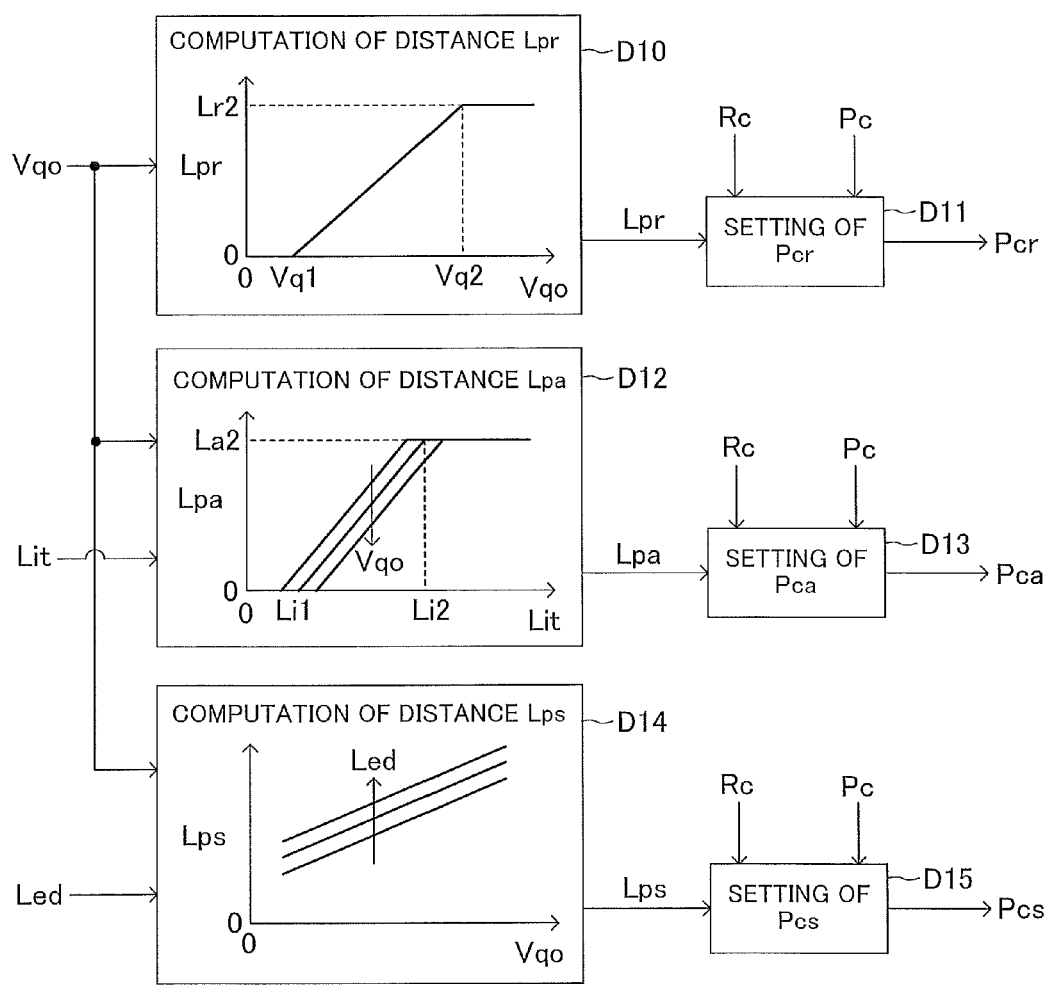
FIG. 25 is a functional block diagram for describing reference point determination computation shown in FIG. 24.

In an adjustment computation block D17, the correction vehicle speed Vz is added to the target vehicle speed Vt computed in the block D9 of FIG. 24, whereby an adjusted target vehicle speed Vt (=Vt+Vz) is computed. Then, the in-curve vehicle speed control is executed such that the vehicle speed Vx does not exceed this adjusted target vehicle speed Vt.

As described above, the driver's intention of accelerating the vehicle can be reflected on the in-curve vehicle speed control by means of computing the correction vehicle speed Vz on the basis of the accelerating operation amount Ap, and adjusting the target vehicle speed Vt to increase by the correction vehicle speed Vz. Moreover, through provision of the upper limit vehicle speed Vz1, unnecessary acceleration of the vehicle can be suppressed.

In the above-described second embodiment, the evaluation of the reliability of the curve information (accordingly, the determination as to whether execution of the control is to be permitted or prohibited) is made on the basis of only the determination computation (control flag So) performed by the first execution judgment means C8 on the basis of the turning index deviation Sh. However, in order to further improve the accuracy (reliability) of this determination, as shown in FIG. 30, there may be further provided determination computation different from that performed by the first execution judgment means C8 (determination computation on the basis of the deviation Sh).

The first execution judgment means C8 corresponds to the "first execution judgment means." One of a second execution judgment computation block D18 and a third execution judgment computation block D21 corresponds to the "second execution judgment means different from the first execution judgment means."

Figure 30:
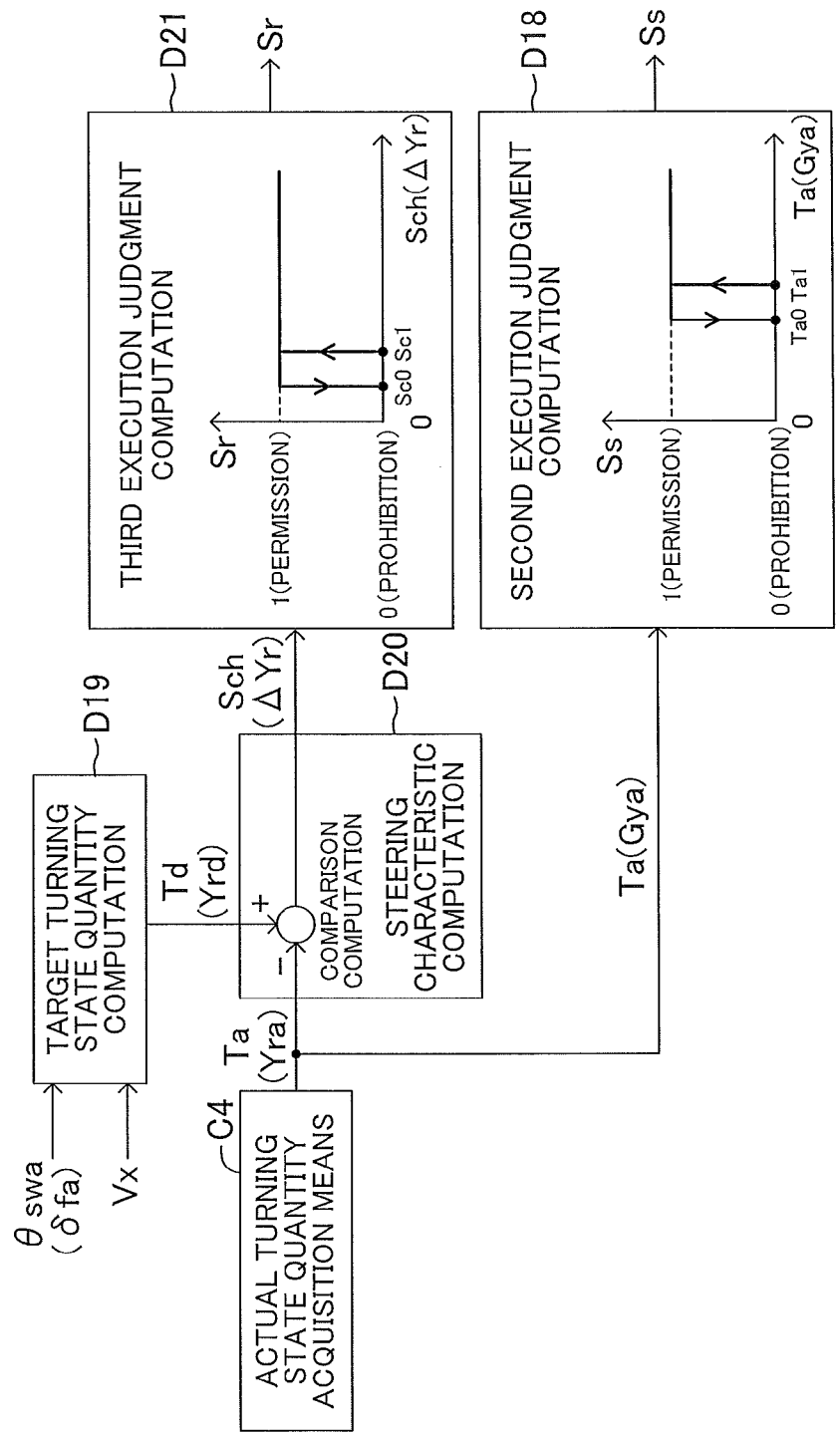
FIG. 30 is a functional block diagram for describing second and third execution judgment computations which are performed in addition to the first execution judgment computation.

In the second execution judgment computation block D18 shown in FIG. 30, computation for determining whether or not execution of the control is to be permitted or prohibited is performed on the basis of the actual turning state quantity Ta obtained by the actual turning state quantity acquisition means C4. The actual turning state quantity Ta is a yawing motion state quantity actually generated in the vehicle. Examples of the actual turning state quantity Ta include actual yaw rate Yra, actual lateral acceleration Gya, actual vehicle body slip angle βa, and actual vehicle body slip angular velocity dβa. Alternatively, a value obtained by combining two or more of the above-mentioned state quantities may be used as the actual turning state quantity Ta.

In the case where the actual turning state quantity Ta (e.g., the actual lateral acceleration Gya) is increasing, in a stage in which the actual turning state quantity Ta (e.g., the actual lateral acceleration Gya) is smaller than the predetermined value Ta1, the determination result is set to the prohibition state (Ss=0). In a stage after the actual turning state quantity Ta (e.g., the actual lateral acceleration Gya) has become equal to or greater than the predetermined value Ta1, the determination result is changed from the prohibition state (Ss=0) to the permission state (Ss=1). This determination is based on the thought "that, when the actual turning state quantity Ta is large, the possibility of the vehicle actually traveling in the curve is high, and the reliability of the curve information is high." Here, Ss is a control flag which represents prohibition/permission of execution of the control judged on the basis of the actual turning state quantity Ta; and "0" represents prohibition of execution of the control, and "1" represents permission of execution of the control.

In the case where the actual turning state quantity Ta (e.g., the actual lateral acceleration Gya) is decreasing, in a stage in which the actual turning state quantity Ta (e.g., the actual lateral acceleration Gya) is equal to or greater than the predetermined value Ta0, the determination result is set to the permission state (Ss=1). In a stage after the actual turning state quantity Ta (e.g., the lateral acceleration Gy) has become less than the predetermined value Ta0, the determination result is changed from the permission state (Ss=1) to the prohibition state (Ss=0). Here, a relation Ta0<Ta1 exists between the predetermined values Ta0 and Ta1. By virtue of this relation, it is possible to prevent occurrence of hunting of the determination result as to whether to permit or prohibit execution of the vehicle speed control.

In the third execution judgment computation block D21 shown in FIG. 30, computation for determining whether or not execution of the control is to be permitted or prohibited is performed on the basis of a steering characteristic value Sch. The steering characteristic value Sch is a value representing the steering characteristic (under steering, over steering) of the vehicle.

Specifically, in a target turning state quantity computation block D19, the turning state quantity (target turning state quantity) Td of the vehicle is computed. A physical quantity whose dimension is the same as the actual turning state quantity Ta is computed as the target turning state quantity Td. For example, in the case where the turning state quantity is yaw rate, a target yaw rate Yrd is computed as the target turning state quantity Td; and, in the case where the turning state quantity is lateral acceleration, a target lateral acceleration Gyd is computed as the target turning state quantity Td. The target yaw rate Yrd and the target lateral acceleration Gyd are computed by the following expressions.

$Yrd=(Vx\cdot\theta sw)/[SG\cdot L\cdot(1+Kh\cdot Vx^2)]$ $Gyd=(Vx^2\cdot\theta sw)/[SG\cdot L\cdot(1+Kh\cdot Vx^2)]$ In these expressions, Kh is a stability factor, L is the wheel base of the vehicle, and SG is the steering gear ratio of the vehicle.

In a steering characteristic computation block D20, the target turning state quantity Td is compared with the actual turning state quantity Ta (of the same dimension) corresponding to the target turning state quantity Td, whereby the steering characteristic Sch is computed. The deviation (Td−Ta) between the target turning state quantity Td and the actual turning state quantity Ta can be computed as the steering characteristic value Sch. Alternatively, the steering characteristic value Sch can be computed on the basis of only the actual turning state quantity Ta, with the computation of the target turning state quantity Td omitted.

When the steering characteristic value Sch is approximately "0," the vehicle exhibits neutral steering. When Sch<0, the vehicle exhibits over steering, and the degree of the over steering increases with the absolute value of the steering characteristic value Sch. Meanwhile, when Sch>0, the vehicle exhibits under steering, and the degree of the under steering increases with the steering characteristic value Sch.

In the case where the steering characteristic value Sch is computed by making use of the yaw rate, the steering characteristic Sch is judged on the basis of the deviation $\Delta Yr$ (=Yrd−Yra) between a target yaw rate Yrd and the actual yaw rate Yra detected by the yaw rate sensor YR. The steering characteristic is as follows. When the yaw rate deviation $\Delta Yr$ is approximately "0," the vehicle exhibits neutral steering. When $\Delta Yr<0$, the vehicle exhibits over steering, and the degree of the over steering increases with the absolute value of the deviation $\Delta Yr$. When $\Delta Yr>0$, the vehicle exhibits under steering, and the degree of the under steering increases with the deviation $\Delta Yr$.

In the third execution judgment computation block D21, the determination as to whether execution of the vehicle speed control is to be permitted or prohibited is performed on the basis of the steering characteristic value Sch. In the case where the steering characteristic is changing from neutral steering to under steering, in a stage in which the steering characteristic value Sch (e.g., the yaw rate deviation $\Delta Yr$) is smaller than the predetermined value Sc1, the determination result is set to the prohibition state (Sr=0). Meanwhile, in a stage after the steering characteristic value Sch (e.g., the yaw rate deviation $\Delta Yr$) has become equal to or greater than the predetermined value Sc1, the determination result is changed from the prohibition state (Sr=0) to the permission state (Sr=1). This determination is based on the thought "that, when the steering characteristic value Sch is large (when the vehicle exhibits under steering), the possibility that the vehicle actually travels along a curve may be high, and the reliability of the curve information may be high." Here, Sr is a control flag which represents prohibition/permission of execution of the control judged on the basis of the steering characteristic value Sch; and "0" represents prohibition of execution of the control, and "1" represents permission of execution of the control.

Meanwhile, in the case where the steering characteristic is changing from under steering to neutral steering, in a stage in which the steering characteristic value Sch (e.g., the yaw rate deviation $\Delta Yr$) is greater than the predetermined value Sc0, the determination result is set to the permission state (Sr=1). In a stage after the steering characteristic value Sch (e.g., the yaw rate deviation $\Delta Yr$) has become equal to or smaller than the predetermined value Sc0, the determination result is changed from the permission state (Sr=1) to the prohibition state (Sr=0). Here, a relation Sc0<Sc1 exists between the predetermined values Sc0 and Sc1. By virtue of this relation, it is possible to prevent occurrence of hunting of the determination result as to whether to permit or prohibit execution of the vehicle speed control.

As described above, in addition to the execution judgment computation (first execution judgment computation) based on the deviation Sh between the actual turning index Sa and the calculative turning index Se, there can be provided at least one of the second execution judgment computation based on the actual turning state quantity and the third execution judgment computation based on the steering characteristic of the vehicle. In this case, execution of the vehicle speed control is permitted when the determination result based on the turning index deviation Sh is in the permission state, and at least one of the determination result based on the actual turning state quantity Ta and the determination result based on the steering characteristic value Sch is in the permission state. That is, execution of the vehicle speed control can be permitted only when So=1 and [Ss=1 or Sr=1]. Since the vehicle speed control is started only when two permission states are obtained, it is possible to prevent more reliably the vehicle speed control from unnecessarily being started and executed on the basis of curve information which is low in reliability.

Moreover, execution of the vehicle speed control can be permitted when all the determination results based on the turning index deviation Sh, the determination result based on the actual turning state quantity Ta, and the determination result based on the steering characteristic value Sch are in the permission state. That is, execution of the vehicle speed control can be permitted only when So=1 and Ss=1 and Sr=1.

Figure 31:
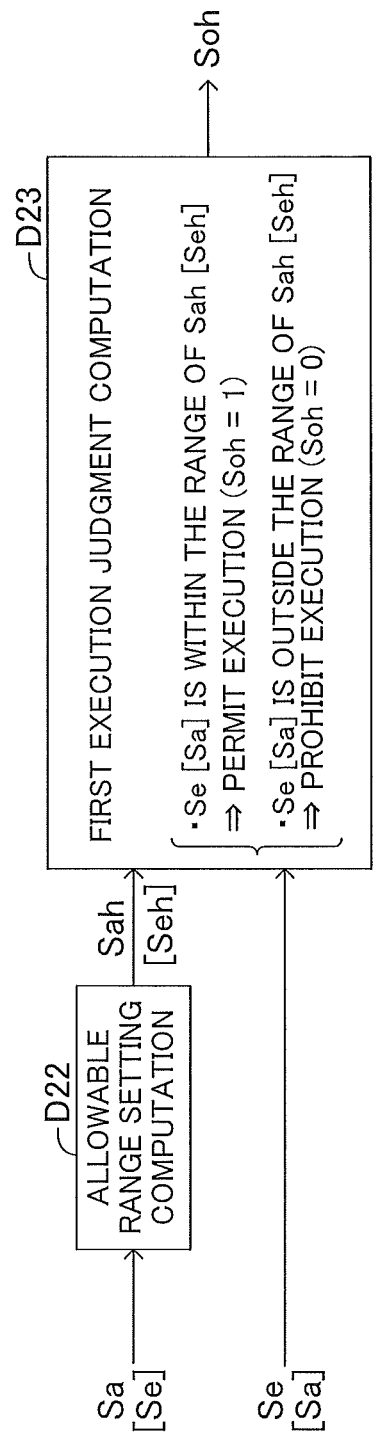
FIG. 31 is a functional block diagram for describing the case where an allowable range is taken into consideration when the actual turning index and the calculative turning index are compared.

In the above-described second embodiment, in the first execution judgment computation block D6 (see FIG. 23), the determination result (control flag So) is output on the basis of the relation in magnitude between the comparison result Sh (between the actual turning index Sa and the calculative turning index Se) and the predetermined values Sh1, Sh2. However, the second embodiment may be modified as shown in FIG. 31. In this modification, in a block D22, an allowable characteristic Sah of the actual turning index with an allowable range Hn is computed on the basis of the actual turning index Sa; and, in a block D23, a determination result (control flag Soh) is output on the basis of the result of comparison between the allowable characteristic Sah and the calculative turning index Se.

Figure 32:
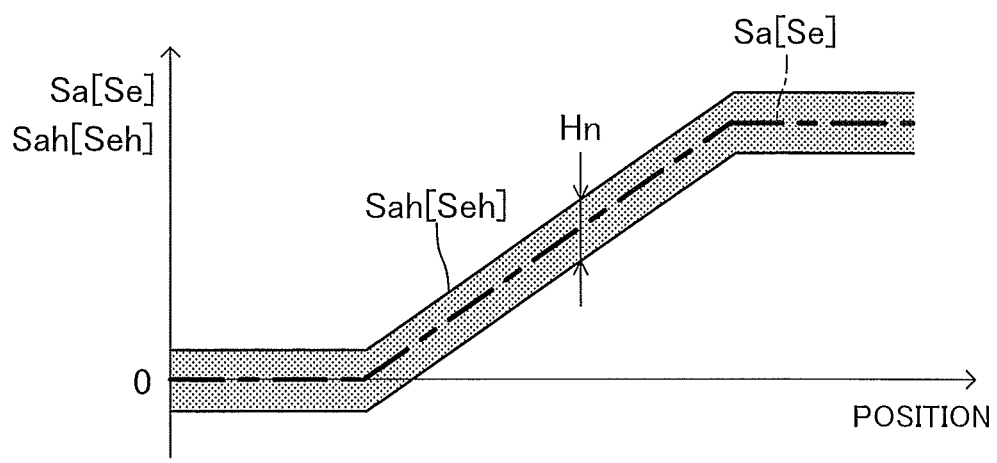
FIG. 32 is a graph for describing an example of the allowable range shown in FIG. 31.

As shown in FIG. 32, a characteristic having a range Hn containing the actual turning index Sa (see a region indicated by fine dots) can be used as the allowable characteristic Sah of the actual turning index. The allowable range Hn can be a predetermined value (constant value). Furthermore, the allowable range Hn can be set on the basis of the vehicle speed Vx.

In the case where the calculative turning index Se falls within the allowable characteristic Sah of the actual turning index, the determination result is set to the permission state (Soh=1). Meanwhile, in the case where the calculative turning index Se falls outside the allowable characteristic Sah, the determination result is set to the prohibition state (Soh=0). Here, Soh is a control flag which represents prohibition/permission of execution of the control judged on the basis of the comparison between the allowable characteristic Sah and the calculative turning index Se; and "0" represents prohibition of execution of the control, and "1" represents permission of execution of the control.

The determination result (control flag Soh) may be output, while the actual turning index Sa shown in FIGS. 31 and 32 is replaced with the calculative turning index Se. This case will be described by use of parenthesized symbols shown in FIGS.

31 and 32. That is, a characteristic having a range Hn containing the cumulative turning index Se (see a region indicated by fine dots) can be used as an allowable characteristic Seh of the calculative turning index. In this case as well, the allowable range Hn can be a predetermined value (constant value). Furthermore, the allowable range Hn can be set on the basis of the vehicle speed Vx.

The determination result (control flag Soh) is output on the basis of the result of comparison between the allowable characteristic Seh and the actual turning index Sa. Specifically, in the case where the actual turning index Sa falls within the allowable characteristic Seh of the calculative actual turning index, the determination result is set to the permission state (Soh=1). Meanwhile, in the case where the actual turning index Sa falls outside the allowable characteristic Seh, the determination result is set to the prohibition state (Soh=0).

Figure 18:
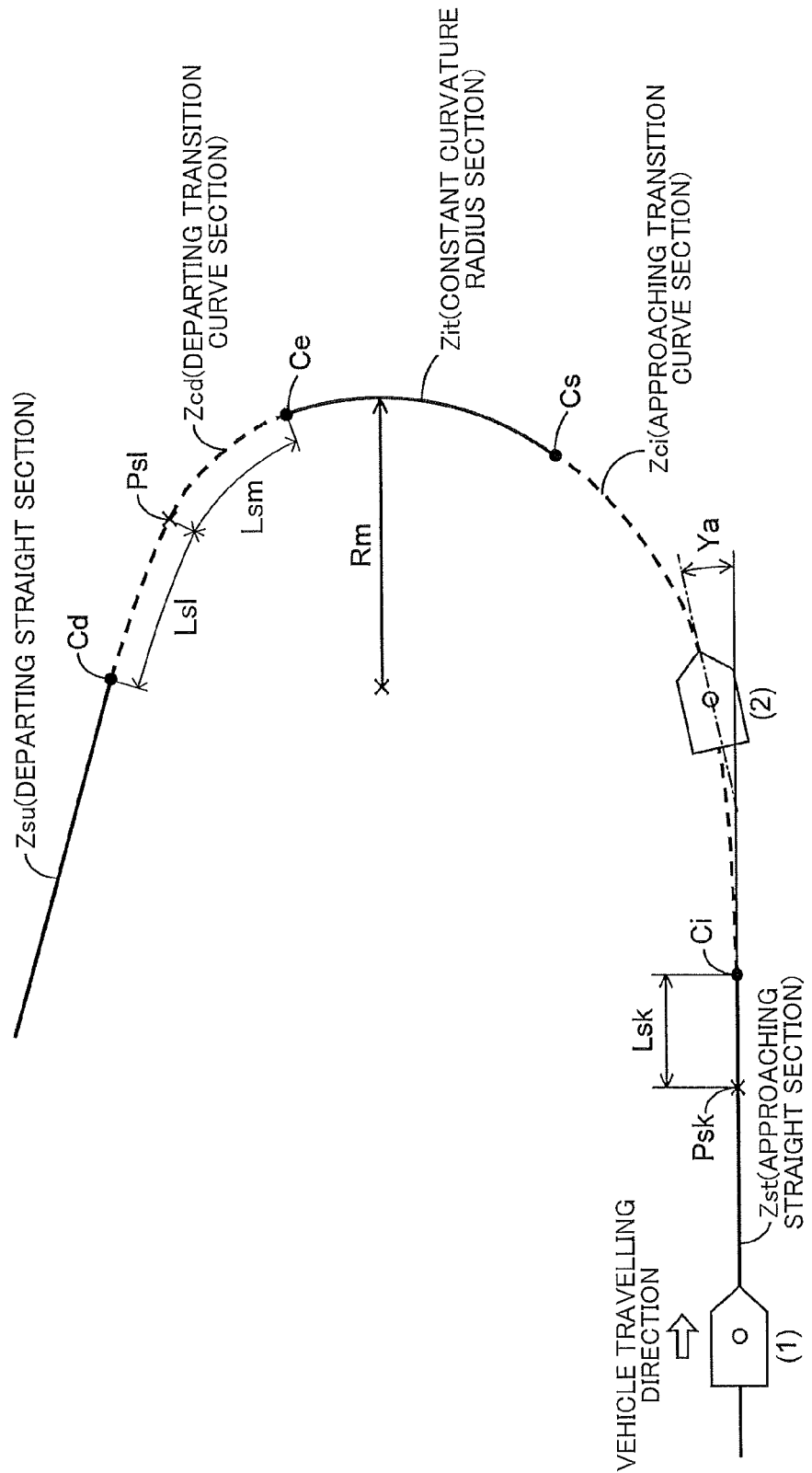
FIG. 18 is an illustration showing an example of the computation of the heading angle for the case where a single curve is present.
Figure 19:
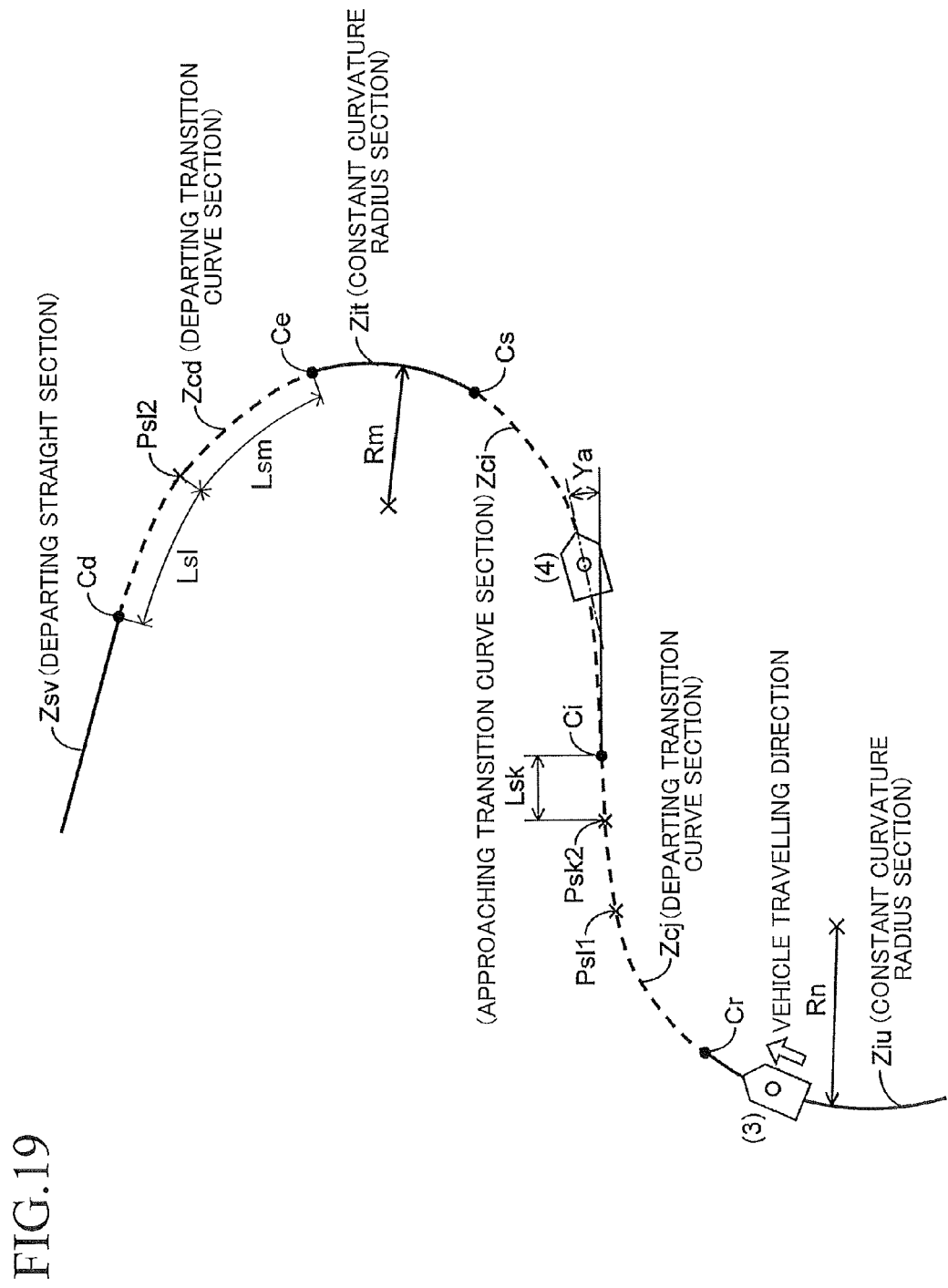
FIG. 19 is an illustration showing an example of the computation of the heading angle for the case where a plurality of curves are present.

In addition, the processing for "computation of the heading angle in the heading angle computation block B14 shown in FIG. 11" and described in the first embodiment with reference to FIGS. 17 to 19 can be applied to the above-described second embodiment as well.

The invention claimed is:

1. A traveling control apparatus for a vehicle, comprising:
   vehicle position acquisition means for acquiring a position of the vehicle;
   curve information acquisition means for acquiring information of a curve of a road on which the vehicle is traveling, the information of the curve being acquired from map information;
   vehicle speed acquisition means for acquiring a speed of the vehicle; and
   deceleration control means for executing deceleration control which decreases the speed of the vehicle when the vehicle passes through the curve, on the basis of the position of the vehicle, the curve information, and the speed of the vehicle, the traveling control apparatus being characterized by comprising:
   actual turning state quantity acquisition means for acquiring an actual turning state quantity which represents an actual turning state of the vehicle;
   first execution judgment means for determining, on the basis of the actual turning state quantity, whether execution of the deceleration control is to be permitted or prohibited and for outputting, as a result of the determination, an output which is brought into an enabled state in which execution of the deceleration control is enabled or a disabled state in which execution of the deceleration control is disabled,
   wherein the deceleration control means executes the deceleration control when the determination result of the first execution judgment means is in the enabled state, and does not execute the deceleration control when the determination result of the first execution judgment means is in the disabled state;
   wherein the first execution judgment means comprises heading angle computation means for computing a heading angle of the vehicle, the heading angle being an angle of a traveling direction of the vehicle at the position of the vehicle, in relation to a direction of the straight section before an entrance of the curve, by integrating an actual yaw rate of the vehicle, detected by a yaw rate sensor, from the curve entrance, and by resetting the computed heading angle to zero when an absolute value of a steering wheel angle or of a front wheel steering angle is equal to or less than a predetermined value;
   wherein the first execution judgment means sets the determination result to the disabled state when the heading angle is smaller than a first predetermined value, and changes the determination result from the disable state to the enabled state when the heading angle becomes equal to or greater than the first predetermined value; and
   wherein the first execution judgment means performs the determination while the vehicle is travelling in an approaching transition curve section of the curve, and, when the determination result of the first execution judgment means is set to the enabled state, the deceleration control means starts the deceleration control while the vehicle is travelling within the approaching transition curve section.

2. The traveling control apparatus for the vehicle according to claim 1, wherein the first execution judgment means comprises:
   actual turning index computation means for computing, on the basis of the actual turning state quantity, an actual turning index representing the degree of actual turning of the vehicle; and
   calculative turning index computation means for calculating a calculative turning index corresponding to the actual turning index on the basis of the position of the vehicle and the curve information,
   wherein the first execution judgment means changes the determination result from the disabled state to the enabled state when the heading angle is equal to or greater than the first determined value, and when a state in which a difference between the actual turning index and the calculative turning index is equal to or less than a second predetermined value continues over a predetermined range.

3. The traveling control apparatus for the vehicle according to claim 1, wherein the first execution judgment means sets the first predetermined value such that the higher the speed of the vehicle, the smaller the first predetermined value.

* * * * *